(12) United States Patent
Hayashita et al.

(10) Patent No.: US 9,982,614 B2
(45) Date of Patent: May 29, 2018

(54) CONTROL DEVICE FOR INTERNAL COMBUSTION ENGINE

(71) Applicant: Toyota Jidosha Kabushiki Kaisha, Toyota-shi, Aichi-ken (JP)

(72) Inventors: Go Hayashita, Chigasaki (JP); Koji Ide, Gotemba (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 196 days.

(21) Appl. No.: 15/200,581

(22) Filed: Jul. 1, 2016

(65) Prior Publication Data
US 2017/0002760 A1   Jan. 5, 2017

(30) Foreign Application Priority Data
Jul. 3, 2015   (JP) .................................. 2015-134607

(51) Int. Cl.
*F02D 41/00* (2006.01)
*F02D 41/14* (2006.01)
(Continued)

(52) U.S. Cl.
CPC ......... *F02D 41/1494* (2013.01); *F01N 3/101* (2013.01); *F02D 35/0015* (2013.01); *F02D 41/065* (2013.01); *F02D 41/1441* (2013.01); *F02D 41/1454* (2013.01); *F02D 41/26* (2013.01); *F01N 9/00* (2013.01); *F01N 11/007* (2013.01); *F01N 2430/06* (2013.01);
(Continued)

(58) Field of Classification Search
CPC .......... F02D 41/62; F02D 41/64; F02D 41/65; F02D 41/67
See application file for complete search history.

(56) References Cited

U.S. PATENT DOCUMENTS

2003/0041593 A1* 3/2003 Yoshida ................ F02D 41/042
60/285
2010/0212644 A1* 8/2010 Neisen ................ F02D 41/1494
123/685
(Continued)

FOREIGN PATENT DOCUMENTS

| JP | 2010-185386 A | 8/2010 |
|---|---|---|
| WO | 2014/118889 A1 | 8/2014 |
| WO | 2014/118892 A1 | 8/2014 |

*Primary Examiner* — Hieu T Vo
*Assistant Examiner* — Sherman Manley
(74) *Attorney, Agent, or Firm* — Dinsmore & Shohl LLP

(57) ABSTRACT

A control device for an internal combustion engine comprises an air-fuel ratio control part configured to control the air-fuel ratio of the exhaust gas and a heating control part configured to control the heating of the air-fuel ratio sensors. The heating control part controls the sensor heaters so that the temperature of the upstream air-fuel ratio sensor becomes less than the activation temperature and so that the temperature of the downstream air-fuel ratio sensor becomes the activation temperature or more while the internal combustion engine is stopped by the automatic stop function. The air-fuel ratio control part controls the exhaust air-fuel ratio based on the outputs of the two air-fuel ratio sensors during engine operation and control the air-fuel ratio temporarily based on only the output of the downstream air-fuel ratio sensor after the internal combustion engine has been restarted after automatic stop.

13 Claims, 23 Drawing Sheets

(51) Int. Cl.
   *F02D 41/06*    (2006.01)
   *F01N 3/10*     (2006.01)
   *F02D 35/00*    (2006.01)
   *F02D 41/26*    (2006.01)
   *F02D 41/02*    (2006.01)
   *F01N 9/00*     (2006.01)
   *F01N 11/00*    (2006.01)

(52) U.S. Cl.
   CPC .... *F01N 2560/025* (2013.01); *F01N 2560/14* (2013.01); *F01N 2560/20* (2013.01); *F01N 2900/08* (2013.01); *F02D 41/0295* (2013.01); *F02D 2041/1418* (2013.01); *F02D 2200/0814* (2013.01); *Y02T 10/22* (2013.01)

(56) References Cited

U.S. PATENT DOCUMENTS

| | | | |
|---|---|---|---|
| 2011/0224851 A1* | 9/2011 | Jacques | B60K 6/48 701/22 |
| 2014/0190149 A1* | 7/2014 | Umemoto | F01N 11/007 60/276 |
| 2016/0017831 A1 | 1/2016 | Nakagawa et al. | |
| 2016/0061084 A1 | 3/2016 | Okazaki et al. | |
| 2016/0290267 A1* | 10/2016 | Ide | F02D 41/1494 |

* cited by examiner

CONTROL DEVICE FOR INTERNAL COMBUSTION ENGINE

CROSS-REFERENCE TO RELATED APPLICATIONS

The present application claims priority to Japanese Patent Application No. 2015-134607 filed Jul. 3, 2015, the entire contents of which are hereby incorporated herein by reference

TECHNICAL FIELD

The present disclosure relates to a control device for an internal combustion engine.

BACKGROUND ART

Japanese Patent Publication No. 2010-185386A discloses a control device used in an automatically stoppable internal combustion engine provided with an exhaust purification catalyst provided in an exhaust passage of the internal combustion engine, an upstream air-fuel ratio sensor provided in the exhaust passage at an upstream side of the exhaust purification catalyst in the direction of flow of exhaust, a downstream air-fuel ratio sensor provided in the exhaust passage at a downstream side of the exhaust purification catalyst in the direction of flow of exhaust, an upstream side sensor heater heating the upstream air-fuel ratio sensor, and a downstream side sensor heater heating the downstream air-fuel ratio sensor.

In this control device, for example, while the internal combustion engine is stopped, the upstream side sensor heater and downstream side sensor heater do not heat the upstream air-fuel ratio sensor and downstream air-fuel ratio sensor. The upstream side sensor heater and the downstream side sensor heater are used to heat the upstream air-fuel ratio sensor and downstream air-fuel ratio sensor when cold starting the internal combustion engine or when restarting the internal combustion engine stopped by the automatic stop function. In particular, in the control device described in Japanese Patent Publication No. 2010-185386A, the heating of the upstream air-fuel ratio sensor and downstream air-fuel ratio sensor at startup or after startup of the internal combustion engine is controlled in accordance with the stopped state of the internal combustion engine, the stopped time of the internal combustion engine, etc. According to the above patent publication, due to this, it is considered possible to prevent breakdown of an air-fuel ratio sensor due to the condensed water remaining in the exhaust system.

SUMMARY

In this regard, in Japanese Patent Publication No. 2010-185386A, the sensor heaters are not used to heat the air-fuel ratio sensors while the internal combustion engine is stopped. The air-fuel ratio sensors are heated after the internal combustion engine is restarted. However, when the temperature of an air-fuel ratio sensor is less than an activation temperature, a certain extent of time is taken for a sensor heater to raise the air-fuel ratio sensor to the activation temperature or more. Therefore, if the temperature of an air-fuel ratio sensor ends up falling to less than the activation temperature during stopping of the internal combustion engine by the automatic stop function, a certain extent of time is taken for the temperature of the air-fuel ratio sensor to rise to the activation temperature or more after restart of the internal combustion engine. For this reason, it is not possible to accurately detect the air-fuel ratio of the exhaust gas at the two air-fuel ratio sensors of the upstream air-fuel ratio sensor and downstream air-fuel ratio sensor for a certain extent of time after restart of the internal combustion engine and according it is no longer possible to suitably control the air-fuel ratio of the exhaust gas.

On the other hand, it may be considered to heat the upstream air-fuel ratio sensor and downstream air-fuel ratio sensor by sensor heaters while the internal combustion engine is stopped by the automatic stop function so as to maintain the temperatures of these air-fuel ratio sensors at the activation temperature or more even while the internal combustion engine is stopped. However, to constantly maintain the temperatures of these two air-fuel ratio sensors at the activation temperature or more while the internal combustion engine is stopped by the automatic stop function, the sensor heaters require large electric power. In the end, this leads to deterioration of the fuel economy of the internal combustion engine.

Therefore, in view of the above problem, an object of the present disclosure is to provide a control device of an internal combustion engine keeping consumption of electricity by the sensor heaters small while being able to suitably control the air-fuel ratio of the exhaust gas right after engine restart.

The present disclosure was made to solve the above problem and has as its gist the following:

(1) A control device for an internal combustion engine which has automatic stop function, the internal combustion engine equipped with: an exhaust purification catalyst provided in an exhaust passage; an upstream air-fuel ratio sensor provided in the exhaust passage at an upstream side of the exhaust purification catalyst in a direction of flow of exhaust; a downstream air-fuel ratio sensor provided in the exhaust passage at a downstream side of the exhaust purification catalyst in the direction of flow of exhaust; an upstream side sensor heater heating the upstream air-fuel ratio sensor; and a downstream side sensor heater heating the downstream air-fuel ratio sensor, the control device comprising:

an electronic control unit operatively connected to the internal combustion engine, the upstream air-fuel ratio sensor, the downstream air-fuel ratio sensor, the upstream side sensor heater, and the downstream side sensor heater, the electronic control unit configured to:

control an air-fuel ratio of exhaust gas flowing into the exhaust purification catalyst;

control heating of the upstream air-fuel ratio sensor by the upstream side sensor heater and heating of the downstream air-fuel sensor by the downstream side sensor heater;

control the upstream side sensor heater while the internal combustion engine is stopped by the automatic stop function so that the temperature of the upstream air-fuel ratio sensor becomes less than the activation temperature; and heat the downstream air-fuel ratio sensor by the downstream side sensor heater while the internal combustion engine is stopped by the automatic stop function so that the temperature of the downstream air-fuel ratio sensor becomes a temperature higher than the upstream air-fuel ratio sensor; and perform double feedback control where it controls the air-fuel ratio of the exhaust gas flowing into the exhaust purification catalyst based on the output of the upstream air-fuel ratio sensor and the output of the downstream air-fuel ratio sensor during engine operation; and perform single feedback control temporarily where it controls the air-fuel ratio of the exhaust gas flowing into the exhaust purification catalyst without using the output of the upstream air-fuel ratio sensor, but based on the output of the downstream air-fuel ratio sensor even during engine operation when the internal combustion engine is restarted after automatic stop.

(2) The control device for the internal combustion engine according to (1) wherein
the electronic control unit is further configured to control the downstream side sensor heater so as to maintain the temperature of the downstream air-fuel ratio sensor at less than the activation temperature and a predetermined temperature or more while the internal combustion engine is stopped by the automatic stop function, and
the predetermined temperature is a temperature by which the temperature of the downstream air-fuel ratio sensor reaches the activation temperature faster than the temperature of the upstream air-fuel ratio sensor when the internal combustion engine is restarted after automatic stop and the upstream side sensor heater and the downstream side sensor heater heat the upstream air-fuel ratio sensor and the downstream air-fuel ratio sensor.

(3) The control device for the internal combustion engine according to (1) wherein
the electronic control unit is further configured to control the downstream side sensor heater so as to maintain the temperature of the downstream air-fuel ratio sensor at the activation temperature or more while the internal combustion engine is stopped by the automatic stop function.

(4) The control device for the internal combustion engine according to any one of claims (1) to (3) wherein
the electronic control unit is further configured to control the downstream side sensor heater so that the temperature of the downstream air-fuel ratio sensor becomes lower while the internal combustion engine is stopped by the automatic stop function compared with during engine operation.

(5) The control device for the internal combustion engine according to any one of (1) to (4) wherein
the electronic control unit is further configured to: perform double breakdown control, both in double feedback control and in single feedback control, where it switches the target air-fuel ratio of the exhaust gas flowing into the exhaust purification catalyst to a lean air-fuel ratio leaner than the stoichiometric air-fuel ratio when the output air-fuel ratio of the downstream air-fuel ratio sensor becomes a rich judged air-fuel ratio richer than the stoichiometric air-fuel ratio or becomes less and switches the target air-fuel ratio to a rich air-fuel ratio richer than the stoichiometric air-fuel ratio when the output air-fuel ratio of the downstream air-fuel ratio sensor becomes a lean judged air-fuel ratio leaner than the stoichiometric air-fuel ratio or becomes more; and perform feedback control based on the output air-fuel ratio of the upstream air-fuel ratio sensor so that the output air-fuel ratio of the upstream air-fuel ratio sensor becomes the target air-fuel ratio when performing double feedback control.

(6) The control device for the internal combustion engine according to (5) wherein
the electronic control unit is further configured to set the target air-fuel ratio so that the average value of the rich degree of the target air-fuel ratio while the target air-fuel ratio is set to the rich air-fuel ratio and the average value of the lean degree of the target air-fuel ratio while the target air-fuel ratio is set to the lean air-fuel ratio become larger when performing double feedback control compared to when performing single feedback control.

(7) The control device for the internal combustion engine according to (5) wherein
the electronic control unit is further configured to: perform fluctuating double feedback control, in double feedback control, where it maintains the target air-fuel ratio at the lean air-fuel ratio and lowers the lean degree of the target air-fuel ratio during a lean time period from when the output air-fuel ratio of the downstream air-fuel ratio sensor becomes the rich judged air-fuel ratio or less to when the output air-fuel ratio of the downstream air-fuel ratio sensor becomes the lean judged air-fuel ratio or more and where it maintains the target air-fuel ratio at the rich air-fuel ratio and lowers the rich degree of the target air-fuel ratio during a rich time period from when the output air-fuel ratio of the downstream air-fuel ratio sensor becomes the lean judged air-fuel ratio or more to when the output air-fuel ratio of the downstream air-fuel ratio sensor becomes the rich judged air-fuel ratio or less; and perform fixed double breakdown control, in single feedback control, where it maintains the target air-fuel ratio at a constant lean set air-fuel ratio during the lean time period and maintains the target air-fuel ratio at a constant rich set air-fuel ratio during the rich time period.

(8) The control device for an internal combustion engine according to any one of (1) to (4) wherein
the electronic control unit is further configured to: perform rich breakdown control, in double feedback control, where it switches the target air-fuel ratio of the exhaust gas flowing into the exhaust purification catalyst to a lean air-fuel ratio leaner than the stoichiometric air-fuel ratio when the output air-fuel ratio of the downstream air-fuel ratio sensor becomes a rich judged air-fuel ratio richer than the stoichiometric air-fuel ratio or becomes less and switches the target air-fuel ratio to a rich air-fuel ratio richer than the stoichiometric air-fuel ratio when the estimated value of the oxygen storage amount of the exhaust purification catalyst becomes a switching reference storage amount smaller than the maximum storable oxygen amount or becomes more and, perform double breakdown control, in single feedback control, where it switches the target air-fuel ratio of the exhaust gas flowing into the exhaust purification catalyst to a lean air-fuel ratio leaner than the stoichiometric air-fuel ratio when the output air-fuel ratio of the downstream air-fuel ratio sensor becomes a rich judged air-fuel ratio richer than the stoichiometric air-fuel ratio or becomes less and switches the target air-fuel ratio to a rich air-fuel ratio richer than the stoichiometric air-fuel ratio when the output air-fuel ratio of the downstream air-fuel ratio sensor becomes a lean judged air-fuel ratio leaner than the stoichiometric air-fuel ratio or becomes more.

(9) The control device for the internal combustion engine according to (8) wherein
the electronic control unit is further configured to perform fixed double breakdown control, in single feedback control, where it maintains the target air-fuel ratio at a constant lean set air-fuel ratio in a lean time period from when the output air-fuel ratio of the downstream air-fuel ratio sensor becomes the rich judged air-fuel ratio or less to when the output air-fuel ratio of the downstream air-fuel ratio sensor becomes the lean judged air-fuel ratio or more and maintains the target air-fuel ratio at a constant rich air-fuel ratio in a rich time period from when the output air-fuel ratio of the downstream air-fuel ratio sensor becomes the lean judged air-fuel ratio or more to when the output air-fuel ratio of the downstream air-fuel ratio sensor becomes rich judged air-fuel ratio or less.

(10) The control device for the internal combustion engine according to (8) or (9) wherein the electronic control unit is further configured to control the downstream side sensor heater so that the temperature of the downstream air-fuel ratio sensor becomes the activation temperature or more after the internal combustion engine is restarted after being stopped by the automatic stop function, and the electronic control unit is further configured to: switch single feedback control to double feedback control from when the temperature of the downstream air-fuel ratio sensor becomes the activation temperature or more after the internal combustion engine is restarted after automatic stop; and set the target air-fuel ratio to the rich air-fuel ratio firstly when switching from single feedback control to double feedback control.

(11) The control device for the internal combustion engine according to any one of (1) to (4) wherein the downstream air-fuel ratio sensor is an oxygen sensor which detects an oxygen concentration based on an electromotive force corresponding to a concentration of oxygen in the exhaust gas, and the electronic control unit is further configured to: control the air-fuel ratio of the exhaust gas flowing into the exhaust purification catalyst so that the output air-fuel ratio of the downstream air-fuel ratio sensor approaches the stoichiometric air-fuel ratio; and control the air-fuel ratio of the exhaust gas flowing into the exhaust purification catalyst so that an amount of change of the air-fuel ratio of the exhaust gas flowing into the exhaust purification catalyst becomes smaller than an amount of change of the output air-fuel ratio of the downstream air-fuel ratio sensor at the time of single feedback control compared with the time of double feedback control.

(12) The control device for the internal combustion engine according to (11) wherein the electronic control unit is further configured to: control the target air-fuel ratio based on a difference between the output air-fuel ratio of the downstream air-fuel ratio sensor and the stoichiometric air-fuel ratio by PID control so that the difference becomes smaller both in feedback control and in single feedback control; and make at least one of the gains of the proportional gain, integral gain, and differential gain in the PID control smaller when performing single feedback control compared to when performing double feedback control.

(13) The control device for the internal combustion engine according to (11) wherein the electronic control unit is further configured to: control the target air-fuel ratio based on a difference between the output air-fuel ratio of the downstream air-fuel ratio sensor and the stoichiometric air-fuel ratio by PI control so that the difference becomes smaller both in double feedback control and in single feedback control; and make at least one of the gains of the proportional gain and integral gain in the PI control smaller when performing single feedback control compared to when performing double feedback control.

According to embodiments of the present disclosure, there is provided a control device for an internal combustion engine keeping consumption of electric power by the sensor heaters small while being able to suitably control the air-fuel ratio of the exhaust gas right after engine restart.

DESCRIPTION OF EMBODIMENTS

Figure 1:
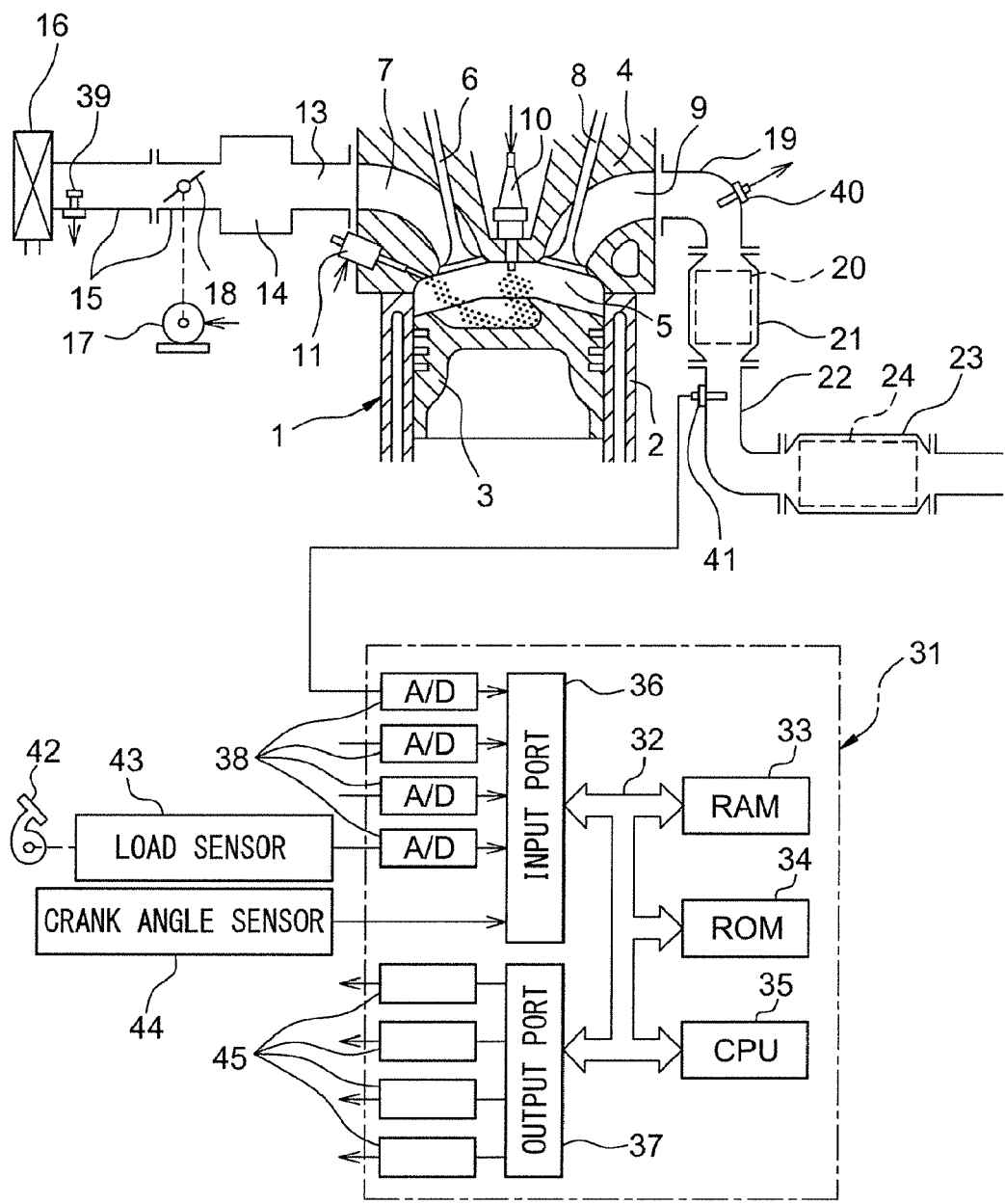
FIG. 1 is a view schematically showing an internal combustion engine in which an abnormality diagnosis system of the present disclosure is used.

Below, referring to the drawings, embodiments of the present disclosure will be explained in detail. Note that, in the following explanation, similar component elements are assigned the same reference notations.

<Explanation of Internal Combustion Engine as a Whole>

FIG. 1 is a view schematically showing an internal combustion engine in which a control device according to a first embodiment of the present disclosure is used. Referring to FIG. 1, 1 indicates an engine body, 2 a cylinder block, 3 a piston reciprocating inside the cylinder block 2, 4 a cylinder head fastened on the cylinder block 2, 5 a combustion chamber formed between a piston 3 and the cylinder head 4, 6 an intake valve, 7 an intake port, 8 an exhaust valve, and 9 an exhaust port. The intake valve 6 opens and closes the intake port 7, while the exhaust valve 8 opens and closes the exhaust port 9.

As shown in FIG. 1, at the center part of the inside wall surface of the cylinder head 4, a spark plug 10 is arranged. At a circumferential part at the inside wall surface of the cylinder head 4, a fuel injector 11 is arranged. The spark plug 10 is configured to generate a spark in accordance with an ignition signal. Further, the fuel injector 11 injects a predetermined amount of fuel into the combustion chamber 5 in accordance with an injection signal. Note that, the fuel injector 11 may also be arranged to inject fuel into the intake port 7. Further, in the present embodiment, as the fuel, gasoline with a stoichiometric air-fuel ratio of 14.6 is used. However, in the internal combustion engine in which the exhaust purification system of the present disclosure is used, a fuel other than gasoline or mixed fuel with gasoline may also be used.

The intake ports 7 of the cylinders are connected through respectively corresponding intake runners 13 to a surge tank 14, while the surge tank 14 is connected through an intake pipe 15 to the air cleaner 16. The intake ports 7, intake runners 13, surge tank 14, and intake pipe 15 form the intake passage. Further, inside the intake pipe 15, a throttle valve 18 driven by a throttle valve driving actuator 17 is arranged. The throttle valve 18 can be made to turn by the throttle valve driving actuator 17 whereby the opening area of the intake passage can be changed.

On the other hand, the exhaust ports 9 of the cylinders are connected to an exhaust manifold 19. The exhaust manifold 19 has a plurality of runners which are connected to the individual exhaust ports 9 and a header at which these runners merge. The header of the exhaust manifold 19 is connected to an upstream side casing 21 in which an upstream side exhaust purification catalyst 20 is provided. The upstream side casing 21 is connected through an exhaust pipe 22 to a downstream side casing 23 having a built-in downstream side exhaust purification catalyst 24. The exhaust ports 9, exhaust manifold 19, upstream side casing 21, exhaust pipe 22, and downstream side casing 23 form the exhaust passage.

The electronic control unit (ECU) 31 is comprised of a digital computer provided with parts connected with each other through a bidirectional bus 32 such as a RAM (random access memory) 33, ROM (read only memory) 34, CPU (microprocessor) 35, input port 36, and output port 37. Inside the intake pipe 15, an air flow meter 39 for detecting the flow rate of air flowing through the inside of the intake pipe 15 is arranged. The output of this air flow meter 39 is input through a corresponding AD converter 38 to the input port 36. Further, at the header of the exhaust manifold 19, an upstream air-fuel ratio sensor 40 detecting the air-fuel ratio of the exhaust gas flowing through the inside of the exhaust manifold 19 (that is, the exhaust gas flowing into the upstream side exhaust purification catalyst 20) is arranged. In addition, inside of the exhaust pipe 22, a downstream air-fuel ratio sensor 41 detecting the air-fuel ratio of the exhaust gas flowing through the inside of the exhaust pipe 22 (that is, the exhaust gas flowing out from the upstream side exhaust purification catalyst 20 and flowing into the downstream side exhaust purification catalyst 24) is arranged. The outputs of these air-fuel ratio sensors 40 and 41 are also input through the corresponding AD converters 38 to the input port 36. Note that the configurations of these air-fuel ratio sensors 40 and 41 will be explained later.

Further, an accelerator pedal 42 is connected to a load sensor 43 generating an output voltage proportional to the amount of depression of the accelerator pedal 42, while the output voltage of the load sensor 43 is input through a corresponding AD converter 38 to the input port 36. The crank angle sensor 44, for example, generates an output pulse every time the crankshaft rotates by 15 degrees. This output pulse is input to the input port 36. The CPU 35 uses the output pulses of this crank angle sensor 44 to calculate the engine speed. On the other hand, the output port 37 is connected through a corresponding drive circuit 45 to the spark plugs 10, fuel injectors 11, and throttle valve driving actuator 17.

<Explanation of Exhaust Purification Catalyst>

The upstream side exhaust purification catalyst 20 and downstream side exhaust purification catalyst 24 are three-way catalysts having oxygen storage abilities. Specifically, the exhaust purification catalysts 20 and 24 are three-way catalysts comprised of carriers made of ceramics on which precious metals which have catalytic actions (for example, platinum (Pt)) and substances which have oxygen storage abilities (for example, ceria ($CeO_2$)) are carried. Three-way catalysts have the functions of simultaneously removing unburned HC, CO, etc. (below referred to as "unburned gas") and $NO_X$ if the air-fuel ratio of the exhaust gas which flows into the three-way catalysts is maintained at the stoichiometric air-fuel ratio. In addition, when the exhaust purification catalysts 20 and 24 store certain extents of oxygen, the unburned gas and $NO_X$ are simultaneously removed even if the air-fuel ratio of the exhaust gas which flows into the exhaust purification catalysts 20 and 24 deviates somewhat to the rich side or lean side from the stoichiometric air-fuel ratio.

That is, if the exhaust purification catalysts 20 and 24 have oxygen storage abilities, that is, if the oxygen storage amounts of the exhaust purification catalysts 20 and 24 are smaller than the maximum storable oxygen amounts, when the air-fuel ratios of the exhaust gas flowing into the exhaust purification catalysts 20 and 24 become somewhat leaner than the stoichiometric air-fuel ratio, the excess oxygen contained in the exhaust gas is stored in the exhaust purification catalysts 20 and 24. For this reason, the surfaces of the exhaust purification catalysts 20 and 24 are maintained at the stoichiometric air-fuel ratio. As a result, the unburned gas and $NO_X$ are simultaneously removed from the surfaces of the exhaust purification catalysts 20 and 24. At this time, the air-fuel ratios of the exhaust gas flowing out from the exhaust purification catalysts 20 and 24 become the stoichiometric air-fuel ratios.

On the other hand, if the exhaust purification catalysts 20 and 24 are in states enabling the release of oxygen, that is, the oxygen storage amounts of the exhaust purification catalysts 20 and 24 are larger than 0, when the air-fuel ratios of the exhaust gas flowing into the exhaust purification catalysts 20 and 24 become somewhat richer than the stoichiometric air-fuel ratio, the amount of oxygen lacking for reducing the unburned gas contained in the exhaust gas is released from the exhaust purification catalysts 20 and 24. For this reason, in this case as well, the surfaces of the exhaust purification catalysts 20 and 24 are maintained at the stoichiometric air-fuel ratio. As a result, the surfaces of the exhaust purification catalysts 20 and 24 are simultaneously cleared of unburned gas and $NO_X$. At this time, the air-fuel ratios of the exhaust gas flowing out from the exhaust purification catalysts 20 and 24 become the stoichiometric air-fuel ratio.

In this way, when the exhaust purification catalysts 20 and 24 store certain extents of oxygen, even if the air-fuel ratios of the exhaust gas flowing into the exhaust purification catalysts 20 and 24 deviate somewhat to the rich side or lean side from the stoichiometric air-fuel ratio, the unburned gas and $NO_X$ are simultaneously removed and the air-fuel ratios of the exhaust gas flowing out from the exhaust purification catalysts 20 and 24 become the stoichiometric air-fuel ratio.

<Explanation of Air-Fuel Ratio Sensors>

In the present embodiment, as the air-fuel ratio sensors 40 and 41, cup-shaped limit current type air-fuel ratio sensors are used. Using FIG. 2, the structures of the air-fuel ratio sensors 40 and 41 will be simply explained. Each of the air-fuel ratio sensors 40 and 41 is provided with a solid electrolyte layer 51, an exhaust side electrode 52 arranged on one side surface of the same, an atmosphere side electrode 53 arranged on the other side surface of the same, a diffusion regulating layer 54 regulating diffusion of the exhaust gas passing through it, a reference gas chamber 55, and a heater part 56 heating the air-fuel ratio sensor 40 or 41, in particular, heating the solid electrolyte layer 51.

In particular, in the cup-shaped air-fuel ratio sensor 40 or 41 of the present embodiment, the solid electrolyte layer 51 is formed into a cylindrical shape with one closed end. Inside the reference gas chamber 55 defined inside of the solid electrolyte layer 51, atmospheric gas (air) is introduced and the heater part 56 is arranged. At the inner surface of the solid electrolyte layer 51, the atmosphere side electrode 53 is arranged, while at the outer surface of the solid electrolyte layer 51, the exhaust side electrode 52 is arranged. On the outer surfaces of the solid electrolyte layer 51 and exhaust side electrode 52, the diffusion regulating layer 54 is arranged so as to cover these. Note that, at the outside of the diffusion regulating layer 54, a protective layer (not shown) for preventing liquid etc. from depositing on the surface of the diffusion regulating layer 54 may be provided.

The solid electrolyte layer 51 is formed by a sintered body of oxygen ion-conducting oxides comprised of $ZrO_2$ (zirconia), $HfO_2$, $ThO_2$, $Bi_2O_3$, etc. in which CaO, MgO, $Y_2O_3$, $Yb_2O_3$, etc. is included as a stabilizer. Further, the diffusion regulating layer 54 is formed by a porous sintered body of alumina, magnesia, silica, spinel, mullite, or other heat resistant inorganic substance. Furthermore, the exhaust side electrode 52 and atmosphere side electrode 53 are formed by platinum or another high catalytic activity precious metal.

Further, an applied voltage control device 60 mounted in the ECU 31 applies a sensor applied voltage V between the exhaust side electrode 52 and the atmosphere side electrode 53. In addition, the ECU 31 is provided with a current detection part 61 detecting the current I flowing through the solid electrolyte layer 51 across the electrodes 52 and 53 when applying the sensor applied voltage V. The current detected by this current detection part 61 is the output current I of the air-fuel ratio sensor 40 or 41.

Figure 3:
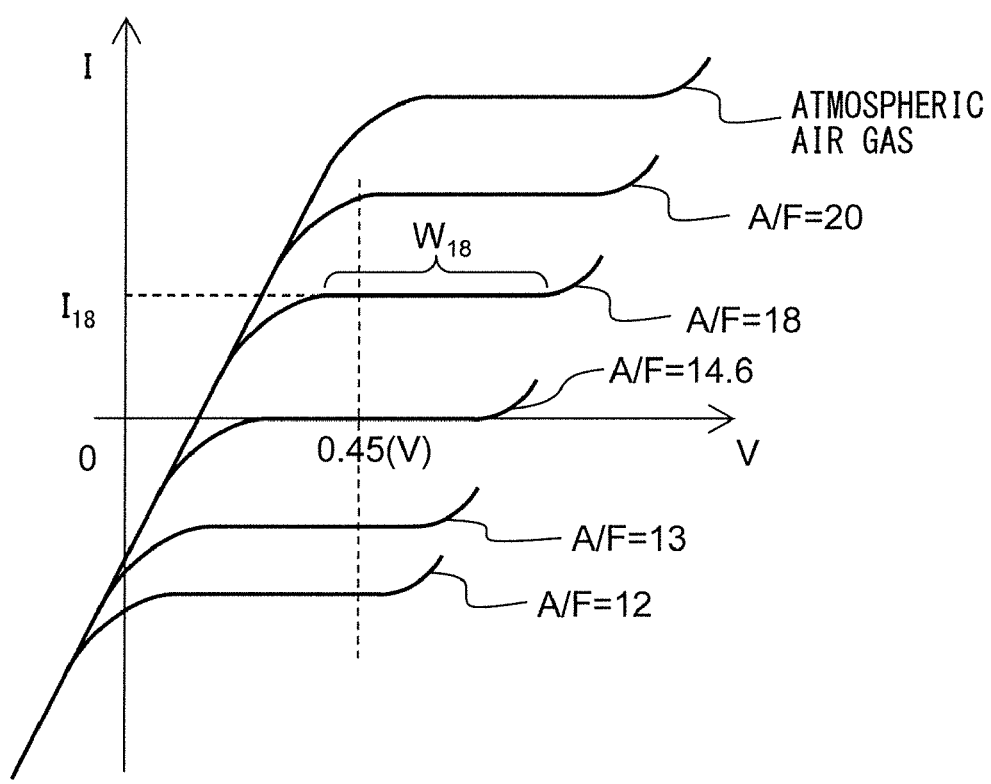
FIG. 3 is a view showing a relationship of an applied voltage V and output current I at different exhaust air-fuel ratios A/F.

The thus configured air-fuel ratio sensors 40 and 41 have voltage-current (V-I) characteristics such as shown in FIG. 3. As will be understood from FIG. 3, the output currents I of the air-fuel ratio sensors 40 and 41 become larger the higher the air-fuel ratio of the exhaust gas, that is, the exhaust air-fuel ratio A/F (the leaner). Further, the V-I line at each exhaust air-fuel ratio A/F has a region parallel to the sensor applied voltage V axis, that is, a region where the output current I does not change much even if the sensor applied voltage V changes. This voltage region is called the "limit current region", while the current at this time is called the "limit current". In FIG. 3, the limit current region and limit current when the exhaust air-fuel ratio is 18 are respectively shown by $W_{18}$ and $I_{18}$.

Figure 4:
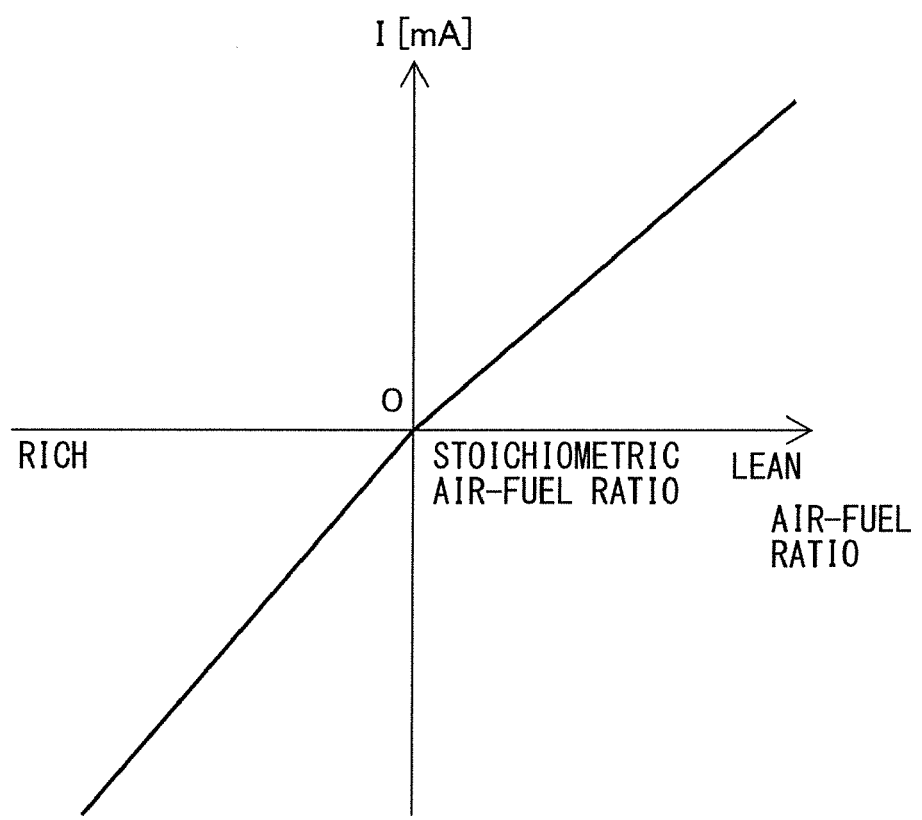
FIG. 4 is a view showing a relationship of an air-fuel ratio and output current I when making an applied voltage V constant.

FIG. 4 shows the relationship between the exhaust air-fuel ratio and output current I when making the applied voltage V constant at 0.45V or so (FIG. 3). As will be understood from FIG. 4, at the air-fuel ratio sensors 40 and 41, the output currents change linearly (proportionally) with respect to the air-fuel ratio so that the higher the exhaust air-fuel ratio (that is, the leaner), the larger the output currents I from the air-fuel ratio sensors 40 and 41. In addition, the air-fuel ratio sensors 40 and 41 are configured so that the output currents I become zero when the exhaust air-fuel ratio is the stoichiometric air-fuel ratio.

Figure 2:
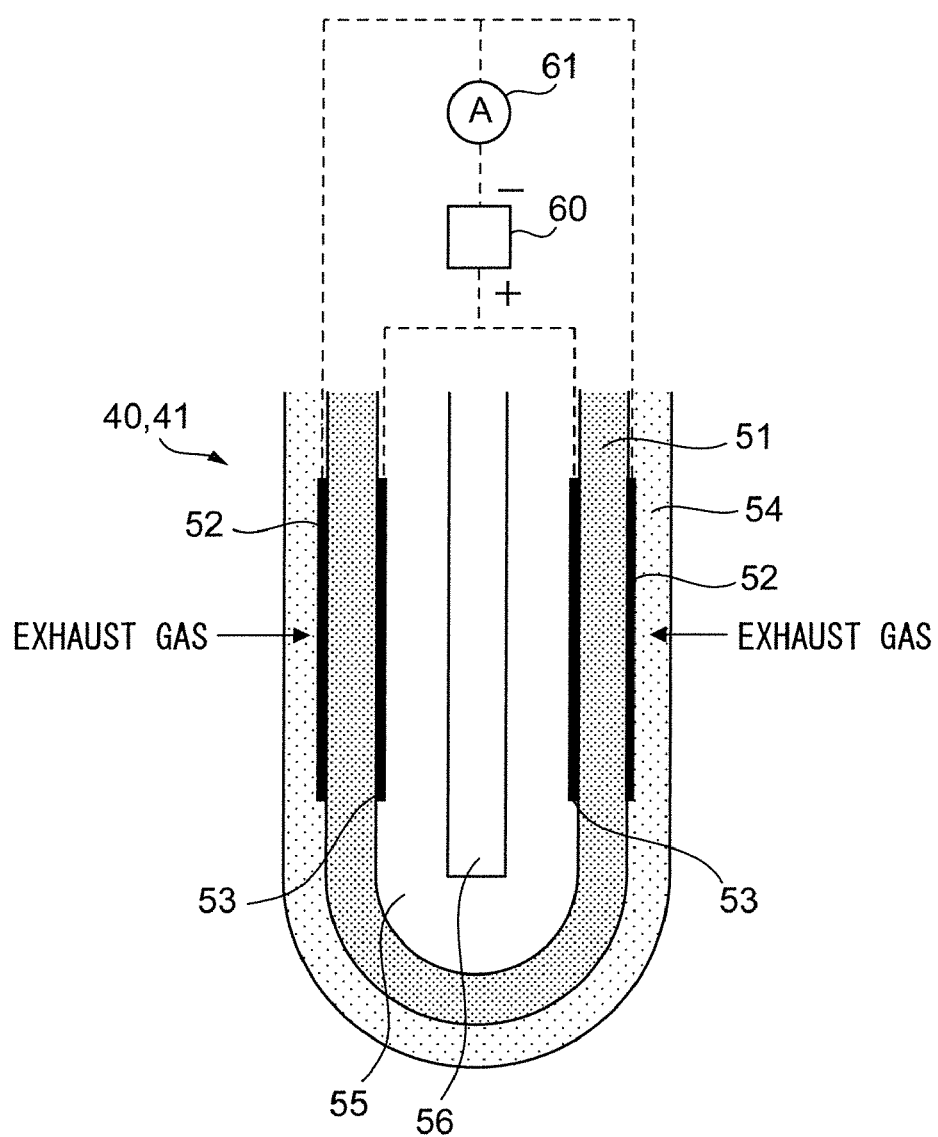
FIG. 2 is a schematic cross-sectional view of an air-fuel ratio sensor.

Note that, as the air-fuel ratio sensors 40 and 41, instead of the limit current type air-fuel ratio sensors of the structures shown in FIG. 2, for example, stacked structure limit current type air-fuel ratio sensors or other structures of limit current type air-fuel ratio sensors may be used. Further, as the air-fuel ratio sensors 40 and 41, it is also possible to use oxygen sensors which detect the concentration of oxygen without applying voltage between the electrodes.

<Double FB Control>

Next, the air-fuel ratio control in a control device of an internal combustion engine of the present embodiment will be explained in brief. In the control device of the present embodiment, basically, double feedback control is performed based on the output of the upstream air-fuel ratio sensor 40 and the output of the downstream air-fuel ratio sensor 41 for controlling the air-fuel ratio of the exhaust gas flowing into the exhaust purification catalyst 20 (below, referred to as "double FB control"). Therefore, first, the double FB control of the present embodiment will be explained.

In the double FB control of the present embodiment, feedback control is performed based on the air-fuel ratio corresponding to the output of the upstream air-fuel ratio sensor 40 (below, referred to as the "output air-fuel ratio") for controlling the fuel injection amount from the fuel injector 11 so that the output air-fuel ratio of the upstream air-fuel ratio sensor 40 becomes the target air-fuel ratio. That is, in the double FB control of the present embodiment, feedback control is performed based on the output air-fuel ratio of the upstream air-fuel ratio sensor 40 so that the air-fuel ratio of the exhaust gas flowing into the upstream side exhaust purification catalyst 20 becomes the target air-fuel ratio.

Further, in the double FB control of the present embodiment, the target air-fuel ratio is set based on the output air-fuel ratio of the downstream air-fuel ratio sensor 41 etc. In particular, in the double FB control of the present embodiment, the target air-fuel ratio is set based on the output air-fuel ratio of the downstream air-fuel ratio sensor 41 by double breakdown control. Specifically, in double breakdown control, when the output air-fuel ratio of the downstream air-fuel ratio sensor 41 becomes the rich air-fuel ratio, the target air-fuel ratio is set to the lean set air-fuel ratio. As a result, the air-fuel ratio of the exhaust gas flowing into the upstream side exhaust purification catalyst 20 also becomes the lean set air-fuel ratio. Here, the lean set air-fuel ratio is made a predetermined constant value air-fuel ratio a certain extent leaner than the stoichiometric air-fuel ratio (air-fuel ratio becoming control center), for example, 14.75. In addition, in the present embodiment, when the output air-fuel ratio of the downstream air-fuel ratio sensor 41 becomes a rich judged air-fuel ratio slightly richer than the stoichiometric air-fuel ratio (for example, 14.55) or becomes less, it is judged that the output air-fuel ratio of the downstream air-fuel ratio sensor 41 has become the rich air-fuel ratio.

In addition, in the double breakdown control of the present embodiment, when the output air-fuel ratio of the downstream air-fuel ratio sensor 41 becomes a lean air-fuel ratio, the target air-fuel ratio is set to the rich set air-fuel ratio. As a result, the air-fuel ratio of the exhaust gas flowing into the upstream side exhaust purification catalyst 20 also becomes the rich set air-fuel ratio. Here, the rich set air-fuel ratio is made a predetermined constant value air-fuel ratio a certain extent richer than the stoichiometric air-fuel ratio (air-fuel ratio becoming control center), for example, 14.50. In addition, in the present embodiment, when the output air-fuel ratio of the downstream air-fuel ratio sensor 41 becomes a lean judged air-fuel ratio slightly leaner than the stoichiometric air-fuel ratio (for example, 14.55) or becomes more, it is judged that the output air-fuel ratio of the downstream air-fuel ratio sensor 41 has become the lean air-fuel ratio.

Therefore, in the double breakdown control of the present embodiment, during the lean time period from when the output air-fuel ratio of the downstream air-fuel ratio sensor 41 becomes the rich judged air-fuel ratio or less to when the output air-fuel ratio of the downstream air-fuel ratio sensor 41 becomes the lean judged air-fuel ratio or more, the target air-fuel ratio is maintained at the lean air-fuel ratio. In addition, in the double breakdown control of the present embodiment, in the rich time period from when the output air-fuel ratio of the downstream air-fuel ratio sensor 41 becomes the lean judged air-fuel ratio or more to when the output air-fuel ratio of the downstream air-fuel ratio sensor 41 becomes the rich judged air-fuel ratio or less, the target air-fuel ratio is maintained at the rich air-fuel ratio. Note that, in the double breakdown control of the present embodiment, during the lean time period, the target air-fuel ratio is maintained at a certain lean set air-fuel ratio, while during the rich time period, the target air-fuel ratio is maintained at a certain rich set air-fuel ratio. In this Description, such double breakdown control is called "fixed double breakdown control".

Therefore, in the double FB control of the present embodiment, the target air-fuel ratio is set based on the output air-fuel ratio of the downstream air-fuel ratio sensor 41 by double breakdown control. In addition, in the double FB control of the present embodiment, the fuel injection amount from the fuel injector 11, that is, the air-fuel ratio of the exhaust gas flowing into the upstream side exhaust purification catalyst 20, is feedback controlled so that the set output air-fuel ratio of the upstream air-fuel ratio sensor 40 becomes the target air-fuel ratio.

<Explanation of Fixed Double Breakdown Control Using Time Chart>

Figure 5:
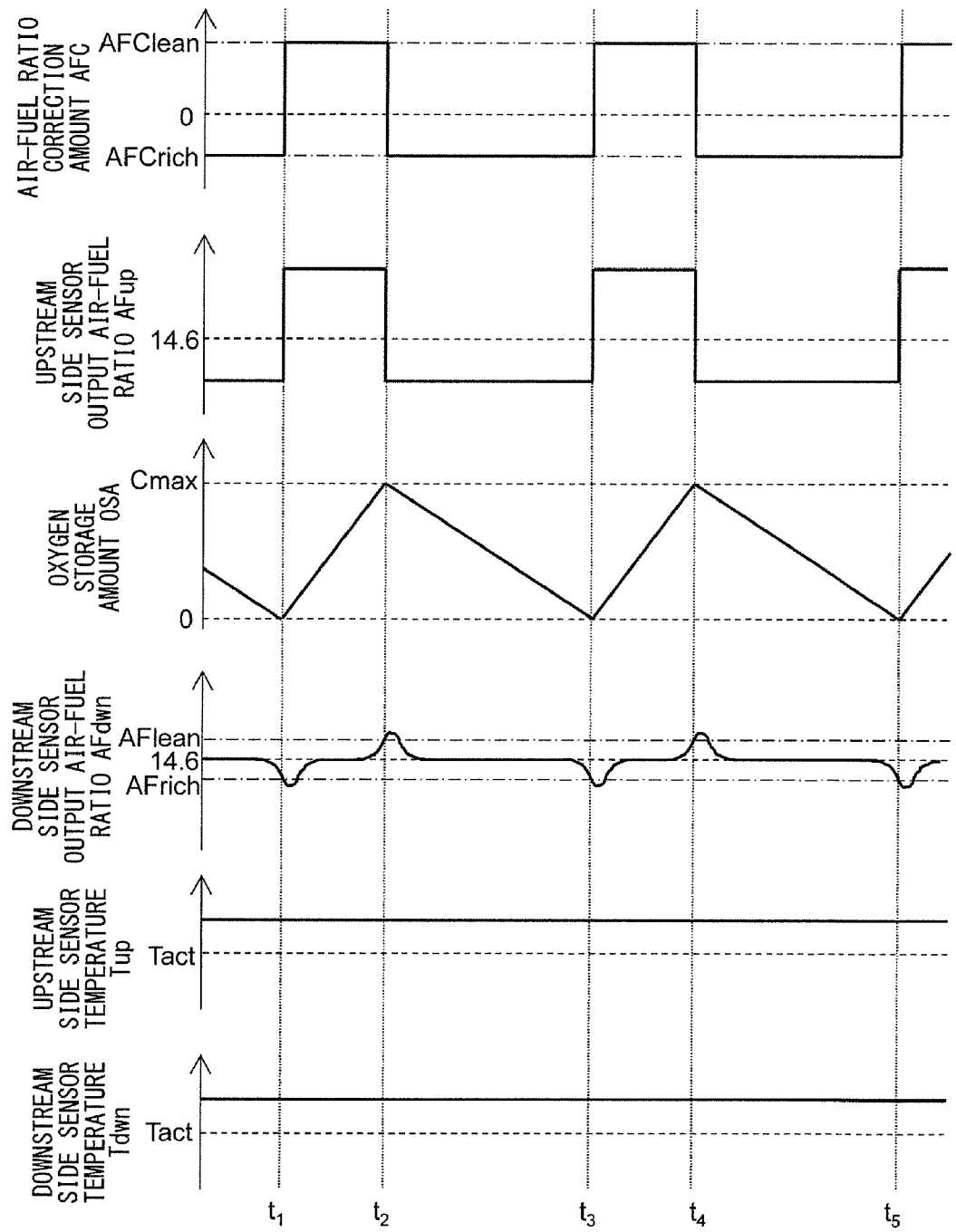
FIG. 5 is a time chart showing a change of an air-fuel ratio correction amount etc. in the case of performing double FB control.

Referring to FIG. 5, fixed double breakdown control will be explained in detail. FIG. 5 is a time chart of the air-fuel ratio correction amount AFC, output air-fuel ratio AFup of the upstream air-fuel ratio sensor 40, oxygen storage amount OSA of the upstream side exhaust purification catalyst 20, output air-fuel ratio AFdwn of the downstream air-fuel ratio sensor 41, temperature Tup of the upstream air-fuel ratio sensor 40, and temperature Tdwn of the downstream air-fuel ratio sensor 41 in the case of performing fixed double breakdown control.

Note that, the air-fuel ratio correction amount AFC is a correction amount relating to the target air-fuel ratio of the exhaust gas flowing into the upstream side exhaust purification catalyst 20. When the air-fuel ratio correction amount AFC is 0, the target air-fuel ratio is made an air-fuel ratio equal to the air-fuel ratio becoming the control center (below, referred to as the "control center air-fuel ratio") (in the present embodiment, stoichiometric air-fuel ratio). On the other hand, when the air-fuel ratio correction amount AFC is a positive value, the target air-fuel ratio becomes an air-fuel ratio leaner than the control center air-fuel ratio (in the present embodiment, lean air-fuel ratio), while when the air-fuel ratio correction amount AFC is a negative value, the target air-fuel ratio becomes an air-fuel ratio richer than the control center air-fuel ratio (in the present embodiment, rich air-fuel ratio). Further, the "control center air-fuel ratio" means the air-fuel ratio to which an air-fuel ratio correction amount AFC is added according to the engine operating state, that is, the air-fuel ratio becoming the reference when making the target air-fuel ratio change according to the air-fuel ratio correction amount AFC.

In the illustrated example, in the state before the time $t_1$, the air-fuel ratio correction amount AFC is made the rich set correction amount AFCrich (corresponding to rich set air-fuel ratio). That is, the target air-fuel ratio is made the rich air-fuel ratio and, along with this, the output air-fuel ratio of the upstream air-fuel ratio sensor 40 becomes a rich air-fuel ratio. The unburned gas contained in the exhaust gas flowing into the upstream side exhaust purification catalyst 20 is removed at the upstream side exhaust purification catalyst 20. Along with this, the oxygen storage amount OSA of the upstream side exhaust purification catalyst 20 gradually decreases. Due to the removal action at the upstream side exhaust purification catalyst 20, the exhaust gas flowing out from the upstream side exhaust purification catalyst 20 does not contain unburned gas etc., so the output air-fuel ratio AFdwn of the downstream air-fuel ratio sensor 41 becomes substantially the stoichiometric air-fuel ratio.

If the oxygen storage amount OSA of the upstream side exhaust purification catalyst 20 gradually decreases, the oxygen storage amount OSA approaches zero. Along with this, part of the unburned gas etc. flowing into the upstream side exhaust purification catalyst 20 starts to flow out at the upstream side exhaust purification catalyst 20 without being removed. Due to this, the output air-fuel ratio AFdwn of the downstream air-fuel ratio sensor 41 gradually falls. At the time $t_1$, the output air-fuel ratio AFdwn of the downstream air-fuel ratio sensor 41 reaches the rich judged air-fuel ratio AFrich.

In the present embodiment, if the output air-fuel ratio AFdwn of the downstream air-fuel ratio sensor 41 becomes the rich judged air-fuel ratio AFrich or less, the oxygen storage amount OSA is made to increase by the air-fuel ratio correction amount AFC being switched to the lean set correction amount AFClean (corresponding to lean set air-fuel ratio).

If, at the time $t_1$, switching the target air-fuel ratio to the lean air-fuel ratio, the air-fuel ratio of the exhaust gas flowing into the upstream side exhaust purification catalyst 20 changes from the rich air-fuel ratio to the lean air-fuel ratio. If, at the time $t_1$, the air-fuel ratio of the exhaust gas flowing into the upstream side exhaust purification catalyst 20 becomes the lean air-fuel ratio, the oxygen storage amount OSA of the upstream side exhaust purification catalyst 20 increases.

Due to this, the air-fuel ratio of the exhaust gas flowing out from the upstream side exhaust purification catalyst 20 changes to the stoichiometric air-fuel ratio and the output air-fuel ratio AFdwn of the downstream air-fuel ratio sensor 41 also converges to the stoichiometric air-fuel ratio. At this time, the air-fuel ratio of the exhaust gas flowing into the upstream side exhaust purification catalyst 20 becomes the lean air-fuel ratio, but there is a sufficient extra margin in the oxygen storage ability of the upstream side exhaust purification catalyst 20, so the oxygen in the inflowing exhaust gas is stored in the upstream side exhaust purification catalyst 20 and the $NO_X$ is removed by reduction. For this reason, the discharge of $NO_X$ from the upstream side exhaust purification catalyst 20 becomes substantially zero.

After that, if the oxygen storage amount OSA of the upstream side exhaust purification catalyst 20 gradually increases, the oxygen storage amount OSA approaches the maximum storable oxygen amount Cmax. Along with this, parts of the $NO_X$ and oxygen flowing into the upstream side exhaust purification catalyst 20 start to flow out without being removed by the upstream side exhaust purification catalyst 20. Due to this, the output air-fuel ratio AFdwn of the downstream air-fuel ratio sensor 41 gradually falls and, at the time $t_2$, reaches the lean judged air-fuel ratio AFlean.

In the present embodiment, if the output air-fuel ratio AFdwn of the downstream air-fuel ratio sensor 41 becomes the lean judged air-fuel ratio AFlean or more, the oxygen storage amount OSA is made to decrease by the air-fuel ratio correction amount AFC being switched to the rich set correction amount AFCrich (corresponding to rich set air-fuel ratio).

If, at the time $t_2$, the target air-fuel ratio is switched to the rich air-fuel ratio, the air-fuel ratio of the exhaust gas flowing into the upstream side exhaust purification catalyst 20 changes from the lean air-fuel ratio to the rich air-fuel ratio. The exhaust gas flowing into the upstream side exhaust purification catalyst 20 contains unburned gas etc., so the oxygen storage amount OSA of the upstream side exhaust purification catalyst 20 gradually decreases. The discharge of $NO_X$ from the upstream side exhaust purification catalyst 20 at this time becomes substantially zero.

If the oxygen storage amount OSA of the upstream side exhaust purification catalyst 20 gradually decreases, at the time $t_3$, in the same way as the time $t_1$, the output air-fuel ratio AFdwn of the downstream air-fuel ratio sensor 41 reaches the rich judged air-fuel ratio AFrich. Due to this, the air-fuel ratio correction amount AFC is switched to the lean set correction amount AFClean. After that, the cycle of the above-mentioned times $t_1$ to $t_3$ is repeated.

Note that, the control of the air-fuel ratio correction amount AFC in the present embodiment, that is, the control of the target air-fuel ratio, is performed by the ECU 31 functioning as the control device of the internal combustion engine. Therefore, the ECU 31 can be said to be provided with an air-fuel ratio control part controlling the air-fuel ratio of the exhaust gas flowing into the upstream side exhaust purification catalyst 20. Specifically, the air-fuel ratio control part sets the target air-fuel ratio of the exhaust gas flowing into the upstream side exhaust purification catalyst 20 to the lean air-fuel ratio continuously or intermittently from when the output air-fuel ratio of the downstream air-fuel ratio sensor 41 becomes the rich judged air-fuel ratio or less to when the output air-fuel ratio of the downstream air-fuel ratio sensor 41 becomes the lean judged air-fuel ratio or more. In addition, the air-fuel ratio control part sets the target air-fuel ratio of the exhaust gas flowing into the upstream side exhaust purification catalyst 20 to the rich air-fuel ratio continuously or intermittently from when the output air-fuel ratio of the downstream air-fuel ratio sensor 41 becomes the lean judged air-fuel ratio or more to when the output air-fuel ratio of the downstream air-fuel ratio sensor 41 becomes the rich judged air-fuel ratio or less.

<Sensor Temperature Control at Double FB Control>

In this regard, the air-fuel ratio sensors 40 and 41 cannot output currents corresponding to the air-fuel ratio of the exhaust gas around the air-fuel ratio sensors 40 and 41 if their temperatures are less than the activation temperature of the air-fuel ratio sensors 40 and 41 (for example, 500° C.).

Therefore, if the air-fuel ratio sensors 40 and 41 are less than the activation temperature, the air-fuel ratio sensor 41 cannot accurately detect the air-fuel ratio of the exhaust gas around the air-fuel ratio sensor 41. For this reason, when using the air-fuel ratio sensors 40 and 41 to detect the air-fuel ratio of the exhaust gas, the temperatures of the air-fuel ratio sensors 40 and 41 have to be maintained at the activation temperature or more.

For this reason, when performing the above-mentioned double FB control, the heater parts 56 are used to heat the air-fuel ratio sensors 40 and 41, in particular, the solid electrolyte layers 51 of the air-fuel ratio sensors 40 and 41. Due to this, as shown in FIG. 5, both the temperature Tup of the upstream air-fuel ratio sensor 40 and the temperature Tdwn of the downstream air-fuel ratio sensor 41 are maintained at the activation temperature Tact or more. In particular, in the present embodiment, the sensors are heated to a temperature a certain extent higher than the activation temperature Tact (for example, 700° C.) or so and are maintained at that temperature. Due to this, the air-fuel ratio sensors 40 and 41 can be used to accurately detect the air-fuel ratio of the exhaust gas around the air-fuel ratio sensors 40 and 41.

Note that, such temperature control of the air-fuel ratio sensors 40 and 41 is performed by the ECU 31 functioning as the control device of the internal combustion engine. Therefore, the ECU 31 can be said to be provided with a heater control part for controlling the heating of the upstream air-fuel ratio sensor 40 by the heater part (upstream side sensor heater) 56 of the upstream air-fuel ratio sensor 40 and the heating of the downstream air-fuel ratio sensor 41 by the heater part (downstream side sensor heater) 56 of the downstream air-fuel ratio sensor 41. The heating control part controls the heater parts 56 of these air-fuel ratio sensors 40 and 41 so that during operation of the internal combustion engine, the temperature of the upstream air-fuel ratio sensor 40 and the temperature of the downstream air-fuel ratio sensor 41 both become predetermined temperatures of the activation temperature or more.

Specifically, in the present embodiment, the temperatures of the air-fuel ratio sensors 40 and 41 are, for example, calculated based on the impedance between the electrodes 52 and 53. Further, the heater parts 56 of the air-fuel ratio sensors 40 and 41 are feedback controlled so that the calculated temperatures of the air-fuel ratio sensors 40 and 41 become the target temperature. As explained above, at the time of double FB control, this target temperature is set to a temperature a certain extent higher than the activation temperature (for example, 700° C.).

<Automatic Stop Function of Internal Combustion Engine>

In this regard, some vehicles mounting internal combustion engines have automatic stop functions by which the internal combustion engine will temporarily stop automatically in a state where the ignition key is turned ON. As one example of a mechanism for such an automatic stop, an engine automatic stop/restart mechanism may be mentioned. In an engine automatic stop/restart mechanism, for example, the internal combustion engine is made to automatically stop when the vehicle stops while waiting for a signal to change etc.

Specifically, in an engine automatic stop/restart mechanism, for example, the internal combustion engine is automatically stopped when the driver steps on the brake pedal (not shown) and the speed of the vehicle mounting the internal combustion engine is a predetermined speed or less. On the other hand, in an engine automatic stop/restart mechanism, if the amount of depression of the brake pedal by the driver becomes substantially zero, the internal combustion engine is made to automatically restart. Due to this, in the time period where a conventional internal combustion engine engages in idling operation, it is possible to make the internal combustion engine stop and therefore possible to improve the fuel economy of the internal combustion engine.

Further, as another example of a mechanism in which an automatic stop is performed, a hybrid mechanism using an internal combustion engine and motor to drive the vehicle may be mentioned. In a hybrid mechanism, for example, the vehicle is operated by only the drive power of the motor when the vehicle is operating at a low speed and the vehicle is operated by the drive power of not only the motor but also the internal combustion engine when the vehicle is operating at a medium or fast speed. Therefore, in a hybrid mechanism, the internal combustion engine is made to automatically stop not only when the vehicle is stopped but also when the vehicle is operating at a low speed. In addition, if the operating speed of the vehicle becomes a certain extent of speed or more or the amount of depression of the accelerator pedal 42 becomes a certain extent or more, the internal combustion engine is automatically made to restart. Alternatively, the internal combustion engine is automatically made to restart when the charging level of the battery for driving the motor becomes a certain level or less etc.

<Problem when Automatic Stop is Performed>

In this regard, while the internal combustion engine is stopped, there is no need to perform the above-mentioned double FB control. Therefore, while the internal combustion engine is stopped, the outputs of the air-fuel ratio sensors 40 and 41 are not utilized for control of the internal combustion engine or vehicle. On the other hand, considerable electric power is consumed at the air-fuel ratio sensors 40 and 41 for maintaining the temperatures of the air-fuel ratio sensors 40 and 41 at the activation temperature Tact or more by the heater parts 56. In particular, while the internal combustion engine is stopped, high temperature exhaust gas does not flow around the air-fuel ratio sensors 40 and 41, so the electric power for maintaining the temperatures of the air-fuel ratio sensors 40 and 41 at the activation temperature Tact or more increases.

For this reason, it may be considered to stop the supply of electric power to the heater parts 56 of the air-fuel ratio sensors 40 and 41 while the internal combustion engine is stopped when the automatic stop function of the internal combustion engine causes the internal combustion engine to automatically stop. Due to this, it is possible to keep down power consumption at the air-fuel ratio sensors 40 and 41.

However, in this case, while the internal combustion engine is stopped, the temperatures of the air-fuel ratio sensors 40 and 41 often fall to less than the activation temperature Tact. If in this way the temperatures of the air-fuel ratio sensors 40 and 41 end up falling to less than the activation temperature, a certain extent of time is required after restart of the internal combustion engine until the temperatures of the air-fuel ratio sensors 40 and 41 rise to the activation temperature Tact or more. Further, during the time period from when the internal combustion engine is restarted to when the temperatures of the air-fuel ratio sensors 40 and 41 rise to the activation temperature Tact or more, the air-fuel ratio sensors 40 and 41 cannot accurately detect the air-fuel ratio of the exhaust gas and accordingly the above-mentioned double FB control cannot be performed. As a result, there is possibility of the exhaust emission deteriorating during this time period.

On the other hand, it may be considered to continue supplying electric power to the heater parts 56 of the air-fuel ratio sensors 40 and 41 even when the automatic stop function of the internal combustion engine causes the internal combustion engine to be automatically stopped. Due to this, even while the internal combustion engine is stopped, the temperatures of the air-fuel ratio sensors 40 and 41 can be maintained at the activation temperature Tact or more. As a result, when the internal combustion engine is restarted, the air-fuel ratio sensors 40 and 41 can be used for air-fuel ratio control right after restart, so deterioration of exhaust emissions at the time of restart can be suppressed.

However, when the automatic stop function of the internal combustion engine causes the internal combustion engine to automatically stop, the outputs of the air-fuel ratio sensors 40 and 41 are not utilized while the internal combustion engine is stopped. Regardless of this, while the internal combustion engine is stopped, the temperatures of the air-fuel ratio sensors 40 and 41 are maintained at the activation temperature, so unnecessary power is consumed at the air-fuel ratio sensors 40 and 41 and in turn a deterioration of the fuel economy is invited.

<Control in Present Embodiment>

Therefore, in the control device of an internal combustion engine of the present embodiment, the heating control part is made to control the heater part 56 of the upstream air-fuel ratio sensor 40 so that the temperature of the upstream air-fuel ratio sensor 40 becomes less than the activation temperature during stopping of the internal combustion engine by the automatic stop function. In addition, the heating control part is made to control the heater part 56 of the downstream air-fuel ratio sensor 41 so that the temperature of the downstream air-fuel ratio sensor 41 becomes the activation temperature or more during stopping of the internal combustion engine by the automatic stop function. Further, the heating control part is made to control the heater part 56 of the downstream air-fuel ratio sensor 41 so that the temperature of not only the upstream air-fuel ratio sensor 40, but also the downstream air-fuel ratio sensor 41 becomes the activation temperature or more after the internal combustion engine is restarted after an automatic stop.

Furthermore, in the control device of an internal combustion engine of the present embodiment, the air-fuel ratio control part, as explained above, is made to control the air-fuel ratio of the exhaust gas flowing into the upstream side exhaust purification catalyst 20 during engine operation based on the output of the upstream air-fuel ratio sensor 40 and the output of the downstream air-fuel ratio sensor 41. In addition, the air-fuel ratio control part is made to control the air-fuel ratio of the exhaust gas flowing into the upstream side exhaust purification catalyst 20 even during engine operation temporarily after restart after the internal combustion engine stops by the automatic stop function without using the output of the upstream air-fuel ratio sensor 40 but based on the output of the downstream air-fuel ratio sensor 41. Further, the air-fuel ratio control part is made to control the air-fuel ratio of the exhaust gas flowing into the upstream side exhaust purification catalyst 20 from when the temperature of the downstream air-fuel ratio sensor 41 becomes the activation temperature or more when the internal combustion engine is restarted after being stopped by the automatic stop function based on the output of the upstream air-fuel ratio sensor 40 and the output of the downstream air-fuel ratio sensor 41.

Figure 6:
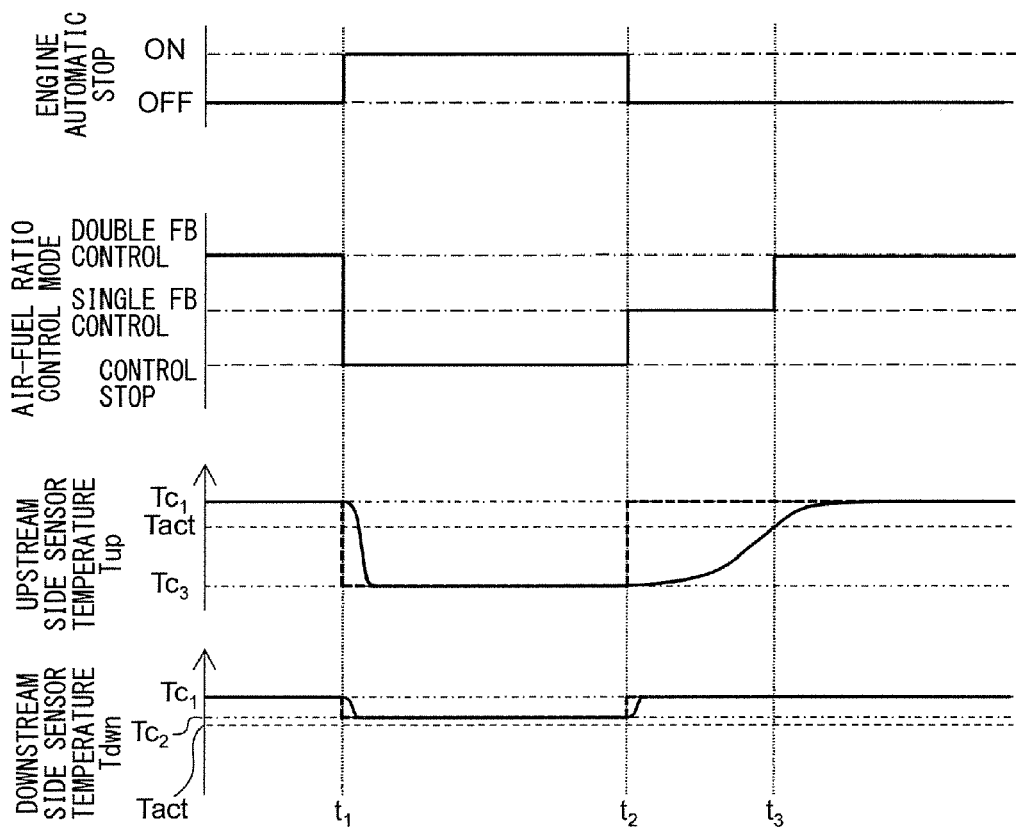
FIG. 6 is a time chart showing an operating state of an automatic stop mechanism of an internal combustion engine etc.

FIG. 6 is a time chart of the operation of the automatic stop mechanism of an internal combustion engine, the air-fuel ratio control mode, the temperature Tup of the upstream air-fuel ratio sensor 40, and the temperature Tdwn of the downstream air-fuel ratio sensor 41. In the figure, the broken line at the temperature Tup of the upstream air-fuel ratio sensor 40 shows the target temperature of the upstream air-fuel ratio sensor 40, while the broken line at the temperature Tdwn of the downstream air-fuel ratio sensor 41 shows the target temperature of the downstream air-fuel ratio sensor 41. Further, in the air-fuel ratio control mode, "double FB control" is a control mode performing double feedback control to control the air-fuel ratio based on the output of the upstream air-fuel ratio sensor 40 and the output of the downstream air-fuel ratio sensor 41. Further, in the air-fuel ratio control mode, "single FB control" is a control mode performing single feedback control controlling the air-fuel ratio based on the output of the downstream air-fuel ratio sensor 41 (below, referred to as "single FB control"). In addition, in the air-fuel ratio control mode, "control stop" is a control mode where air-fuel ratio control is not performed.

In the example shown in FIG. 6, before the time $t_1$, the internal combustion engine is not automatically stopped by the automatic stop function and is in the middle of operation. At this time, the air-fuel ratio control mode is the double FB control mode. Accordingly, air-fuel ratio control based on two air-fuel ratio sensors 40 and 41 is performed. Therefore, feedback control is performed based on the output air-fuel ratio AFup of the upstream air-fuel ratio sensor 40 so that the output air-fuel ratio AFup becomes the target air-fuel ratio. In addition, the target air-fuel ratio is set based on the output air-fuel ratio AFdwn of the downstream air-fuel ratio sensor 41 by fixed double breakdown control. Specifically, when the output air-fuel ratio AFdwn of the downstream air-fuel ratio sensor 41 becomes the rich judged air-fuel ratio AFrich or less, the air-fuel ratio correction amount AFC is switched from the rich set correction amount AFCrich to the lean set correction amount AFClean. In addition, when the output air-fuel ratio AFdwn of the downstream air-fuel ratio sensor 41 becomes the lean judged air-fuel ratio AFlean or more, the air-fuel ratio correction amount AFC is switched from the lean set correction amount AFClean to the rich set correction amount AFCrich.

Further, before the time $t_1$, the target temperature of the upstream air-fuel ratio sensor 40 and the target temperature of the downstream air-fuel ratio sensor 41 are set to a high first temperature (for example, 700° C.) $Tc_1$ of the activation temperature (for example, 500° C.) or more. Due to this, the heater parts 56 of the air-fuel ratio sensors 40 and 41 are controlled so that the temperatures of the air-fuel ratio sensors 40 and 41 become the first temperature $Tc_1$. In the illustrated example, before the time $t_1$, the temperatures of the air-fuel ratio sensors 40 and 41 are maintained at the first temperature $Tc_1$.

In the example shown in FIG. 6, at the time $t_1$, the internal combustion engine is made to automatically stop by the automatic stop function. Due to this, fuel is no longer fed from the fuel injector 11. For this reason, the air-fuel ratio control mode is switched from the double FB control mode to the control stop mode. As a result, control determining the amount of fuel fed from the fuel injector 11, that is, air-fuel ratio control, is no longer performed.

Further, in the present embodiment, if, at the time $t_1$, the internal combustion engine is made to automatically stop by the automatic stop function, the target temperature of the upstream air-fuel ratio sensor 40 is made to decrease. The target temperature of the upstream air-fuel ratio sensor 40 is made to decrease to a third temperature (for example, 200° C.) $Tc_3$ less than the activation temperature Tact. Therefore, from the time $t_1$ on, the heater part 56 of the upstream air-fuel ratio sensor 40 is controlled so that the temperature Tup of the upstream air-fuel ratio sensor 40 becomes the third temperature $Tc_3$. In particular, in the present embodiment, the third temperature $Tc_3$ is made a temperature so that even if the supply of power to the heater part 56 of the upstream air-fuel ratio sensor 40 is stopped, the temperature Tdwn of the downstream air-fuel ratio sensor 41 is not reached for a certain extent of time. As a result, in the present embodiment, at the time $t_1$ on, the supply of power to the heater part 56 of the downstream air-fuel ratio sensor 41 is made to stop.

Note that, in the example shown in FIG. 6, while the internal combustion engine is automatically stopped by the automatic stop function, the target temperature of the upstream air-fuel ratio sensor 40 is not set to the third temperature $Tc_3$ but the power supply to the downstream air-fuel ratio sensor 41 is simply stopped. By stopping the supply of power in this way, the temperature of the downstream air-fuel ratio sensor 41 can be made less than the activation temperature Tact.

On the other hand, at the time $t_1$, the target temperature of the downstream air-fuel ratio sensor 41 is lowered to a second temperature (for example, 600° C.) $Tc_2$ of the activation temperature Tact or more. At the time $t_1$ on, the heater part 56 of the upstream air-fuel ratio sensor 40 is controlled so that the temperature Tup of the upstream air-fuel ratio sensor 40 becomes the second temperature Tc2.

After that, in the example shown in FIG. 6, at the time $t_2$, the stopped state of the internal combustion engine by the automatic stop mechanism is made to end. Therefore, at the time $t_2$, the internal combustion engine is made to restart. Along with this, at the time $t_2$, the target temperature of the upstream air-fuel ratio sensor 40 and the target temperature of the downstream air-fuel ratio sensor 41 are both switched to the first temperature $Tc_1$.

Here, at the time $t_2$, the temperature Tdwn of the downstream air-fuel ratio sensor 41 becomes a second temperature $Tc_2$ of the activation temperature Tact or more. On the other hand, the temperature Tup of the upstream air-fuel ratio sensor 40 becomes a third temperature $Tc_3$ of less than the activation temperature Tact. Therefore, at the point of time of the time $t_2$, the output of the downstream air-fuel ratio sensor 41 accurately expresses the exhaust air-fuel ratio, but the output of the upstream air-fuel ratio sensor 40 may not express the exhaust air-fuel ratio.

Further, at the time $t_2$, the target temperatures of the air-fuel ratio sensors 40 and 41 are switched to the first temperature $Tc_1$, so the heater parts 56 of these air-fuel ratio sensors 40 and 41 are used for heating. However, raising the temperature of the upstream air-fuel ratio sensor 40 by heating of the heater part 56 to the activation temperature Tact or more takes a certain extent of time. Therefore, for a certain extent of time from the time $t_2$, the output air-fuel ratio of the downstream air-fuel ratio sensor 41 cannot be used for air-fuel ratio control.

Therefore, in the present embodiment, if, at the time $t_2$, the internal combustion engine is restarted, not the above-mentioned double FB control, but single FB control is performed. In single FB control, as explained later, the air-fuel ratio of the exhaust gas flowing into the upstream side exhaust purification catalyst 20 is control without using the output of the upstream air-fuel ratio sensor 40, but based on the output of the downstream air-fuel ratio sensor 41.

After that, in the example shown in FIG. 6, at the time $t_3$, the temperature of the upstream air-fuel ratio sensor 40 rises to the activation temperature Tact or more. Therefore, at the time $t_3$ on, the output of the upstream air-fuel ratio sensor 40 accurately expresses the exhaust air-fuel ratio. For this reason, in the present embodiment, if the internal combustion engine is restarted after automatic stop, at the time $t_3$ when the temperature Tup of the upstream air-fuel ratio sensor 40 becomes the activation temperature Tact or more and on, the above-mentioned double FB control is performed. As explained above, in double FB control, the air-fuel ratio of the exhaust gas flowing into the upstream side exhaust purification catalyst 20 is controlled based on the output of the upstream air-fuel ratio sensor 40 and the output of the downstream air-fuel ratio sensor 41.

<Single FB Control>

Next, single FB control will be explained. In the single FB control of the present embodiment, in the same way as the above-mentioned double FB control, due to the fixed double breakdown control, the target air-fuel ratio is set based on the output air-fuel ratio AFdwn of the downstream air-fuel ratio sensor 41. On the other hand, in the above-mentioned double FB control, feedback control is performed based on the output air-fuel ratio of the upstream air-fuel ratio sensor 40 so that the air-fuel ratio of the exhaust gas flowing into the upstream side exhaust purification catalyst 20 becomes the target air-fuel ratio. As opposed to this, in single FB control, the output of the upstream air-fuel ratio sensor 40 is not utilized. Control of the fuel injection amount from the fuel injector 11, that is, the air-fuel ratio of the exhaust gas flowing into the upstream side exhaust purification catalyst 20, is performed based on the amount of intake air supplied to the inside of the combustion chamber 5 and the target air-fuel ratio.

Specifically, in the present embodiment, the amount of intake air to each cylinder is calculated based on the air flow rate detected by the air flow meter 39. The thus calculated amount of intake air is divided by the target air-fuel ratio calculated as explained above based on the output air-fuel ratio AFdwn of the downstream air-fuel ratio sensor 41 so as to calculate the fuel injection amount from the fuel injector 11. Due to double FB control, when feedback control is performed based on the output air-fuel ratio of the upstream air-fuel ratio sensor 40, the thus calculated fuel injection amount is corrected based on the output air-fuel ratio of the upstream air-fuel ratio sensor 40. However, during single FB control, fuel is injected from the fuel injector 11 as is without the fuel injection amount calculated in the above-mentioned way being corrected. Therefore, in single FB control, feedback control is performed based on the output air-fuel ratio of the downstream air-fuel ratio sensor 40 to set the target air-fuel ratio, but in addition to this, feed forward control may be performed so that the air-fuel ratio of the exhaust gas flowing into the upstream side exhaust purification catalyst 20 becomes the target air-fuel ratio.

<Air-Fuel Ratio Correction Amount at Single FB Control and Double FB Control>

Figure 7:
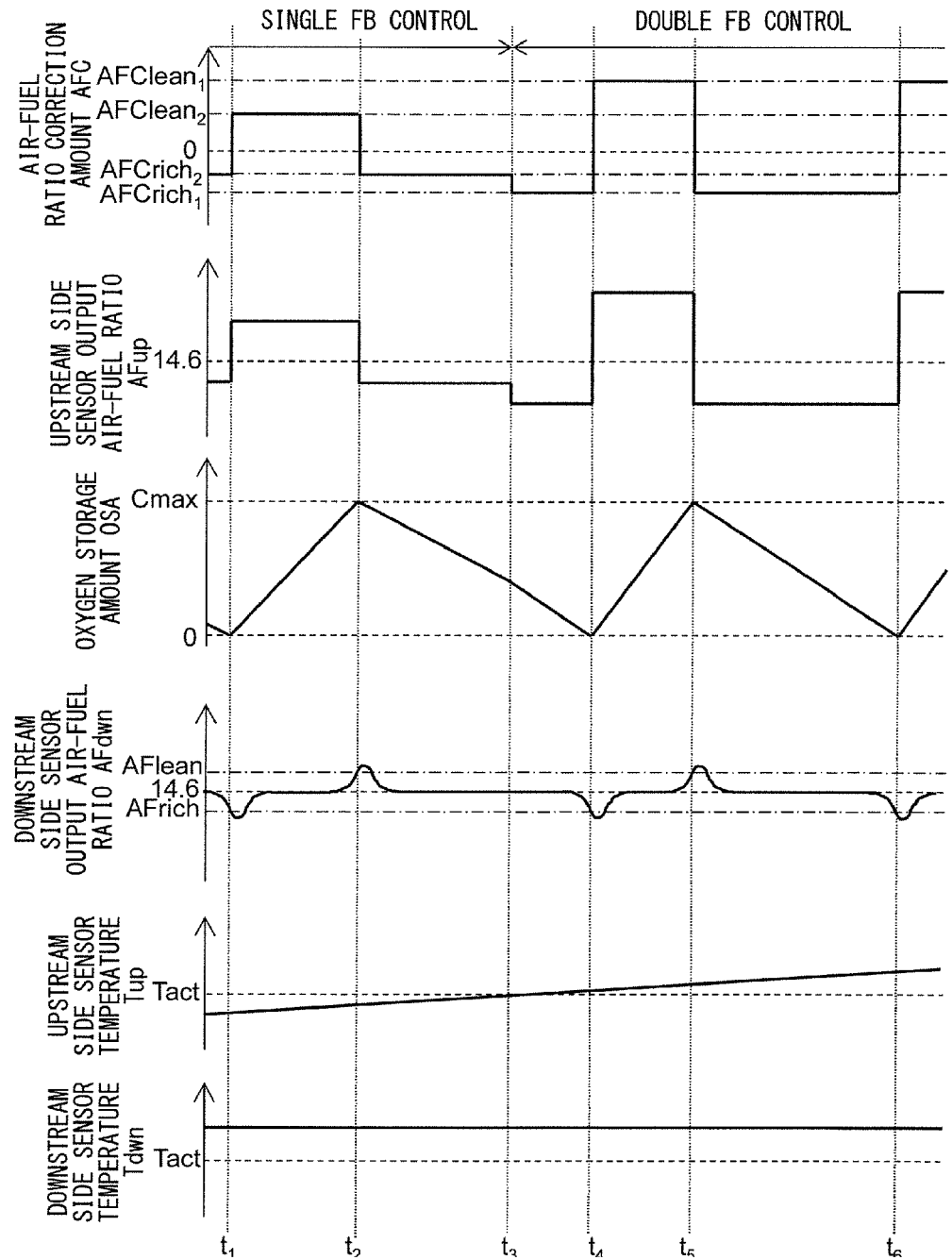
FIG. 7 is a time chart showing the air-fuel ratio correction amount AFC etc. around a time $t_2$ of FIG. 6.

FIG. 7 is a time chart of the air-fuel ratio correction amount AFC etc. around the time $t_2$ of FIG. 6. In the example shown in FIG. 7, at the time $t_3$, the temperature Tup of the upstream air-fuel ratio sensor 40 becomes the activation temperature Tact or more (corresponding to time $t_2$ of FIG. 6). Therefore, before the time $t_3$, single FB control is performed, while from the time $t_3$ on, double FB control is performed.

As will be understood from FIG. 7, before the time $t_3$ when single FB control is being performed, the air-fuel ratio correction amount AFC is alternately switched by fixed double breakdown control between the second rich set correction amount $AFCrich_2$ and the second lean set correction amount $AFClean_2$. Therefore, before the time $t_3$, the air-fuel ratio correction amount AFC is switched to the second lean set correction amount $AFClean_2$ when the output air-fuel ratio AFdwn of the downstream air-fuel ratio sensor 41 becomes the rich judged air-fuel ratio AFrich or less. In addition, when the output air-fuel ratio AFdwn of the downstream air-fuel ratio sensor 41 becomes the lean judged air-fuel ratio AFlean or more, the air-fuel ratio correction amount AFC is switched to the second rich set correction amount $AFCrich_2$.

On the other hand, at the time $t_3$ when double FB control is performed and on, due to fixed double breakdown control, the air-fuel ratio correction amount AFC is switched between the first rich set correction amount $AFCrich_1$ and the first lean set correction amount $AFClean_2$. Therefore, when, at time $t_3$ on, the output air-fuel ratio AFdwn of the downstream air-fuel ratio sensor 41 becomes the rich judged air-fuel ratio AFrich or less, the air-fuel ratio correction amount AFC is switched to the first lean set correction amount $AFClean_1$. In addition, when the output air-fuel ratio AFdwn of the downstream air-fuel ratio sensor 41 becomes the lean judged air-fuel ratio AFlean or more, the air-fuel ratio correction amount AFC is switched to the first rich set correction amount $AFCrich_1$.

Here, the second rich set correction amount $AFCrich_2$ is made a value smaller in absolute value than the first rich set correction amount $AFCrich_1$. Therefore, the second rich set air-fuel ratio corresponding to the second rich set correction amount $AFCrich_2$ is smaller in rich degree than the first rich set air-fuel ratio corresponding to the first rich set correction amount $AFCrich_1$. In addition, the second lean set correction amount $AFClean_2$ is made a value smaller in absolute value than the first lean set correction amount $AFClean_1$. Therefore, the second lean set air-fuel ratio corresponding to the second lean set correction amount $AFClean_2$ is smaller in lean degree than the first lean set air-fuel ratio corresponding to the first lean set correction amount $AFClean_1$ <Effect Due to Control in Present Embodiment Etc.>

As explained above, according to the present embodiment, during stopping of the internal combustion engine by the automatic stop function, the temperature of the upstream air-fuel ratio sensor 40 is lowered to less than the activation temperature Tact. For this reason, electric power is kept from being consumed so as to maintain the temperature Tdwn of the upstream air-fuel ratio sensor 40 at the activation temperature Tact or more while the internal combustion engine is stopped. As a result, according to the present embodiment, the fuel economy of the internal combustion engine can be improved.

Further, according to the present embodiment, right after making the internal combustion engine restart after stopping by the automatic stop function, feedback control is performed based on the output of the downstream air-fuel ratio sensor 41 without using the output of the upstream air-fuel ratio sensor 40 (single FB control). Even if performing feedback control based on only the output of the downstream air-fuel ratio sensor 41 in this way, if a short time period, almost no unburned gas or $NO_X$ flows out from the upstream side exhaust purification catalyst 20 and the output is maintained. Therefore, even if making the internal combustion engine restart after an automatic stop, the exhaust emission does not deteriorate much at all. Therefore, according to the present embodiment, it is possible to keep the power consumption at the heater parts 56 of the air-fuel ratio sensors 40 and 41 small while suppressing deterioration of the exhaust emissions right after engine restart.

Further, in the present embodiment, if, at the time $t_3$ shown in FIG. 6, the temperature Tdwn of the downstream air-fuel ratio sensor 41 becomes the activation temperature Tact or more, single FB control is switched to double FB control. Therefore, it is possible to keep the time period during which single FB control, where the exhaust emission may deteriorate, as short as possible.

In addition, in the present embodiment, compared with during double FB control, during single FB control, the absolute value of the air-fuel ratio correction amount is made smaller. If making the absolute value of the air-fuel ratio correction amount smaller in this way, even if the actual air-fuel ratio of the exhaust gas flowing into the upstream air-fuel ratio sensor 40 deviates from the target air-fuel ratio, the actual air-fuel ratio is kept from ending up greatly deviating from the stoichiometric air-fuel ratio. Due to this, it is possible to suppress deterioration of the exhaust emission while double FB control is being performed.

Furthermore, in the present embodiment, during an automatic stop of the internal combustion engine, the temperature of the downstream air-fuel ratio sensor 40 is made to decrease compared with during operation of the internal combustion engine. Below, the reason for setting the temperature of the downstream air-fuel ratio sensor 40 in this way will be explained.

Figure 8:
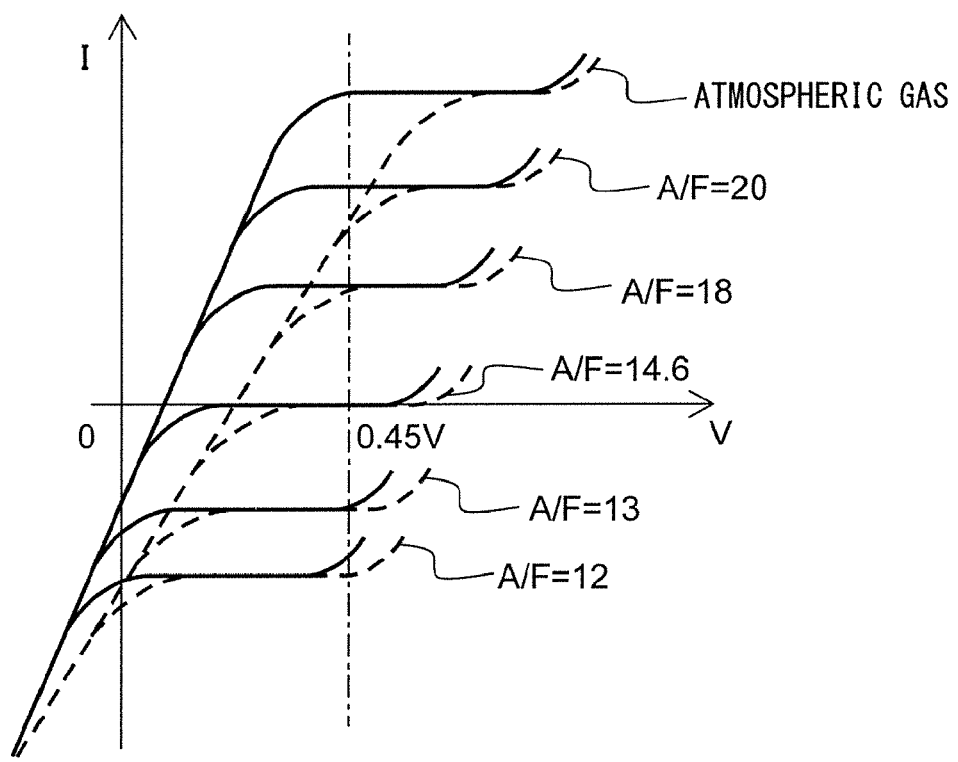
FIG. 8 is a view, similar to FIG. 3, showing the voltage-current (V-I) characteristic of an air-fuel ratio sensor.

FIG. 8 is a view, similar to FIG. 3, showing the voltage-current (V-I) characteristic of the air-fuel ratio sensors 40 and 41. In FIG. 8, the solid lines show the case where the temperatures of the air-fuel ratio sensors 40 and 41 are high (for example, 700° C.), while the broken lines show the case where the temperatures of the air-fuel ratio sensors 40 and 41 are low though the activation temperature or more (for example, 600° C.).

As shown in FIG. 8 by the one-dot chain line, consider the case of making the applied voltage to the air-fuel ratio sensors 40 and 41 0.45V. In this case, if the temperatures of the air-fuel ratio sensors 40 and 41 are high, the one-dot chain line showing 0.45V of FIG. 8 intersects the limit current region at various air-fuel ratios. Therefore, if the temperatures of the air-fuel ratio sensors 40 and 41 are high, it is possible to detect the air-fuel ratio at a broad range of air-fuel ratios. On the other hand, if the temperatures of the air-fuel ratio sensors 40 and 41 are low, the one-dot chain line showing 0.45V of FIG. 8 intersects the limit current region only when the exhaust air-fuel ratio is near the stoichiometric air-fuel ratio. Therefore, if the temperatures of the air-fuel ratio sensors 40 and 41 are low, the exhaust air-fuel ratio can only be detected in a narrow range.

In addition, the higher the temperatures of the air-fuel ratio sensors 40 and 41, the faster the speed of movement of the oxygen ions in the solid electrolyte layers 51. For this reason, the speeds of response of the air-fuel ratio sensors 40 and 41 become faster.

Here, if just performing the above-mentioned double FB control or single FB control, the ranges of detection of the air-fuel ratio sensors 40 and 41 do not necessarily have to be broad. Further, the speeds of response at the air-fuel ratio sensors 40 and 41 do not have to be fast. However, when diagnosing the air-fuel ratio sensors 40 and 41 for abnormality, it is required that the ranges of detection of the air-fuel ratio sensors 40 and 41 be broad and the speeds of response be fast. In particular, when diagnosing the air-fuel ratio sensors 40 and 41 for abnormality, a limit current has to be generated if atmospheric gas flows around the air-fuel ratio sensors 40 and 41. Therefore, during the double FB control or single FB control in which upstream air-fuel ratio sensor 40 can be diagnosed for abnormality, the temperature of the upstream air-fuel ratio sensor 40 is made the limit temperature where a limit current can be generated even if atmospheric gas flows around the surroundings (for example, 700° C.) or more.

On the other hand, the air-fuel ratio sensors 40 and 41 are not diagnosed for abnormality while the internal combustion engine is stopped. Therefore, while the internal combustion engine is stopped, the temperatures of the air-fuel ratio sensors 40 and 41 do not have to be maintained high. For this reason, in the present embodiment, the temperature of the downstream air-fuel ratio sensor 41 is made to decrease during stopping of the internal combustion engine by the automatic stop function compared with during operation of the internal combustion engine. Specifically, the temperature of the downstream air-fuel ratio sensor 41 is made to decrease to a temperature less than the above-mentioned limit temperature and the activation temperature or more. Due to this, the power consumption at the heater part 56 of the downstream air-fuel ratio sensor 41 can be suppressed.

Note that, in the above embodiment, during stopping of the internal combustion engine by the automatic stop function, the heater part 56 of the downstream air-fuel ratio sensor 41 is controlled so that the temperature of the downstream air-fuel ratio sensor 41 becomes the activation temperature or more. However, it is not necessarily required to control the temperature of the downstream air-fuel ratio sensor 41 to become the activation temperature or more during stopping of the internal combustion engine by the automatic stop function. Therefore, for example, if heating the downstream air-fuel ratio sensor 41 by the heater part 56 so that the temperature of the downstream air-fuel ratio sensor becomes a temperature higher than the upstream air-fuel ratio sensor 40 during stopping of the internal combustion engine by the automatic stop function, the heater part 56 may be controlled so that the temperature of the downstream air-fuel ratio sensor 41 becomes less than the activation temperature. Due to this, even if the downstream air-fuel ratio sensor 41 does not become the activation temperature or more at the time of restart of the internal combustion engine, the temperature of the downstream air-fuel ratio sensor 41 can be made to quickly rise to the activation temperature or more after restart.

Alternatively, during stopping of the internal combustion engine by the automatic stop function, the temperature may be maintained at the predetermined lower limit temperature less than the activation temperature or at more. Here, the "lower limit temperature" is a temperature at which the temperature of the downstream air-fuel ratio sensor 41 reaches the activation temperature faster than the temperature of the upstream air-fuel ratio sensor 40 when the internal combustion engine is restarted after being stopped by the automatic stop function and the heater part 56 of the upstream air-fuel ratio sensor 40 and the heater part 56 of the downstream air-fuel ratio sensor 41 are used to heat the upstream air-fuel ratio sensor 40 and the downstream air-fuel ratio sensor 41. Due to this, at the time of restart of the internal combustion engine, even if the downstream air-fuel ratio sensor 41 has not become the activation temperature or more, the temperature of the downstream air-fuel ratio sensor 41 can be made to rise to the activation temperature or more faster than the upstream air-fuel ratio sensor 40 after restart.

Further, in the above embodiment, at the time $t_3$ when the temperature Tup of the upstream air-fuel ratio sensor 40 becomes the activation temperature or more, single FB control is switched to double FB control. However, single FB control may be switched to double FB control at any timing so long as after the temperature Tup of the upstream air-fuel ratio sensor 40 becomes the activation temperature or more or so long as after it is estimated that the temperature Tdwn of the downstream air-fuel ratio sensor 41 has become the activation temperature or more. Therefore, for example, it may be switched after the heater part 56 of the downstream air-fuel ratio sensor 41 starts being powered and a sufficient time has elapsed for the temperature of the downstream air-fuel ratio sensor 41 to become the activation temperature or more etc.

<Flow Chart of Control in Present Embodiment>

Figure 9:
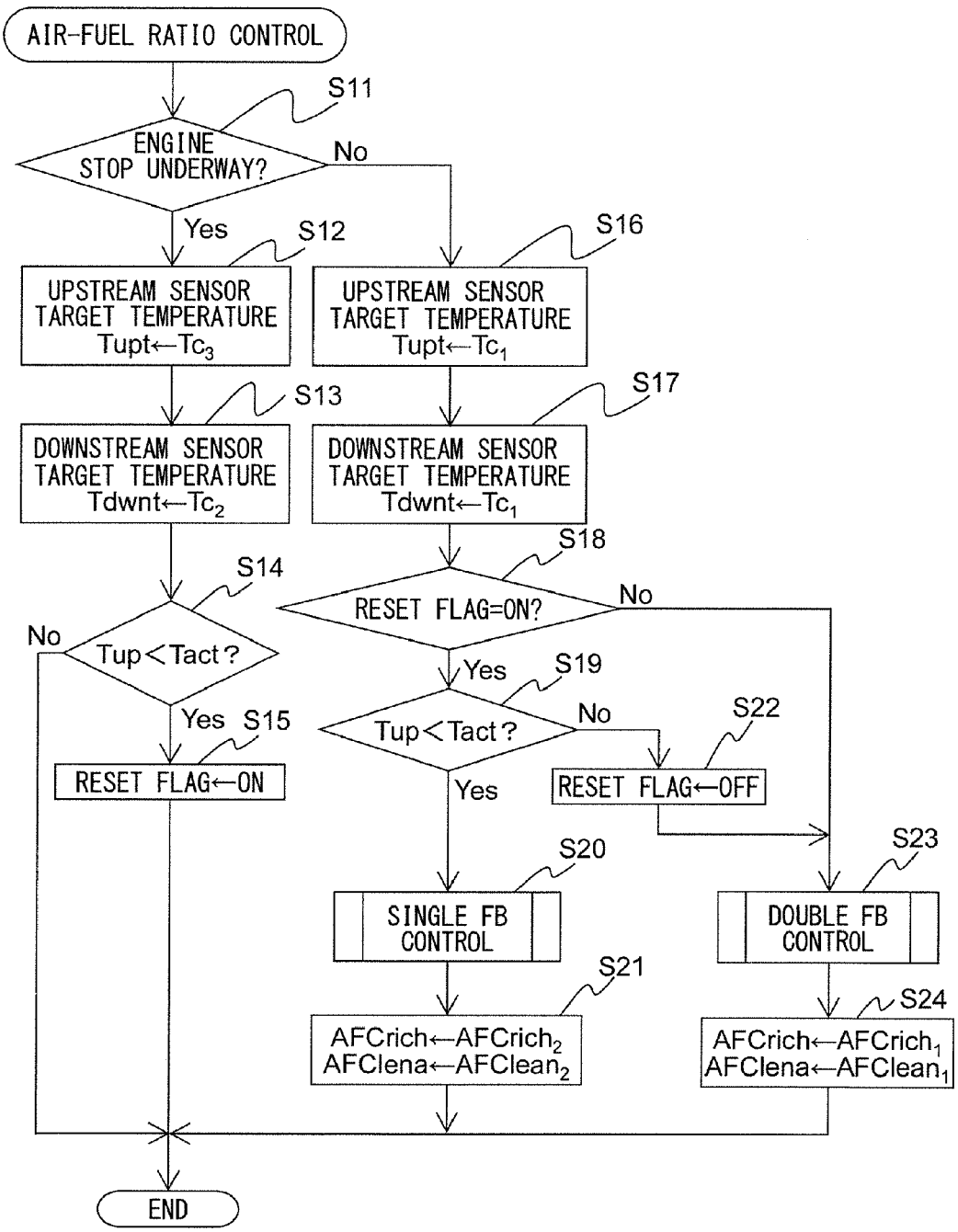
FIG. 9 is a flow chart showing a control routine of temperature control and air-fuel ratio control.

Next, referring to FIG. 9 to FIG. 12, a control device in the above embodiment will be explained in detail. FIG. 9 is a flow chart of the control routine of the temperature control and air-fuel ratio control performed by the control device in the present embodiment. The illustrated control routine is performed by interruption at certain time intervals.

As shown in FIG. 9, first, at step S11, it is judged if the internal combustion engine is stopped due to the automatic stop function. When the internal combustion engine is stopped, the routine proceeds to step S12. At step S12, the target temperature Tupt of the upstream air-fuel ratio sensor 40 is set to the above-mentioned third temperature $Tc_3$ ($Tc_3$<Tact). As a result, the heating control part controls the heater part 56 of the upstream air-fuel ratio sensor 40 so that the temperature of the upstream air-fuel ratio sensor 40 becomes the third temperature $Tc_3$. Next, at step S13, the target temperature Tdwnt of the downstream air-fuel ratio sensor 41 is set to the above-mentioned second temperature $Tc_2$ ($Tc_2$>$Tc_3$, $Tc_2$>Tact). As a result, the heating control part controls the heater part 56 of the downstream air-fuel ratio sensor 41 so that the temperature of the downstream air-fuel ratio sensor 41 becomes the second temperature $Tc_2$.

Next, at step S14, it is judged if the temperature Tup of the upstream air-fuel ratio sensor 40 is less than the activation temperature Tact. If it is judged that the temperature Tup is the activation temperature Tact or more, the control routine is made to end. On the other hand, when, at step S14, it is judged that the temperature Tup of the upstream air-fuel ratio sensor 40 is less than the activation temperature Tact, the routine proceeds to step S15. At step S15, the reset flag is set ON. The reset flag is a flag set on after an automatic stop of the internal combustion engine while the temperature of the upstream air-fuel ratio sensor 41 is less than the activation temperature Tact and set OFF otherwise. Note that, the reset flag is set OFF in the initial state.

After that, if the internal combustion engine is made to restart, at the next control routine, at step S11, it is judged that the internal combustion engine is not stopped due to the automatic stop function and the routine proceeds to step S16. At step S16, the target temperature Tupt of the upstream air-fuel ratio sensor 40 is set to the above-mentioned first temperature $Tc_1$ ($Tc_1$>$Tc_2$). Next, at step S17, the target temperature Tdwnt of the downstream air-fuel ratio sensor 41 is set to the above-mentioned first temperature $Tc_1$. As a result, the heating control part controls the heater parts 56 of the air-fuel ratio sensors so that the temperatures of the upstream air-fuel ratio sensor 40 and the downstream air-fuel ratio sensor 41 become the first temperature $Tc_1$. Next, at step S18, it is judged if the reset flag is set ON. When it is judged that the reset flag is set ON, the routine proceeds to step S19.

At step S19, it is judged if the temperature Tup of the upstream air-fuel ratio sensor 40 is less than the activation temperature Tact. When, at step S19, it is judged that the temperature Tup of the upstream air-fuel ratio sensor 40 is less than the activation temperature Tact, the routine proceeds to step S20. In this case, the output of the upstream air-fuel ratio sensor 40 cannot be utilized, so at step S20, the above-mentioned single FB control is performed. Specifically, in this case, air-fuel ratio control is performed based on the block diagram shown in FIG. 11. Next, at step S21, the rich set correction amount AFCrich is set to the second rich set correction amount $AFCrich_2$, while the lean set correction amount AFClean is set to the second lean set correction amount $AFClean_2$.

After that, if the temperature Tup of the upstream air-fuel ratio sensor 40 rises and becomes the activation temperature Tact or more, at the next control routine, the routine proceeds from step S19 to step S22. At step S22, the reset flag is reset OFF, then the routine proceeds to step S23. At step S23, the output of the upstream air-fuel ratio sensor 40 can be utilized, so at step S23, the above-mentioned double FB control is performed. Specifically, air-fuel ratio control is performed based on the block diagram shown in FIG. 10. Next, at step S24, the rich set correction amount AFCrich is set to the first rich set correction amount $AFCrich_1$, while the lean set correction amount AFClean is set to the first lean set correction amount $AFClean_1$. At the next control routine, the reset flag is set OFF, so the routine proceeds from steps S18 to step S23 where double FB control is continued.

<Functional Block Diagram>

Figure 10:
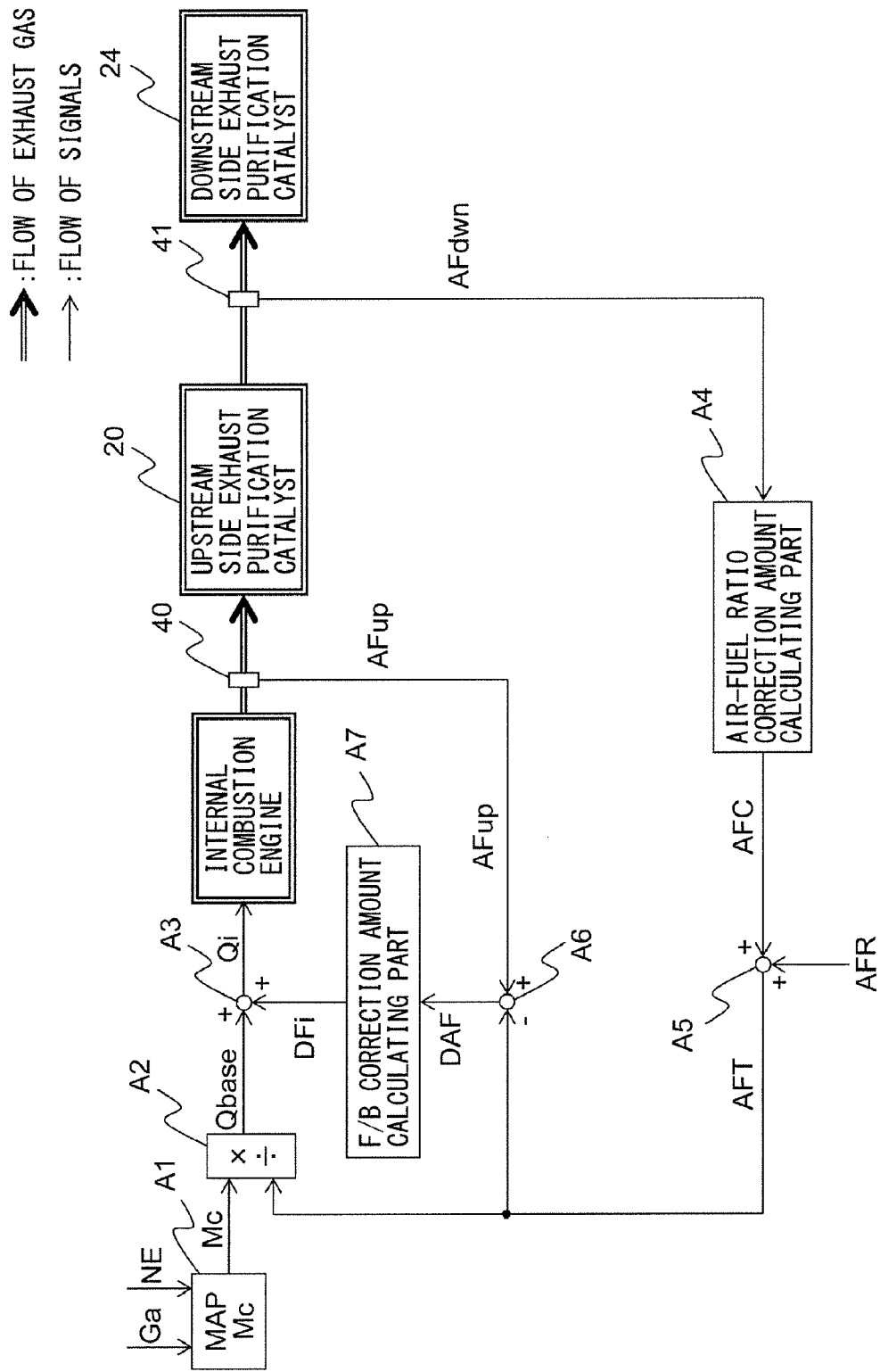
FIG. 10 is a functional block diagram of a control device of an internal combustion engine.

In the present embodiment, the air-fuel ratio control part performing air-fuel ratio control is configured including the functional blocks A1 to A7 as shown in the functional block diagram of FIG. 10. Below, the functional blocks will be explained while referring to FIG. 10. The operations of these functional blocks A1 to A7 are basically performed at the ECU 31.

<Calculation of Fuel Injection Amount>

First, calculation of the fuel injection amount will be explained. In calculation of the fuel injection amount, the cylinder intake air calculating part A1, basic fuel injection amount calculating part A2, and fuel injection amount calculating part A3 are used.

The cylinder intake air calculating part A1 uses the intake air flow rate Ga, engine speed NE, and map or calculation formula stored in the ROM 33 of the ECU 31 to calculate the intake air amount Mc of each cylinder. The intake air flow rate Ga is measured by the air flow meter 39, while the engine speed NE is calculated based on the output of the crank angle sensor 44.

The basic fuel injection amount calculating part A2 divides the cylinder intake air amount Mc calculated by the cylinder intake air amount calculating part A1 by the target air-fuel ratio AFT to calculate the basic fuel injection amount Qbase (Qbase=Mc/AFT). The target air-fuel ratio AFT is calculated by the later explained target air-fuel ratio setting means A5.

The fuel injection amount calculating part A3 adds to the basic fuel injection amount Qbase calculated by the basic fuel injection amount calculating part A2 the later explained F/B correction amount DFi to calculate the fuel injection amount Qi (Qi=Qbase+DFi). The thus calculated fuel injection amount Qi of fuel is injected from a fuel injector 11 by an injection instruction being given to the fuel injector 11.

<Calculation of Target Air-Fuel Ratio>

Next, calculation of the target air-fuel ratio will be explained. In calculating the target air-fuel ratio, an air-fuel ratio correction amount calculating part A4 and target air-fuel ratio setting part A5 are used.

The air-fuel ratio correction amount calculating part A4 calculates the air-fuel ratio correction amount AFC of the target air-fuel ratio based on the output air-fuel ratio AFdwn of the downstream air-fuel ratio sensor 41. Specifically, the air-fuel ratio correction amount AFC is calculated based on the flow chart shown in FIG. 12.

The target air-fuel ratio setting part A5 adds to the control center air-fuel ratio (in the present embodiment, the stoichiometric air-fuel ratio) AFR the air-fuel ratio correction amount AFC calculated by the air-fuel ratio correction amount calculating part A4 to calculate the target air-fuel ratio AFT. The thus calculated target air-fuel ratio AFT is input to the basic fuel injection amount calculating part A2 and later explained air-fuel ratio difference calculating part A6.

<Calculation of F/B Correction Amount>

Next, the calculation of the F/B correction amount based on the output air-fuel ratio AFup of the upstream air-fuel ratio sensor 40 will be explained. In calculation of the F/B correction amount, the air-fuel ratio difference calculating part A6 and F/B correction amount calculating part A7 are used.

The air-fuel ratio difference calculating part A6 subtracts from the output air-fuel ratio AFup of the upstream air-fuel ratio sensor 40 the target air-fuel ratio AFT calculated by the target air-fuel ratio setting part A5 to thereby calculate the air-fuel ratio difference DAF (DAF=AFup-AFT). This air-fuel ratio difference DAF is a value expressing the excess/deficiency of the amount of fuel fed with respect to the target air-fuel ratio AFT.

The F/B correction amount calculating part A7 processes the air-fuel ratio difference DAF calculated by the air-fuel ratio difference calculating part A6 by proportional-integral-differential (PID) processing to calculate the F/B correction amount DFi for compensating for the excess/deficiency of the amount of feed of fuel based on the following formula (1). The thus calculated F/B correction amount DFi is input to the fuel injection amount calculating part A3.

$$DFi = Kp \cdot DAF + Ki \cdot SDAF + Kd \cdot DDAF \quad (1)$$

Note that, in the above formula (1), Kp is a preset proportional gain (proportional constant), Ki is a preset integral gain (integral constant), and Kd is a preset differential gain (differential constant). Further, DDAF is the time differential of the air-fuel ratio difference DAF and is calculated by dividing the difference between the currently updated air-fuel ratio difference DAF and the previously updated air-fuel ratio difference DAF by the time corresponding to the updating interval. Further, SDAF is the time differential of the air-fuel ratio difference DAF. This time differential SDAF is calculated by adding the previously updated time differential DDAF and the currently updated air-fuel ratio difference DAF (SDAF=DDAF+DAF).

Figure 11:
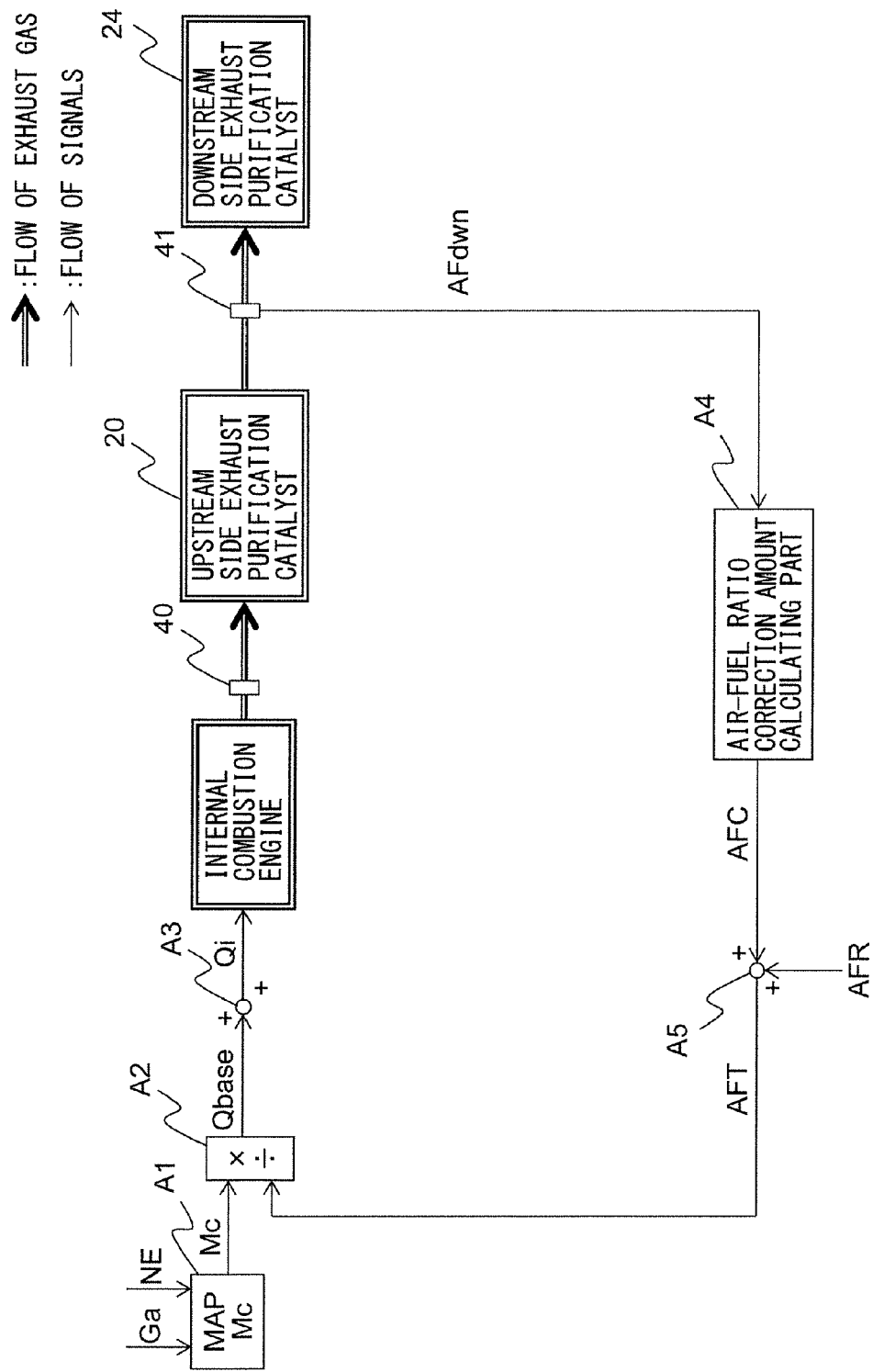
FIG. 11 is a functional block diagram of a control device of an internal combustion engine.

Note that, when the above-mentioned double FB control is performed, all of the functional blocks A1 to A7 in the control blocks shown in FIG. 10 are used. However, when the above-mentioned single FB control is performed, among the control blocks shown in FIG. 10, the air-fuel ratio difference calculating part A6 and F/B correction amount calculating part A7 are not used. Therefore, when single FB control is performed, the air-fuel ratio control is performed in accordance with the functional block diagram such as shown in FIG. 11.

<Flow Chart of Fixed Double Breakdown Control>

Figure 12:
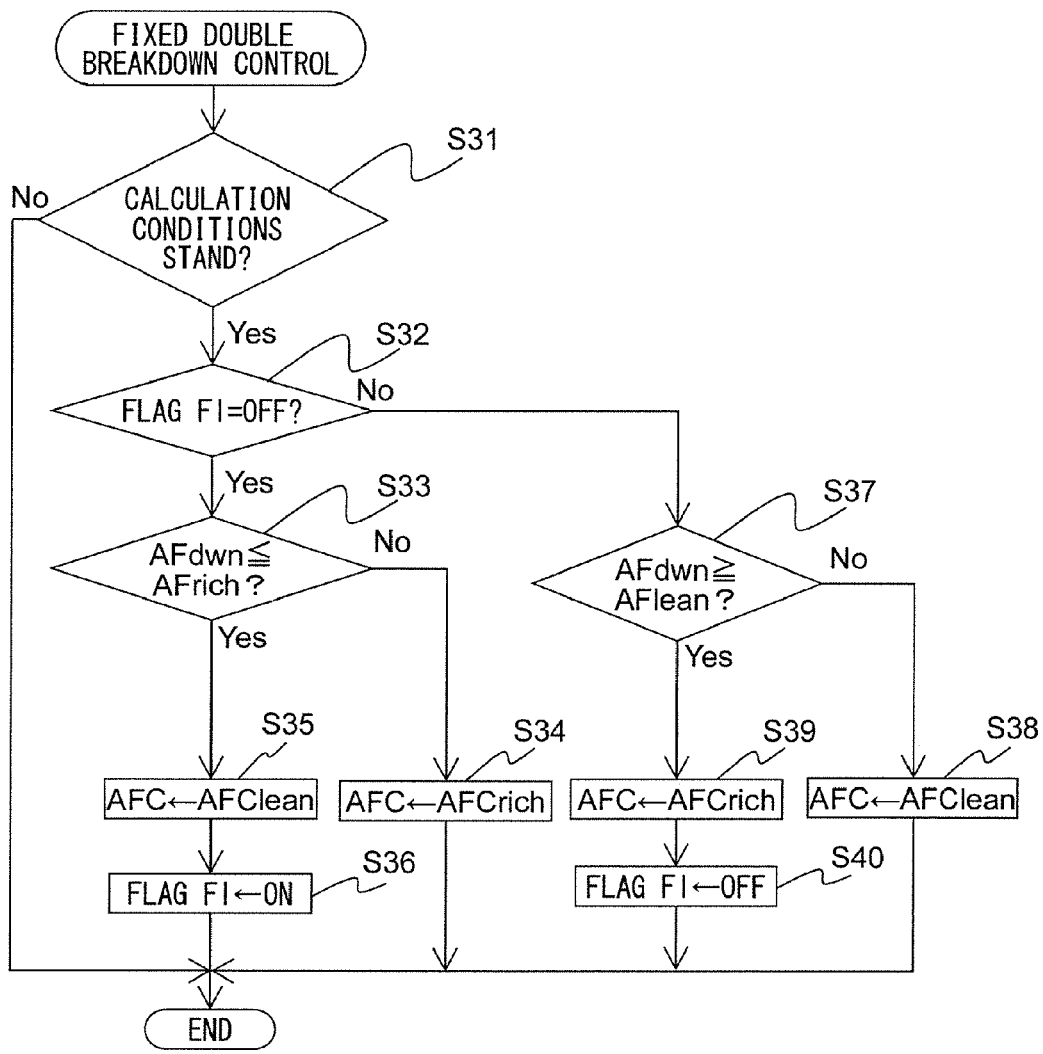
FIG. 12 is a flow chart showing a control routine of fixed double breakdown control.

FIG. 12 is a flow chart showing a control routine of fixed double breakdown control in double FB control and single FB control. The illustrated control routine is performed by interruption at certain time intervals.

As shown in FIG. 12, first, at step S31, it is judged if the conditions for calculation of the air-fuel ratio correction amount AFC stand. "If the conditions for calculation of the air-fuel ratio correction amount AFC stand" means, for example, double FB control and single FB control being underway or fuel cut control or other special control not being underway. If at step S31 it is judged that the conditions for calculation of the target air-fuel ratio stand, the routine proceeds to step S32.

At step S32, it is judged if the lean set flag F1 is set OFF. The lean set flag F1 is set off if the air-fuel ratio correction amount AFC is set to the lean set correction amount AFClean and is set OFF in other cases. If, at step S32, the lean set flag F1 is set OFF, the routine proceeds to step S33. At step S33, it is judged if the output air-fuel ratio AFdwn of the downstream air-fuel ratio sensor 41 is the rich judged air-fuel ratio AFrich or less. If it is judged that the output air-fuel ratio AFdwn of the downstream air-fuel ratio sensor 41 is larger than the rich judged air-fuel ratio AFrich, the routine proceeds to step S34. At step S34, the air-fuel ratio correction amount AFC is maintained as set to the rich set correction amount AFCrich, and the control routine is made to end. Note that, the rich set correction amount AFCrich at this time is made the first rich set correction amount $AFCrich_1$ or the second rich set correction amount $AFCrich_2$ set at step S21 or S24 of FIG. 9.

On the other hand, if the oxygen storage amount OSA of the upstream side exhaust purification catalyst 20 decreases and the air-fuel ratio of the exhaust gas flowing out from the upstream side exhaust purification catalyst 20 falls, at step S33, it is judged that the output air-fuel ratio AFdwn of the downstream air-fuel ratio sensor 41 is the rich judged air-fuel ratio AFrich or less. In this case, the routine proceeds to step S35 where the air-fuel ratio correction amount AFC is switched to the lean set correction amount AFClean. Note that, the lean set correction amount AFClean at this time is made the first lean set correction amount $AFClean_1$ or the second lean set correction amount $AFClean_2$ set at step S21 or S24 of FIG. 9. Next, at step S36, the lean set flag F1 is set ON and the control routine is made to end.

If the lean set flag F1 is set ON, at the next control routine, at step S32, it is judged that the lean set flag F1 is set OFF, then the routine proceeds to step S37. At step S37, it is judged if the output air-fuel ratio AFdwn of the downstream air-fuel ratio sensor 41 is the lean judged air-fuel ratio AFlean or more. If it is judged that the output air-fuel ratio AFdwn of the downstream air-fuel ratio sensor 41 is smaller than the lean judged air-fuel ratio AFlean, the routine proceeds to step S38. At step S38, the air-fuel ratio correction amount AFC is maintained as set to the lean set correction amount AFClean, then the control routine is made to end.

On the other hand, if the oxygen storage amount OSA of the upstream side exhaust purification catalyst 20 increases and the air-fuel ratio of the exhaust gas flowing out from the upstream side exhaust purification catalyst 20 rises, at step S37, it is judged that the output air-fuel ratio AFdwn of the downstream air-fuel ratio sensor 41 is the lean judged air-fuel ratio AFlean or more and the routine proceeds to step S39. At step S39, the air-fuel ratio correction amount AFC is switched to the rich set correction amount AFCrich. Next, at step S40, the lean set flag F1 is reset OFF and the control routine is made to end.

Second Embodiment

Next, referring to FIG. 13 to FIG. 15, a control device of a second embodiment of the present disclosure will be explained. The configuration and control of the control device of the second embodiment are basically similar to the control and configuration of the control device of the first embodiment except for the points explained below.

In the double breakdown control of the first embodiment, the target air-fuel ratio is maintained at a certain lean set air-fuel ratio during the lean time period while the target air-fuel ratio is maintained at a certain rich set air-fuel ratio during the rich time period. As opposed to this, in the double breakdown control of the present embodiment, the target air-fuel ratio is maintained at the lean air-fuel ratio during the lean time period while the lean degree of the target air-fuel ratio is lowered during the lean time period. In addition, the target air-fuel ratio is maintained at the rich air-fuel ratio during the rich time period while the rich degree of the target air-fuel ratio is lowered during the rich time period. Below, this double breakdown control will be called "fluctuating double breakdown control".

Figure 13:
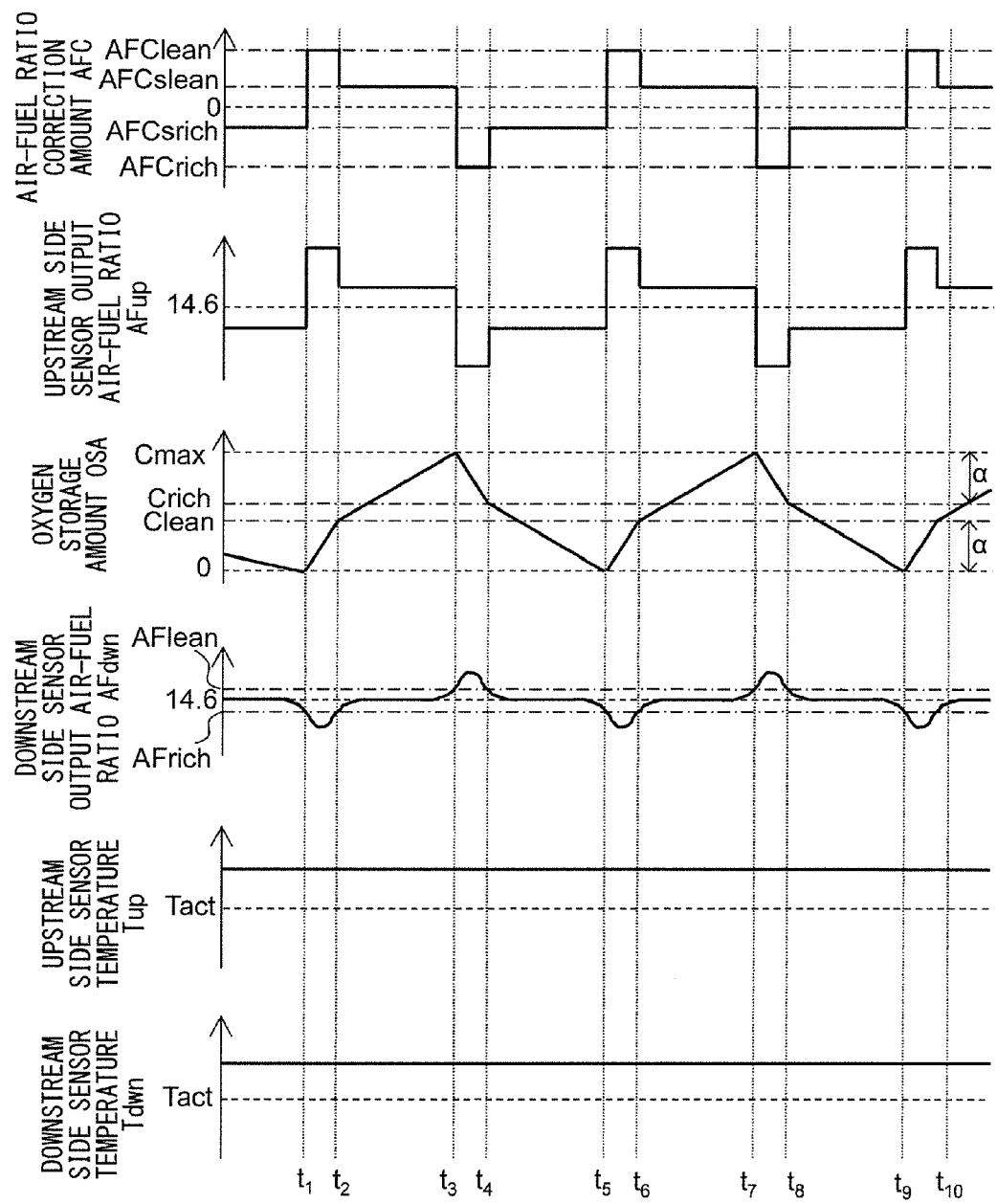
FIG. 13 is a time chart of the air-fuel ratio correction amount etc. similar to FIG. 5.

Referring to FIG. 13, the operation in the fluctuating double breakdown control in the present embodiment will be explained in detail. FIG. 13 is a time chart, similar to FIG. 5, of the air-fuel ratio correction amount AFC etc. when performing fluctuating double breakdown control in the present embodiment.

In the example shown in FIG. 13, at the time $t_1$ and time $t_5$ etc., the output air-fuel ratio AFdwn of the downstream air-fuel ratio sensor 41 becomes the rich judged air-fuel ratio AFrich or less while the air-fuel ratio correction amount AFC is made to change from a negative value to a positive value. As a result, the target air-fuel ratio is switched from the rich air-fuel ratio to the lean air-fuel ratio. This operation is similar to the operation at the time $t_1$ and time $t_3$ etc. of FIG. 5.

In addition, in the example shown in FIG. 13, at the time $t_3$ and time $t_7$ etc., the output air-fuel ratio AFdwn of the downstream air-fuel ratio sensor 41 becomes the lean judged air-fuel ratio AFlean or more while the air-fuel ratio correction amount AFC is changed from the positive value to the negative value. As a result, the target air-fuel ratio is switched from the lean air-fuel ratio to the rich air-fuel ratio. This operation is similar to the operation at the time $t_2$ and time $t_4$ of FIG. 5.

Further, in the example shown in FIG. 13, at the time $t_1$, the air-fuel ratio correction amount AFC is set to the lean set correction amount AFClean. After that, in the present embodiment, at the time $t_2$ when the output air-fuel ratio AFdwn of the downstream air-fuel ratio sensor 41 becomes larger than the rich judged air-fuel ratio AFrich, the air-fuel ratio correction amount AFC is switched from the lean set correction amount AFClean to the weak lean set correction amount AFCslean. The weak lean set correction amount AFCslean is smaller in absolute value than the lean set correction amount AFClean, Therefore, the weak lean set air-fuel ratio corresponding to the weak lean set correction amount AFCslean is smaller in lean degree than the lean set air-fuel ratio corresponding to the lean set correction amount AFClean. Therefore, in the example shown in FIG. 13, at the time $t_2$, the lean degree of the target air-fuel ratio is reduced.

Further, in the example shown in FIG. 13, at the time $t_3$, the air-fuel ratio correction amount AFC is set to the rich set correction amount AFCrich. After that, in the present embodiment, at the time $t_4$ when the output air-fuel ratio AFdwn of the downstream air-fuel ratio sensor 41 becomes smaller than the lean judged air-fuel ratio AFlean, the air-fuel ratio correction amount AFC is switched from the rich set correction amount AFCrich to the weak rich set correction amount AFCsrich. The weak rich set correction amount AFCsrich is smaller in absolute value than the rich set correction amount AFCrich. Therefore, the weak rich set air-fuel ratio corresponding to the weak rich set correction amount AFCsrich is smaller in rich degree compared with the rich set air-fuel ratio corresponding to the rich set correction amount AFCrich. Therefore, in the example shown in FIG. 13, at the time $t_4$, the rich degree of the target air-fuel ratio is lowered.

Note that, in the above embodiment, the lean degree is lowered at the time $t_2$ when the output air-fuel ratio AFdwn of the downstream air-fuel ratio sensor 41 becomes larger than the rich judged air-fuel ratio AFrich. However, the timing for lowering the lean degree need not necessarily be this timing. As this timing, for example, the timing when the total amount of oxygen stored in the upstream side exhaust purification catalyst 20 from when switching the air-fuel ratio correction amount AFC from a negative value to a positive value becomes a predetermined amount a may be mentioned. Whatever the case, in the present embodiment, the lean degree of the target air-fuel ratio can be lowered at any timing so long as a timing in the lean time period from when the output air-fuel ratio AFdwn of the downstream air-fuel ratio sensor 41 becomes the rich judged air-fuel ratio AFrich or less to when the output air-fuel ratio AFdwn of the downstream air-fuel ratio sensor 41 becomes the lean judged air-fuel ratio AFlean or more. Further, the lean degree may be reduced over a plurality of times or may be reduced continuously.

Further, in the above embodiment, the rich degree is lowered at the time $t_4$ when the output air-fuel ratio AFdwn of the downstream air-fuel ratio sensor 41 becomes smaller than the rich judged air-fuel ratio AFrich. However, the timing of reducing the rich degree does not necessarily have to be made this timing. As this timing, for example, the timing when the total amount of oxygen which is discharged from the upstream side exhaust purification catalyst 20 from when the air-fuel ratio correction amount AFC is switched from a positive value to a negative value becomes a predetermined amount a may be mentioned. Whatever the case, in the present embodiment, the rich degree of the target air-fuel ratio can be lowered at any timing so long as a timing in the rich time period from when the output air-fuel ratio AFdwn of the downstream air-fuel ratio sensor 41 becomes the lean judged air-fuel ratio AFlean or more to when the output air-fuel ratio AFdwn of the downstream air-fuel ratio sensor 41 becomes the rich judged air-fuel ratio AFrich or less. Further, the rich degree may be reduced over a plurality of times or may be reduced continuously.

Further, in the present embodiment as well, in the same way as the first embodiment, double FB control and single FB control are performed. Further, in the present embodiment, both during double FB control and during single FB control, the target air-fuel ratio is set by fluctuating double breakdown control. During double FB control, feedback control is performed so that the output air-fuel ratio of the upstream air-fuel ratio sensor 40 becomes a target air-fuel ratio set by fluctuating double breakdown control.

<Air-Fuel Ratio Correction Amount at Single FB Control and Double FB Control>

Figure 14:
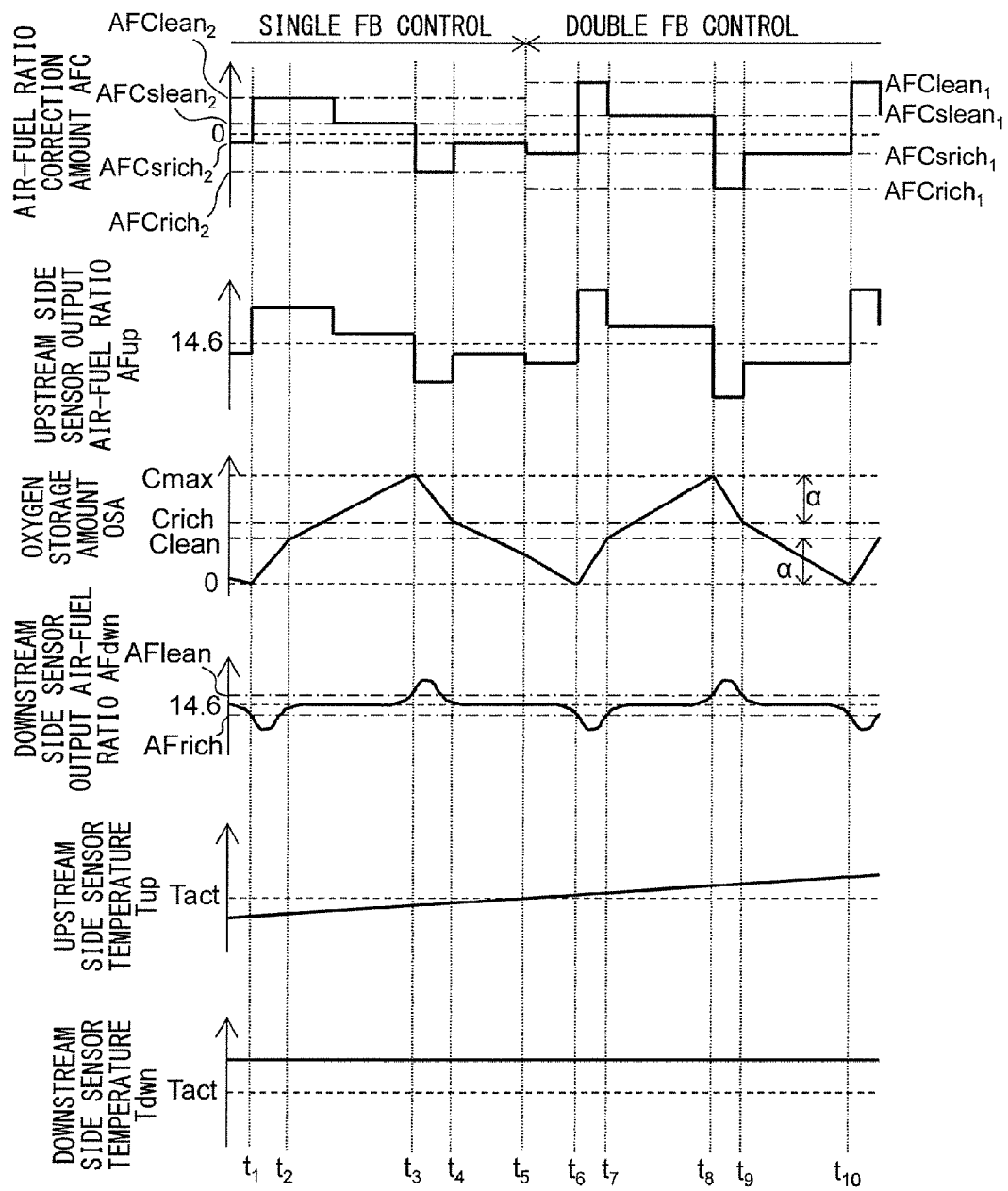
FIG. 14 is a time chart of an air-fuel ratio correction amount etc. around the time $t_2$ of FIG. 6.

FIG. 14 is a time chart of the air-fuel ratio correction amount AFC etc. around the time $t_2$ of FIG. 6. In the example shown in FIG. 14, at the time $t_5$, the temperature Tup of the upstream air-fuel ratio sensor 40 has become the activation temperature Tact or more (corresponding to time $t_2$ of FIG. 6). Therefore, before the time $t_5$, single FB control is performed, while from the time $t_5$ on, double FB control is performed.

As will be understood from FIG. 14, before the time $t_5$, the air-fuel ratio correction amount AFC is successively switched between the second rich set correction amount AFCrich$_2$, the second weak rich set correction amount AFCsrich$_2$, the second lean set correction amount AFClean$_2$, and the second weak lean set correction amount AFCslean$_2$. On the other hand, from the time $t_5$ when double FB control is performed and on, the air-fuel ratio correction amount AFC is successively switched between the first rich set correction amount AFCrich$_1$, the first weak rich set correction amount AFCsrich$_1$, the first lean set correction amount AFClean$_1$, and the first lean set correction amount AFClean$_1$.

Here, the second rich set correction amount AFCrich$_2$ is made a value smaller in absolute value than the first rich set correction amount AFCrich$_1$. Therefore, the second rich set air-fuel ratio corresponding to the second rich set correction amount AFCrich$_2$ is smaller in rich degree than the first rich set air-fuel ratio corresponding to the first rich set correction amount AFCrich$_1$. In addition, the second weak rich set correction amount AFCsrich$_2$ is made a value with a smaller absolute value than the first weak rich set correction amount AFCsrich$_1$. Therefore, the second weak rich set air-fuel ratio corresponding to the second rich set correction amount AFCrich$_2$ is smaller in rich degree than the first weak rich set air-fuel ratio corresponding to the first weak rich set correction amount AFCrich$_1$. Therefore, the air-fuel ratio correction amount is set so that the average value of the rich degree of the target air-fuel ratio while the target air-fuel ratio is set to the rich air-fuel ratio becomes larger when performing double FB control (AFCrich$_1$ and AFCsrich$_1$) compared with when performing single FB control (AFCrich$_2$ and AFCsrich$_2$).

Further, the second lean set correction amount AFClean$_2$ is made a value with a smaller absolute value than the first lean set correction amount AFClean$_1$. Therefore, the second lean set air-fuel ratio corresponding to the second lean set correction amount AFClean$_2$ is smaller in lean degree compared with the first lean set air-fuel ratio corresponding to the first lean set correction amount AFClean$_1$. In addition, the second weak lean set correction amount AFCslean$_2$ is made a value with a smaller absolute value than the first weak lean set correction amount AFCslean$_1$. Therefore, the second weak lean set air-fuel ratio corresponding to the second weak lean set correction amount AFCslean$_2$ is smaller in lean degree compared with the first weak lean set air-fuel ratio corresponding to the first weak lean set correction amount AFCslean$_1$. Therefore, the air-fuel ratio correction amount is set so that the average value of the lean degree of the target air-fuel ratio while the target air-fuel ratio is set to the lean air-fuel ratio becomes larger when performing double FB control (AFClean$_1$ and AFCslean$_1$ etc.) compared with when performing single FB control (AFClean$_2$ and AFCslean$_2$ etc.)

<Advantageous Effects of Control in Present Embodiment>

In the present embodiment, double breakdown control is performed. For this reason, since the rich degree of the exhaust gas right before the time $t_1$ of FIG. 13 is low, at the time $t_1$, it is possible keep low the unburned gas flowing out from the upstream side exhaust purification catalyst 20. In addition, right after the time $t_1$, the lean degree of the exhaust gas is high, so at the time $t_1$, the air-fuel ratio of the exhaust gas flowing out from the upstream side exhaust purification catalyst 20, which had been the rich air-fuel ratio, can quickly be returned to the stoichiometric air-fuel ratio. As a result, in the present embodiment, the unburned gas flowing out from the upstream side exhaust purification catalyst 20 can be kept small. The same can be said at the time $t_3$ as well. Accordingly, in the present embodiment, the NO$_X$ flowing out from the upstream side exhaust purification catalyst 20 can be kept small.

In addition, in the present embodiment, compared with during double FB control, during single FB control, the average value of the absolute values of the air-fuel ratio correction amount is made smaller. If in this way making the average value of the absolute values of the air-fuel ratio correction amount smaller, even if the actual air-fuel ratio of the exhaust gas flowing into the upstream air-fuel ratio sensor 40 deviates from the target air-fuel ratio, the actual air-fuel ratio is kept from ending up greatly deviating from the stoichiometric air-fuel ratio. Due to this, it is possible to keep down deterioration of the exhaust emissions during double FB control.

<Flow Chart Relating to Second Embodiment>

Figure 15:
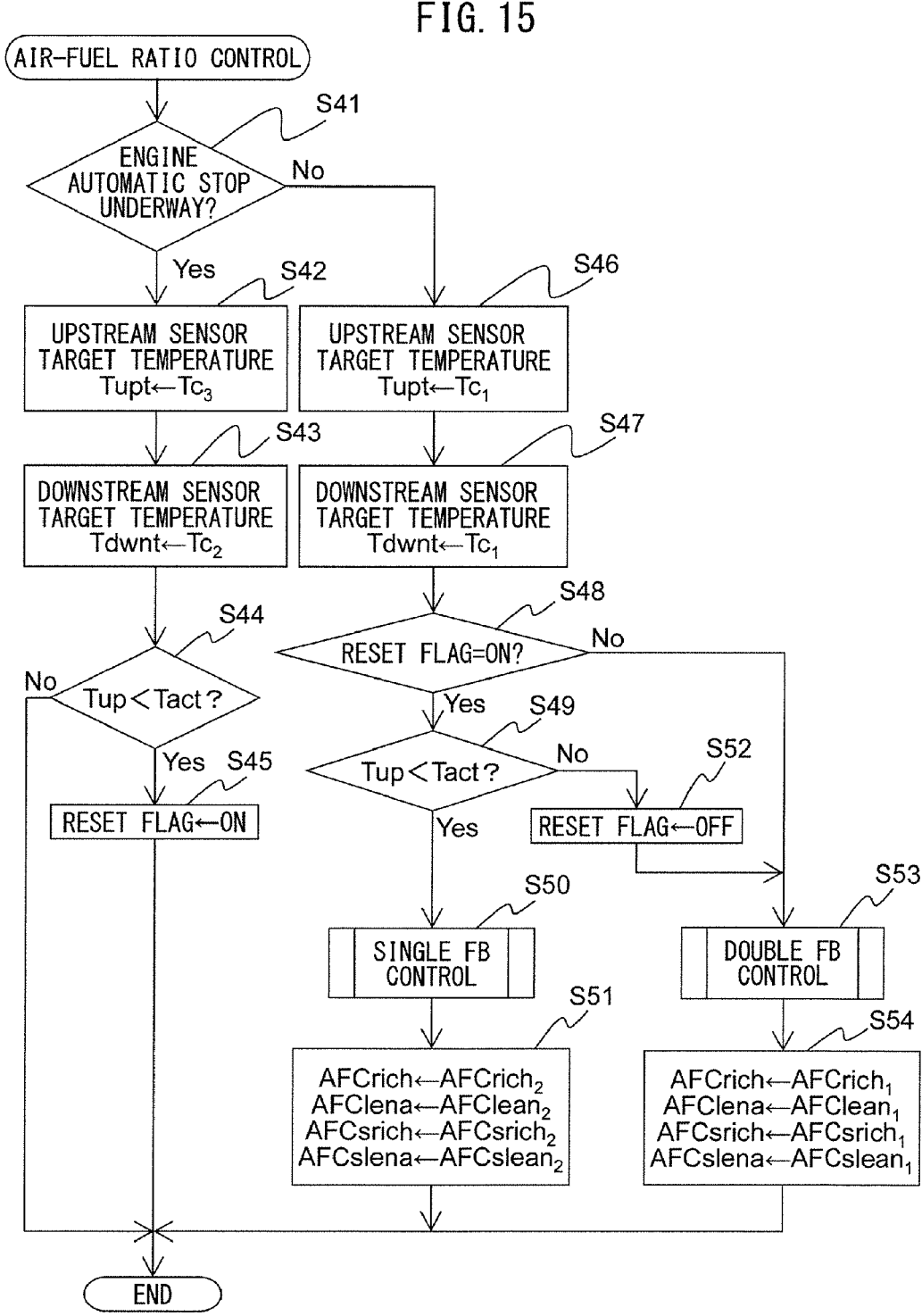
FIG. 15 is a flow chart showing a control routine of the temperature control and air-fuel ratio control.

FIG. 15 is a flow chart showing the control routines of the temperature control and air-fuel ratio control performed by the control device in the present embodiment. The illustrated control routine is performed by interruption every certain time interval. Steps S41 to S50 and S52 to S53 of FIG. 15 are similar to steps S11 to S20 and S22 to S23 of FIG. 9, so explanations will be omitted.

At step S51, the rich set correction amount AFCrich and the weak rich set correction amount AFCsrich are respectively set to the second rich set correction amount AFCrich$_2$ and the second weak rich set correction amount AFCsrich$_2$. In addition, the lean set correction amount AFClean and weak lean set correction amount AFCslean are respectively set to the second lean set correction amount AFClean$_2$ and the second weak lean set correction amount AFClean$_2$. On the other hand, at step S54, the rich set correction amount AFCrich and weak rich set correction amount AFCsrich are respectively set to the first rich set correction amount AFCrich$_1$ and the first weak rich set correction amount AFCsrich$_1$. In addition, the lean set correction amount AFClean and weak lean set correction amount AFCslean are respectively set to the first lean set correction amount AFClean$_1$ and the first weak lean set correction amount AFClean$_1$.

Figure 16:
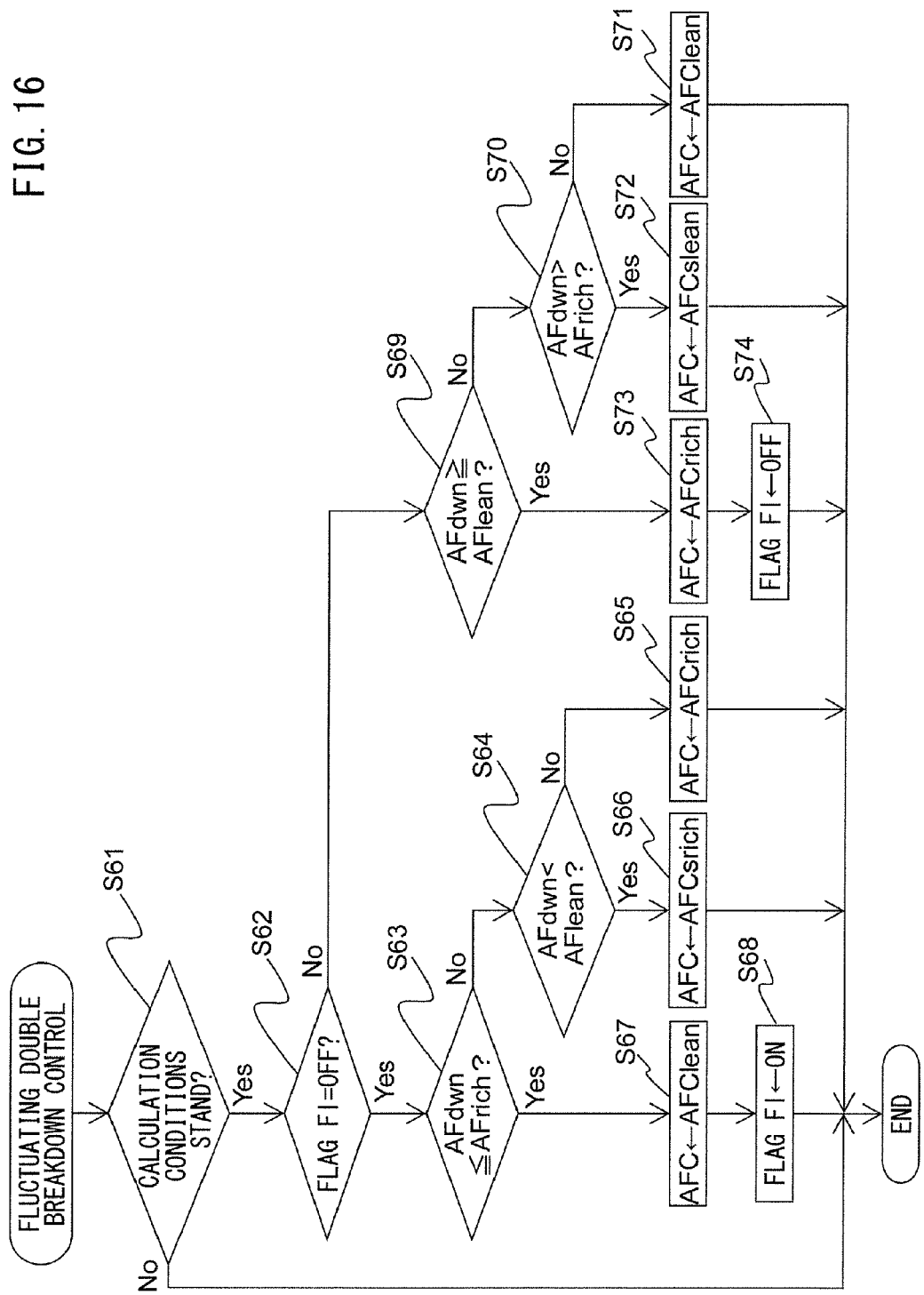
FIG. 16 is a flow chart showing a control routine of fluctuating double breakdown control.

FIG. 16 is a flow chart showing a control routine of fluctuating double breakdown control in double FB control and single FB control. The illustrated control routine is performed by interruption at certain time intervals.

As shown in FIG. 16, first, at step S61, in the same way as step S31 of FIG. 12, it is judged if the conditions for calculation of the air-fuel ratio correction amount AFC stand. When, at step S61, the conditions for calculation of the air-fuel ratio correction amount AFC stand, the routine proceeds to step S62. At step S62, it is judged if the lean set flag F1 is set OFF. If, at step S62, it is judged that the lean set flag F1 is set OFF, the routine proceeds to step S63. At step S63, it is judged if the output air-fuel ratio AFdwn of the downstream air-fuel ratio sensor 41 is the rich judged air-fuel ratio AFrich or less.

If, at step S63, it is judged that the output air-fuel ratio AFdwn of the downstream air-fuel ratio sensor 41 is larger than the rich judged air-fuel ratio AFrich, the routine proceeds to step S64. At step S64, it is judged if the output air-fuel ratio AFdwn of the downstream air-fuel ratio sensor 41 is smaller than the lean judged air-fuel ratio AFlean. If it is judged that the output air-fuel ratio AFdwn is the lean judged air-fuel ratio AFlean or more, the routine proceeds to step S65. At step S65, the air-fuel ratio correction amount AFC is set to the rich set correction amount AFCrich, and the control routine is made to end.

After that, if the output air-fuel ratio AFdwn of the downstream air-fuel ratio sensor 41 approaches the stoichiometric air-fuel ratio and becomes smaller than the lean judged air-fuel ratio AFlean, at the next control routine, the routine proceeds from step S64 to step S66. At step S66, the air-fuel ratio correction amount AFC is set to the weak rich set correction amount AFCsrich, and the control routine is made to end.

After that, if the oxygen storage amount OSA of the upstream side exhaust purification catalyst 20 becomes substantially zero and the output air-fuel ratio AFdwn of the downstream air-fuel ratio sensor 41 becomes the rich judged air-fuel ratio AFrich or less, at the next control routine, the routine proceeds from step S63 to step S67. At step S67, the air-fuel ratio correction amount AFC is set to the lean set correction amount AFClean. Next, at step S68, the lean set flag F1 is set ON, and the control routine is made to end.

If the lean set flag F1 is set ON, at the next control routine, the routine proceeds from step S62 to step S69. At step S69, it is judged if the output air-fuel ratio AFdwn of the downstream air-fuel ratio sensor 41 is the lean judged air-fuel ratio AFlean or more.

If, at step S69, it is judged that the output air-fuel ratio AFdwn of the downstream air-fuel ratio sensor 41 is smaller than the lean judged air-fuel ratio AFlean, the routine proceeds to step S70. At step S70, it is judged if the output air-fuel ratio AFdwn of the downstream air-fuel ratio sensor 41 is larger than the rich judged air-fuel ratio AFrich. If it is judged that the output air-fuel ratio AFdwn is the rich judged air-fuel ratio AFrich or less, the routine proceeds to step S71. At step S71, the air-fuel ratio correction amount AFC continues to be set to the lean set correction amount AFClean, and the control routine is made to end.

After that, if the output air-fuel ratio AFdwn of the downstream air-fuel ratio sensor 41 approaches the stoichiometric air-fuel ratio and becomes larger than the rich judged air-fuel ratio AFrich, at the next control routine, the routine proceeds from step S70 to step S72. At step S72, the air-fuel ratio correction amount AFC is set to the weak lean set air-fuel ratio AFCslean, and the control routine is made to end.

After that, if the oxygen storage amount OSA of the upstream side exhaust purification catalyst 20 becomes substantially the maximum storable oxygen amount and the output air-fuel ratio AFdwn of the downstream air-fuel ratio sensor 41 becomes the lean judged air-fuel ratio AFlean or more, at the next control routine, the routine proceeds from step S69 to step S73. At step S73, the air-fuel ratio correction amount AFC is set to the rich set correction amount AFCrich. Next, at step S74, the lean set flag F1 is reset OFF, and the control routine is made to end.

Third Embodiment

Next, referring to FIG. 17, a control device of a third embodiment of the present disclosure will be explained. The configuration and control of the control device of the third embodiment are basically similar to the controls and configurations of the control devices of the first embodiment and second embodiment except for the points explained below.

In the first embodiment, during both double FB control and single FB control, fixed double breakdown control is performed. On the other hand, in the second embodiment, during both double FB control and single FB control, fluctuating double breakdown control is performed. As opposed to this, in the present embodiment, during double FB control, fluctuating double breakdown control is performed, while during single FB control, fixed double breakdown control is performed.

Figure 17:
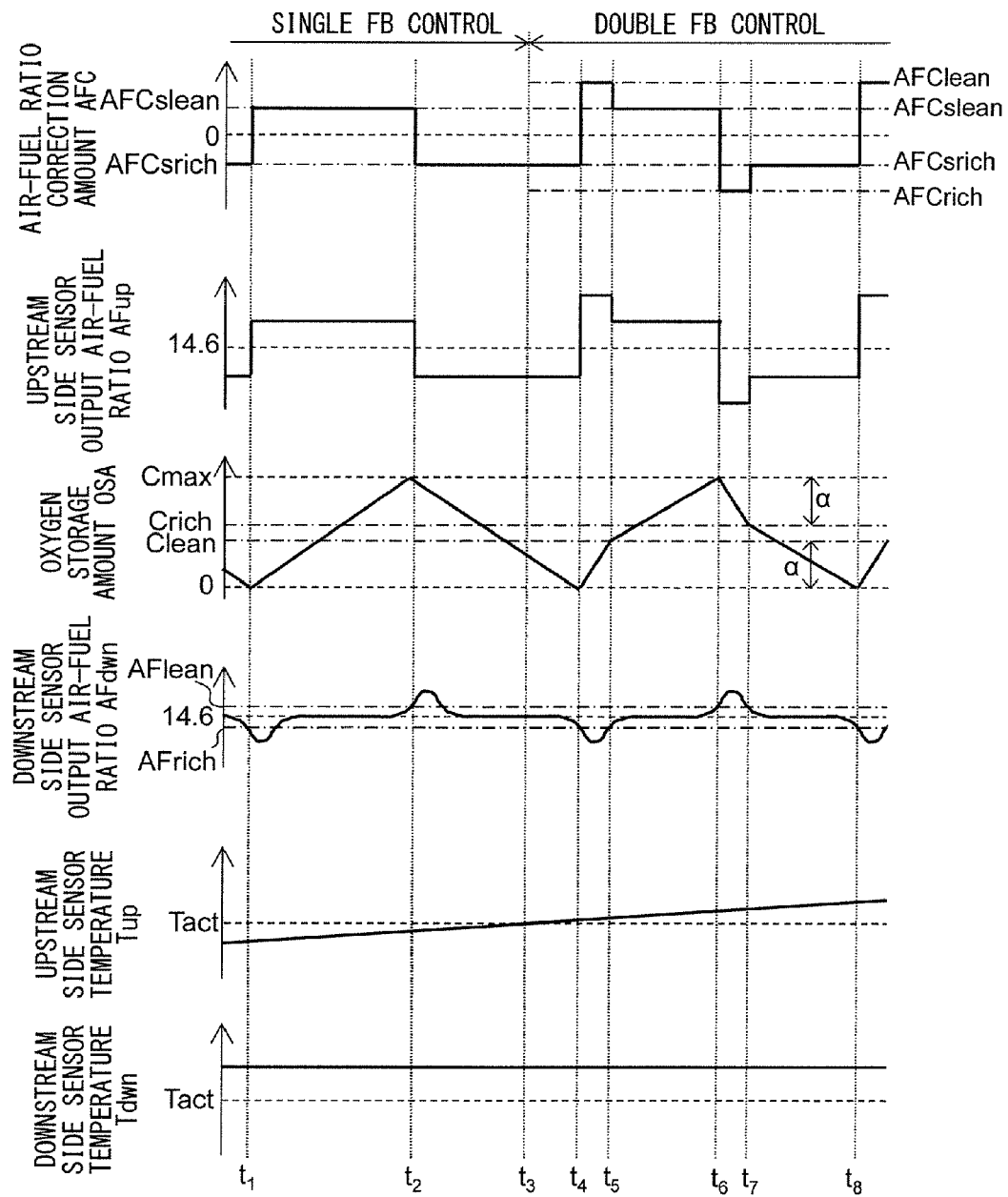
FIG. 17 is a time chart of an air-fuel ratio correction amount etc. around the time $t_2$ of FIG. 6.

FIG. 17 is a time chart of the air-fuel ratio correction amount AFC etc. around the time $t_2$ of FIG. 6 in the present embodiment. In the example shown in FIG. 17, at the time $t_3$, the temperature Tup of the upstream air-fuel ratio sensor 40 becomes the activation temperature Tact or more (corresponding to time $t_2$ of FIG. 6). Therefore, before the time $t_5$, single FB control is performed. In the present embodiment, in single FB control, the target air-fuel ratio is set by the fixed double breakdown control shown in FIG. 5.

As will be understood from FIG. 17, before the time $t_3$, during the lean time period from when the output air-fuel ratio AFdwn of the downstream air-fuel ratio sensor 41 becomes the rich judged air-fuel ratio AFrich or less to when the output air-fuel ratio AFdwn of the downstream air-fuel ratio sensor 41 becomes the lean judged air-fuel ratio AFlean or more, the target air-fuel ratio is maintained at a certain weak lean set correction amount AFCslean. Accordingly, the target air-fuel ratio is maintained at the weak lean set air-fuel ratio. In addition, in the rich time period from when the output air-fuel ratio AFdwn of the downstream air-fuel ratio sensor 41 becomes the lean judged air-fuel ratio AFlean or more to when the output air-fuel ratio AFdwn of the downstream air-fuel ratio sensor 41 becomes the rich judged air-fuel ratio AFrich or less, the air-fuel ratio correction amount AFC is maintained at the weak rich set correction amount AFCsrich. Accordingly, the target air-fuel ratio is maintained at a certain weak rich set air-fuel ratio.

On the other hand, at the time $t_5$ on, double FB control is performed. In the present embodiment, in double FB control, the fluctuating double breakdown control shown in FIG. 13 is performed. Accordingly, at the time $t_3$ on, the air-fuel ratio correction amount AFC is maintained at a positive value during the lean time period and the air-fuel ratio correction amount AFC is made to decrease during the lean time period. Accordingly, during the lean time period, the target air-fuel ratio is maintained at the lean air-fuel ratio and during that lean time period, the lean degree of the target air-fuel ratio is made to decrease. Further, during the rich time period, the air-fuel ratio correction amount AFC is maintained at a negative value and during that rich time period, the air-fuel ratio correction amount AFC is made to increase. Accordingly, during the rich time period, the target air-fuel ratio is maintained at the rich air-fuel ratio and during that rich time period, the rich degree of the target air-fuel ratio is made to decrease.

In particular, in the present embodiment shown in FIG. 17, the air-fuel ratio correction amount during single FB control, that is fixed double breakdown control, is made an amount equal to the weak rich set correction amount AFCsrich and weak lean set correction amount AFCslean in the double FB control, that is, fluctuating double breakdown control. Note that, if the absolute value of the air-fuel ratio correction amount in the single FB control is smaller than the absolute value of the rich set correction amount AFCrich and the absolute value of the lean set correction amount AFClean in double FB control, it need not be an amount equal to the weak rich set correction amount and weak lean set correction amount.

According to the present embodiment, when the output of the upstream air-fuel ratio sensor 40 cannot be utilized, single FB control is performed. In this single FB control, fixed double breakdown control is performed. As a result, in single FB control, the rich degree or the rich air-fuel ratio and the lean degree of the lean air-fuel ratio can be maintained small. As a result, even if the actual air-fuel ratio of the exhaust gas flowing into the upstream air-fuel ratio sensor 40 deviates from the target air-fuel ratio, the actual air-fuel ratio is kept from ending up greatly deviating from the stoichiometric air-fuel ratio.

Note that, in the present embodiment as well, double FB control and single FB control are switched between by a flow chart such as shown in FIG. 9. Further, when single FB control is being performed, the target air-fuel ratio is set by fixed double breakdown control by a flow chart such as shown in FIG. 12. In addition, when double FB control is being performed, the target air-fuel ratio is set by fluctuating double breakdown control by a flow chart such as shown in FIG. 16.

Fourth Embodiment

Next, referring to FIG. 18 to FIG. 21, a control device of a fourth embodiment of the present disclosure will be explained. The configuration and control of the control device of the fourth embodiment are basically similar to the configurations and control of the first embodiment to third embodiment except for the points explained below.

<Rich Breakdown Control>

In the double FB control of the present embodiment, feedback control is performed based the output air-fuel ratio of the upstream air-fuel ratio sensor 40 and the target air-fuel ratio is set by rich breakdown control. Below, rich breakdown control will be explained.

In rich breakdown control, the target air-fuel ratio is set based on the output air-fuel ratio of the downstream air-fuel ratio sensor 41 etc. Specifically, when the output air-fuel ratio of the downstream air-fuel ratio sensor 41 becomes the rich air-fuel ratio, the target air-fuel ratio is set to the lean set air-fuel ratio. In addition, in rich breakdown control, if the oxygen storage amount OSA of the upstream side exhaust purification catalyst 20 becomes a predetermined switching reference storage amount Cref smaller than the maximum storable oxygen amount Cmax or becomes more, the target air-fuel ratio which had been the lean set air-fuel ratio up to then is set to the rich set air-fuel ratio.

Note that, the oxygen storage amount OSA of the upstream side exhaust purification catalyst 20 is estimated based on the cumulative value of the oxygen excess/deficiency of the exhaust gas flowing into the upstream side exhaust purification catalyst 20. Here, the "oxygen excess/deficiency" means the amount of oxygen becoming in excess or the amount of oxygen becoming deficient (amount of excessive unburned gas) when trying to make the air-fuel ratio of the exhaust gas flowing into the upstream side exhaust purification catalyst 20 the stoichiometric air-fuel ratio. In particular, during the time period when the target air-fuel ratio is set to the lean set air-fuel ratio, the oxygen in the exhaust gas flowing into the upstream side exhaust purification catalyst 20 becomes excessive. This excess oxygen is stored in the upstream side exhaust purification catalyst 20. Therefore, the cumulative value of the oxygen excess/deficiency at this time period (below, referred to as the "cumulative oxygen excess/deficiency") can be said to be the estimated value of the oxygen storage amount OSA of the upstream side exhaust purification catalyst 20.

The oxygen excess/deficiency is calculated based on the output air-fuel ratio of the upstream air-fuel ratio sensor 40 and the estimated value of the amount of intake air to the combustion chamber 5 calculated based on the output of the air flow meter 39 etc. or the amount of feed of fuel from the fuel injector 11. Specifically, the oxygen excess/deficiency OED is, for example, calculated by the following formula (2).

$$OED = 0.23 \times Qi \times (AFup - AFR) \tag{2}$$

Here, 0.23 indicates the concentration of oxygen in the air, Qi indicates the fuel injection amount, AFup indicates the output air-fuel ratio of the upstream air-fuel ratio sensor 40, and AFR indicates the air-fuel ratio becoming the control center (in the present embodiment, basically the stoichiometric air-fuel ratio).

After that, if the output air-fuel ratio of the downstream air-fuel ratio sensor 41 again becomes the rich judged air-fuel ratio or less, the target air-fuel ratio is again made the lean set air-fuel ratio. After that, a similar operation is repeated. In this way, in the rich breakdown control of the present embodiment, the target air-fuel ratio of the exhaust gas flowing into the upstream side exhaust purification catalyst 20 is alternately repeatedly set to the lean set air-fuel ratio and the rich set air-fuel ratio. In other words, in rich breakdown control, the output air-fuel ratio of the upstream air-fuel ratio sensor 40 (that is, the air-fuel ratio of the exhaust gas flowing into the upstream side exhaust purification catalyst 20) is alternately switched between the rich air-fuel ratio and the lean air-fuel ratio.

<Explanation of Rich Breakdown Control Using Time Chart>

Figure 18:
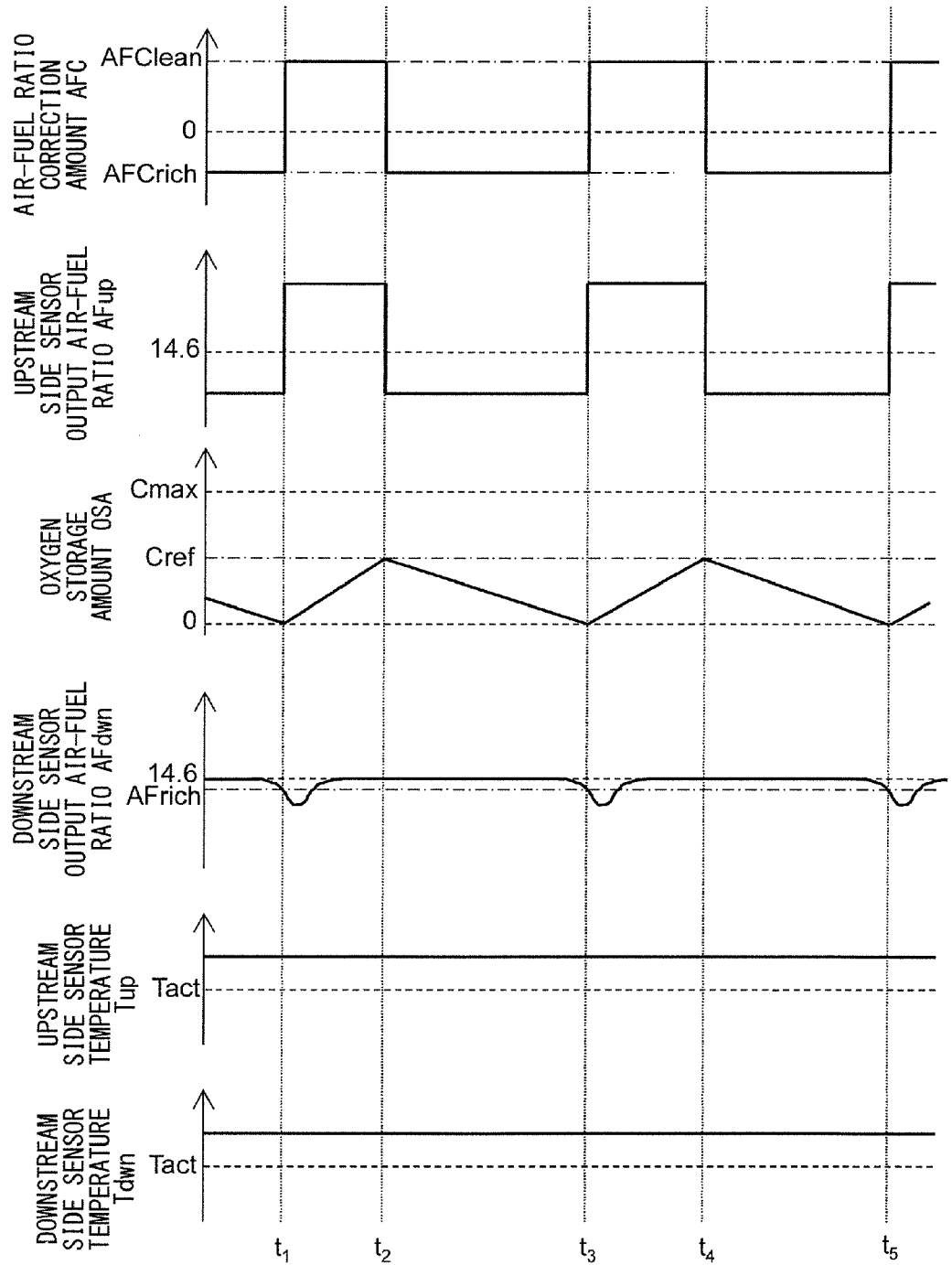
FIG. 18 is a time chart of the air-fuel ratio correction amount AFC etc.

Referring to FIG. 18, the above-mentioned such operation will be explained in detail. FIG. 18 is a time chart of the air-fuel ratio correction amount AFC etc. when performing the double FB control of the present embodiment. In the illustrated example, in the state before the time $t_1$, the air-fuel ratio correction amount AFC is made the rich set correction amount AFCrich (corresponding to rich set air-fuel ratio). For this reason, the oxygen storage amount OSA of the upstream side exhaust purification catalyst 20 gradually decreases.

If the oxygen storage amount OSA of the upstream side exhaust purification catalyst 20 gradually decreases, the oxygen storage amount OSA approaches zero. Further, at the time $t_1$, the output air-fuel ratio AFdwn of the downstream air-fuel ratio sensor 41 reaches the rich judged air-fuel ratio AFrich. In the present embodiment as well, if the output air-fuel ratio AFdwn of the downstream air-fuel ratio sensor 41 becomes the rich judged air-fuel ratio AFrich or less, the oxygen storage amount OSA is made to increase by the air-fuel ratio correction amount AFC being switched to the lean set correction amount AFClean (corresponding to lean set air-fuel ratio). If at time $t_1$ switching the target air-fuel ratio to the lean air-fuel ratio, the air-fuel ratio of the exhaust gas flowing into the upstream side exhaust purification catalyst 20 changes from the rich air-fuel ratio to the lean air-fuel ratio and the oxygen storage amount OSA of the upstream side exhaust purification catalyst 20 increases.

After that, if the oxygen storage amount OSA of the upstream side exhaust purification catalyst 20 increases, at the time $t_2$, the oxygen storage amount OSA of the upstream side exhaust purification catalyst 20 reaches the switching reference storage amount Cref. In the present embodiment, if the estimated value of the oxygen storage amount OSA becomes the switching reference storage amount Cref or more, storage of the oxygen in the upstream side exhaust purification catalyst 20 is suspended by the air-fuel ratio correction amount AFC being switched to the rich set correction amount AFCrich. Therefore, the target air-fuel ratio is made the rich air-fuel ratio. Note that in some embodiments, the switching reference storage amount Cref is made ¾ or less of the maximum storable oxygen amount Cmax when the upstream side exhaust purification catalyst 20 is unused, ½ or less, ⅕ or less. As a result, the air-fuel ratio correction amount AFC is switched to the rich set correction amount AFCrich before the output air-fuel ratio AFdwn of the downstream air-fuel ratio sensor 41 reaches the above-mentioned lean judged air-fuel ratio.

If, at the time $t_2$, switching the target air-fuel ratio to the rich air-fuel ratio, the air-fuel ratio of the exhaust gas flowing into the upstream side exhaust purification catalyst 20 changes from the lean air-fuel ratio to the rich air-fuel ratio. The exhaust gas flowing into the upstream side exhaust purification catalyst 20 contains unburned gas etc., so the oxygen storage amount OSA of the upstream side exhaust purification catalyst 20 gradually decreases. The discharge of $NO_X$ from the upstream side exhaust purification catalyst 20 at this time becomes substantially zero.

If the oxygen storage amount OSA of the upstream side exhaust purification catalyst 20 gradually decreases, at the time $t_4$, in the same way as the time $t_1$, the output air-fuel ratio AFdwn of the downstream air-fuel ratio sensor 41 reaches the rich judged air-fuel ratio AFrich. Due to this, the air-fuel ratio correction amount AFC is switched to the lean set correction amount AFClean. After that, the cycle of the above-mentioned times $t_1$ to $t_4$ is repeated.

Due to the above, in the present embodiment, it can be said that the air-fuel ratio control part of the ECU 31 switches the target air-fuel ratio (that is, the air-fuel ratio of the exhaust gas flowing into the upstream side exhaust purification catalyst 20) to the lean air-fuel ratio when the air-fuel ratio detected by the downstream air-fuel ratio sensor 41 becomes the rich judged air-fuel ratio or less and switches the target air-fuel ratio (that is, the air-fuel ratio of the exhaust gas flowing into the upstream side exhaust purification catalyst 20) to the rich air-fuel ratio when the oxygen storage amount OSA of the upstream side exhaust purification catalyst 20 becomes the switching reference storage amount Cref or more.

According to the present embodiment, it is possible to constantly keep down the amount of discharge of $NO_X$ from the upstream side exhaust purification catalyst 20. That is, so long as performing the above-mentioned control, basically, the amount of discharge of $NO_X$ from the upstream side exhaust purification catalyst 20 can be made substantially zero. Further, the cumulative time period when calculating the cumulative oxygen excess/deficiency is short, so compared to when cumulatively adding it over a long time period, there is less chance of calculation error. For this reason, calculation error of the cumulative oxygen excess/deficiency can be kept from causing $NO_X$ to end up being discharged.

<Single FB Control>

In this regard, in the present embodiment, in double FB control, rich breakdown control is performed, but in rich breakdown control, the oxygen storage amount of the upstream side exhaust purification catalyst 20 has to be estimated. Further, to estimate the oxygen storage amount of the upstream side exhaust purification catalyst 20, as explained above, the output air-fuel ratio of the upstream air-fuel ratio sensor 40 becomes necessary. On the other hand, in single FB control, the temperature of the upstream air-fuel ratio sensor 40 is basically the activation temperature or less, so the output of the upstream air-fuel ratio sensor 40 cannot be utilized. Therefore, in single FB control, rich breakdown control cannot be performed.

Therefore, in the present embodiment, in single FB control, double breakdown control (including fixed double breakdown control and fluctuating double breakdown control) are used to set the air-fuel ratio correction amount AFC, that is, the target air-fuel ratio. In particular, from the viewpoint, in the above-mentioned way, of keeping the actual air-fuel ratio from ending up greatly deviating from the stoichiometric air-fuel ratio even if the actual air-fuel ratio of the exhaust gas flowing into the upstream air-fuel ratio sensor 40 deviates from the target air-fuel ratio, in single FB control, in some embodiments the air-fuel ratio correction amount AFC is set by fixed double breakdown control. In addition, in single FB control, feed forward control is performed so that the air-fuel ratio of the exhaust gas flowing into the upstream side exhaust purification catalyst 20 becomes the target air-fuel ratio. Further, in the present embodiment as well, single FB control and double FB control are switched as shown in FIG. 6.

Figure 19:
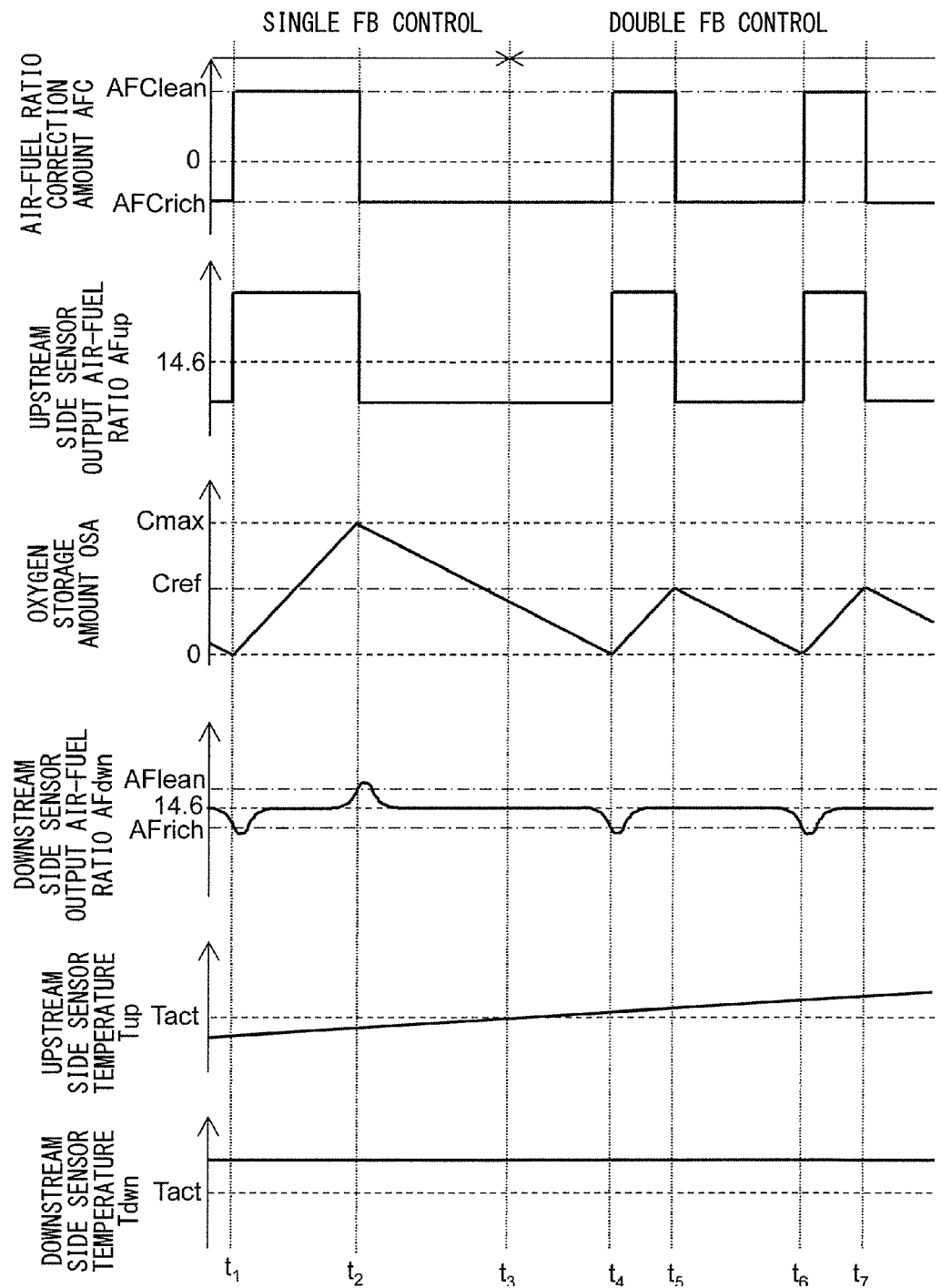
FIG. 19 is a time chart of an air-fuel ratio correction amount etc. around the time $t_2$ of FIG. 6.

FIG. 19 is a time chart of the air-fuel ratio correction amount AFC etc. around the time $t_2$ of FIG. 6. In the example shown in FIG. 19, at the time $t_3$, the temperature Tup of the upstream air-fuel ratio sensor 40 has become the activation temperature Tact or more (corresponding to time $t_2$ of FIG. 6). Therefore, before the time $t_3$, single FB control is performed, while from the time $t_5$ on, double FB control is performed.

In the example shown in FIG. 19, in single FB control performed before the time $t_3$, fixed double breakdown control is performed. Therefore, if, at the time $t_1$, the output air-fuel ratio AFup of the downstream air-fuel ratio sensor 41 becomes the rich judged air-fuel ratio AFrich or less, the air-fuel ratio correction amount AFC is switched to the lean set correction amount AFClean. On the other hand, if, at the time $t_2$, the output air-fuel ratio AFup of the downstream air-fuel ratio sensor 41 becomes the lean judged air-fuel ratio AFlean or more, the air-fuel ratio correction amount AFC is switched to the rich set correction amount AFCrich.

If, at the time $t_3$, the temperature of the upstream air-fuel ratio sensor 40 becomes the activation temperature or more, single FB control is switched to double FB control. Therefore, the control for setting the target air-fuel ratio is switched from fixed double breakdown control to rich breakdown control. In the present embodiment, if, at the time $t_3$, rich breakdown control is started, the air-fuel ratio correction amount is first set to a negative value, that is, the target air-fuel ratio is first set to the rich air-fuel ratio. This is because during single FB control, the oxygen storage amount OSA of the upstream side exhaust purification catalyst 20 cannot be estimated, so when starting rich breakdown control, the oxygen storage amount OSA cannot be determined. For this reason, if, when starting rich breakdown control, first setting the target air-fuel ratio to the lean air-fuel ratio, it is no longer possible to accurately judge when the oxygen storage amount OSA of the upstream side exhaust purification catalyst 20 reaches the switching reference storage amount Cref. As opposed to this, when setting the target air-fuel ratio to the rich air-fuel ratio in rich breakdown control, it is not necessary to estimate the oxygen storage amount OSA. For this reason, in the present embodiment, after switching to double FB control, the target air-fuel ratio is first set to the rich air-fuel ratio.

<Flow Chart Relating to Fourth Embodiment>

In the present embodiment as well, double FB control and single FB control are switched by the flow chart such as shown in FIG. 9. Further, when single FB control is being performed, the target air-fuel ratio is set by fixed double breakdown control by the flow chart such as shown in FIG.

12. In addition, when double FB control is being performed, specifically, air-fuel ratio control is performed based on the block diagram shown in FIG. 20.

Figure 20:
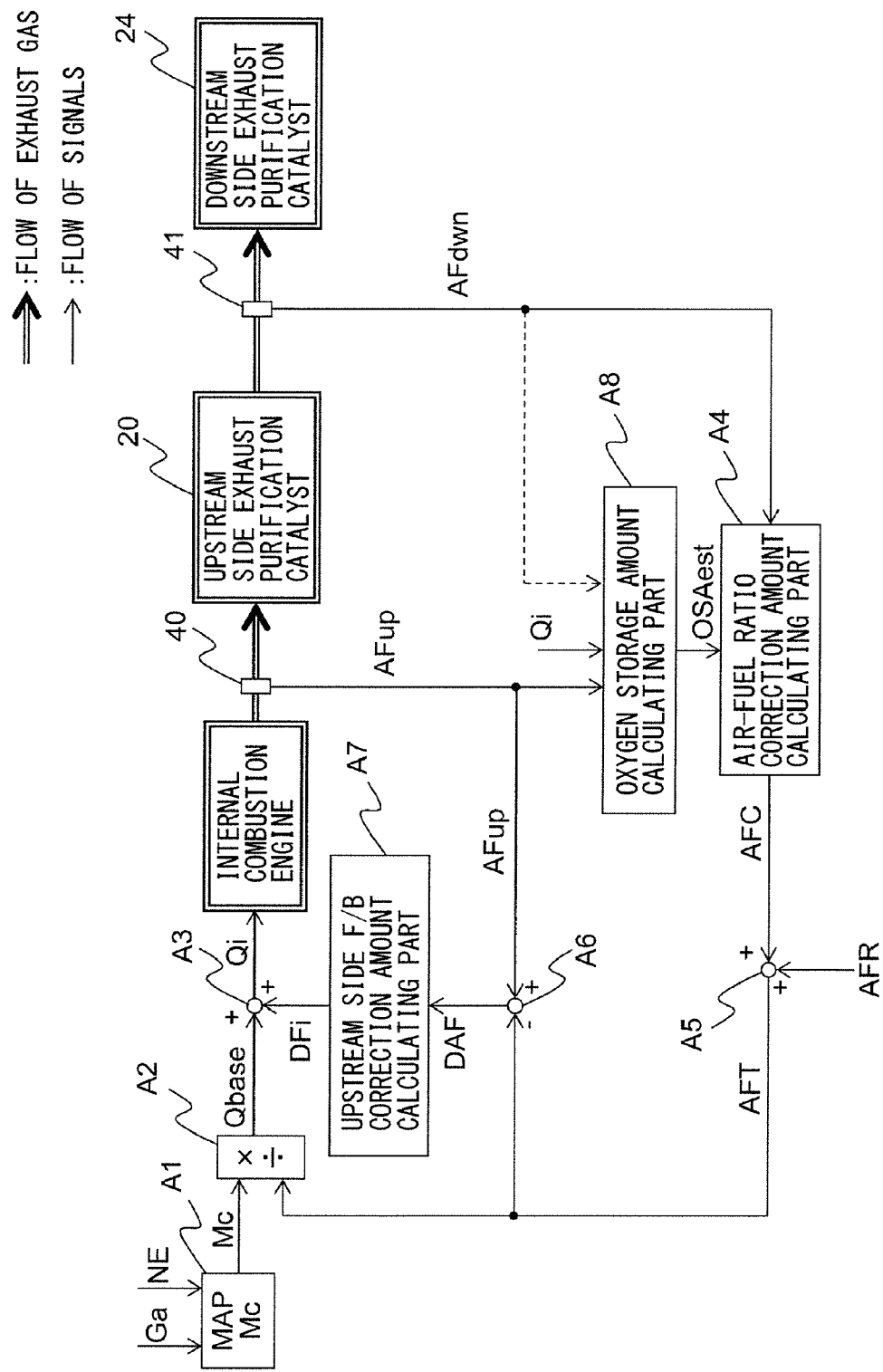
FIG. 20 is a functional block diagram of a control device of an internal combustion engine.

FIG. 20 is a functional block diagram similar to FIG. 10. The functional blocks A1 to A7 in FIG. 20 are similar to the functional blocks A1 to A7 of FIG. 10, so basically the explanations will be omitted. In the present embodiment, in calculating the target air-fuel ratio, the air-fuel ratio correction amount calculating part A4 and target air-fuel ratio setting part A5 plus the oxygen storage amount calculating part A8 are used.

The oxygen storage amount calculating part A8 calculates the cumulative oxygen excess/deficiency based on the fuel injection amount Qi calculated by the fuel injection amount calculating part A3 and the output air-fuel ratio AFup of the upstream air-fuel ratio sensor 40. Further, it calculates the oxygen storage amount based on the calculated cumulative oxygen excess/deficiency. The oxygen storage amount calculating part A8, for example, multiplies the difference between the output air-fuel ratio of the upstream air-fuel ratio sensor 40 and the control center air-fuel ratio with the fuel injection amount Qi and cumulatively adds the found values to calculate the cumulative oxygen excess/deficiency.

In the air-fuel ratio correction amount calculating part A4, the air-fuel ratio correction amount AFC of the target air-fuel ratio is calculated based on the cumulative oxygen excess/deficiency calculated by the oxygen storage amount calculating part A8 and the output air-fuel ratio AFdwn of the downstream air-fuel ratio sensor 41. Specifically, the air-fuel ratio correction amount AFC is calculated based on the flow chart shown in FIG. 21.

Figure 21:
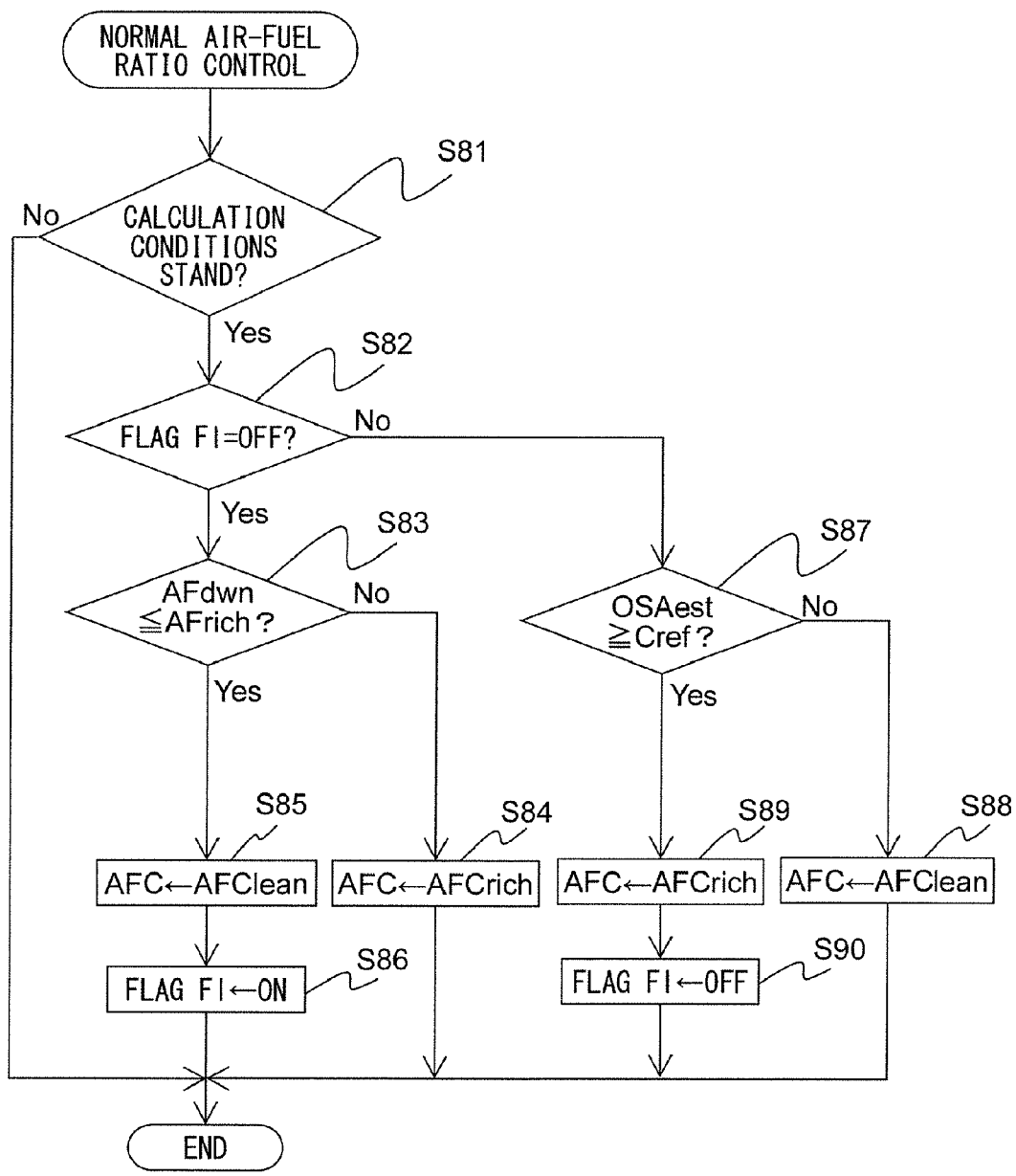
FIG. 21 is a flow chart of a control routine of rich breakdown control.

FIG. 21 is a flow chart showing the control routine of the rich breakdown control in double FB control. The illustrated control routine is performed by interruption at certain time intervals. Steps S81 to S86 and S88 to S90 in FIG. 21 are basically similar to steps S31 to S36 and S38 to S40 in FIG. 12, so the explanations will be omitted.

As shown in FIG. 21, at step S82, it is judged that the lean set flag F1 is not set OFF, then the routine proceeds to step S87. At step S87, it is judged if the estimated value OSAest of the oxygen storage amount OSA of the upstream side exhaust purification catalyst 20 is the switching reference storage amount Cref or more. If it is judged that it is less than the switching reference storage amount Cref, the routine proceeds to step S88, while if it is judged that it is the switching reference storage amount Cref or more, the routine proceeds to step S89.

Fifth Embodiment

Figure 22:
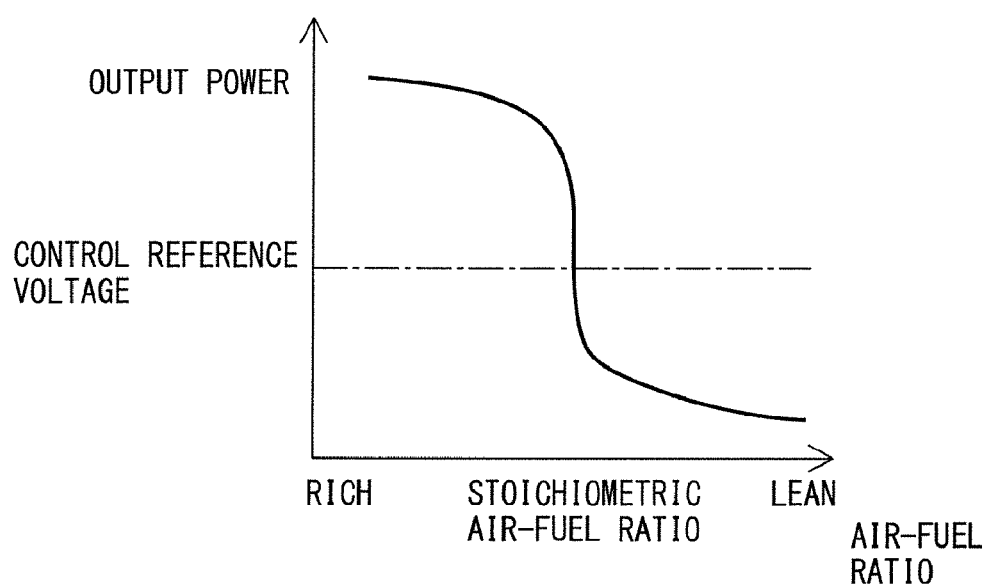
FIG. 22 is a view showing a relationship of an air-fuel ratio of the exhaust gas and an output voltage of the oxygen sensor.

Next, referring to FIG. 22 and FIG. 23, a control device of a fifth embodiment of the present disclosure will be explained. The configuration and control of the control device of the fifth embodiment are basically similar to the configurations and control of the first embodiment to fourth embodiment except for the points explained below.

In this regard, in the first embodiment to the fourth embodiment, as the downstream air-fuel ratio sensor 41, an air-fuel ratio sensor with an output current changing in proportion to the exhaust air-fuel ratio is used. As opposed to this, in the present embodiment, an oxygen sensor detecting the oxygen concentration based on an electromotive force corresponding to the concentration of oxygen in the exhaust gas is used. The oxygen sensor has the relationship such as shown in FIG. 22 between the exhaust air-fuel ratio (oxygen concentration) and the output voltage (electromotive force). Note that, FIG. 22 shows the relationship between the air-fuel ratio of the exhaust gas around the sensor and the output voltage of the oxygen sensor. The control reference voltage in the figure shows the value taken by the output current when the exhaust gas is the stoichiometric air-fuel ratio. As will be understood from FIG. 22, in the oxygen sensor, the output voltage greatly changes near the stoichiometric air-fuel ratio, the output voltage rises when the exhaust air-fuel ratio becomes the rich air-fuel ratio, and conversely the output voltage becomes lower when the exhaust air-fuel ratio becomes the lean air-fuel ratio.

Further, in the present embodiment, feedback control of the target air-fuel ratio is performed based on the output voltage of such a downstream side oxygen sensor. Specifically, the difference between the output voltage of the downstream air-fuel ratio sensor 41 and the control reference voltage is processed by PID processing to set the air-fuel ratio correction amount AFC. Here, if defining the difference between the output voltage Vup of the downstream air-fuel ratio sensor 41 and the control reference voltage Vref as the voltage difference $\Delta V$ (=Vup−Vref), in the present embodiment, the following formula (3) is used to set the target air-fuel ratio AFT:

$$AFT(n)=AFT(n-1)+kp \cdot \Delta V + ki \cdot S\Delta V + kd \cdot D\Delta V \qquad (3)$$

Note that, in the above formula (1), "n" is the number of calculations, kp is a preset proportional gain (proportional constant), ki is a present integral gain (integral constant), and kd is a preset differential gain (differential constant). Further, $D\Delta V$ is the time differential of the voltage difference $\Delta V$ and is calculated by dividing the difference between the currently updated voltage difference $\Delta V$ and the previously updated voltage difference $\Delta V$ by the time corresponding to the updating interval. Further, $S\Delta V$ is the time differential of the voltage difference $\Delta V$. This time differential $S\Delta V$ is calculated by adding the previously updated time differential $S\Delta V$ and the currently updated voltage difference $\Delta V$.

In addition, in the present embodiment, as shown in FIG. 9, double FB control and single FB control are performed in accordance with any stopping of the internal combustion engine by the automatic stop function or the temperature of the upstream air-fuel ratio sensor 40. In double FB control, feedback control is performed based on the output air-fuel ratio of the upstream air-fuel ratio sensor 40 for controlling the fuel injection amount from the fuel injector 11 to make the output air-fuel ratio of the upstream air-fuel ratio sensor 40 the target air-fuel ratio. In addition, in double FB control, the target air-fuel ratio is set based on the output voltage of the downstream side oxygen sensor 41 using the above-mentioned formula (3).

On the other hand, in the present embodiment, in single FB control, the air-fuel ratio of the exhaust gas flowing into the upstream side feed forward control is performed so that the exhaust purification catalyst 20 becomes the target air-fuel ratio. In addition, in single FB control as well, the target air-fuel ratio is set based on the output voltage of the downstream side oxygen sensor 41 using the above-mentioned formula (3).

Therefore, in the present embodiment, the air-fuel ratio control part controls the air-fuel ratio of the exhaust gas flowing into the upstream side exhaust purification catalyst 20 so that the output air-fuel ratio of the downstream air-fuel ratio sensor 41 becomes the stoichiometric air-fuel ratio. In addition, the air-fuel ratio control part controls the air-fuel ratio of the exhaust gas flowing into the upstream side exhaust purification catalyst 20 so that at the time of single FB control, compared with the time of double FB control, the amount of change of the exhaust gas flowing into the upstream side exhaust purification catalyst 20 with respect to the amount of change of the output air-fuel ratio of the downstream air-fuel ratio sensor 41 becomes smaller.

Figure 23:
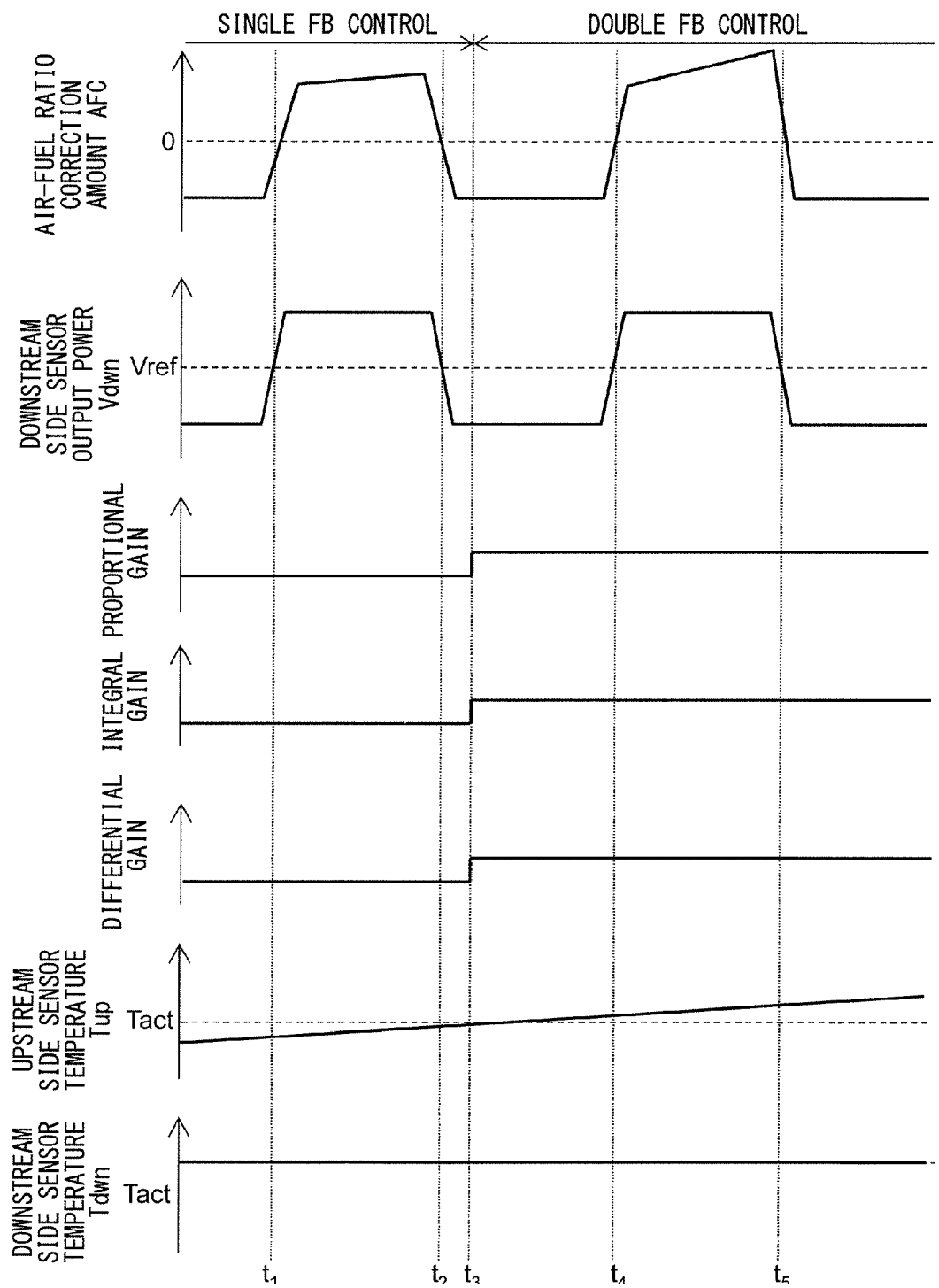
FIG. 23 is a time chart of an air-fuel ratio correction amount etc. around the time $t_2$ of FIG. 6.

FIG. 23 is a time chart of the air-fuel ratio correction amount AFC etc. around the time $t_2$ of FIG. 6. In the example shown in FIG. 23, at the time $t_3$, the temperature Tup of the upstream air-fuel ratio sensor 40 becomes the activation temperature Tact or more (corresponding to time $t_2$ of FIG. 6). Therefore, single FB control is performed before the time $t_3$ and double FB control is performed from the time $t_3$ on.

As will be understood from FIG. 23, in the present embodiment, before the time $t_3$ at which single FB control is performed, the proportional gain kp, integral gain ki, and differential gain kd are set to relatively low values. As opposed to this, at the time $t_3$ at which double FB control is performed and on, the proportional gain kp, integral gain ki, and differential gain kd are made to increase compared with before the time $t_3$.

Here, if increasing the proportional gain kp, integral gain ki, and differential gain kd, the absolute value of the air-fuel ratio correction amount AFC becomes larger. For this reason, the rich degree when the target air-fuel ratio is a rich air-fuel ratio and the lean degree when the target air-fuel ratio is a lean air-fuel ratio become larger. Therefore, even if the air-fuel ratio of the exhaust gas flowing into the upstream side exhaust purification catalyst 20 deviates somewhat from the stoichiometric air-fuel ratio to the rich side or lean side, the rich degree or the lean degree will not become that large. For this reason, even if deviation occurs in this way, it is possible to simultaneously remove the unburned gas and $NO_X$ in the exhaust gas flowing out from the upstream side exhaust purification catalyst 20.

Note that, in the above embodiments, at the time of single FB control, compared with the time of double FB control, all of the proportional gain kp, integral gain ki, and differential gain kd in the PID control are made smaller. However, there is no need to make all of these gains smaller. It is sufficient that one of the proportional gain kp, integral gain ki, and differential gain kd be made smaller.

Further, in the above embodiments, PID processing is performed based on the voltage difference of the output voltage of the downstream air-fuel ratio sensor 41 and the control reference voltage to set the air-fuel ratio correction amount AFC. However, the voltage difference does not necessarily have to be used for PID processing. PI processing or other feedback control may also be performed. Evenf PI processing is performed in this way, at the time of single FB control, compared with double FB control, at least one of the proportional gain kp and integral gain ki in the PI control is made smaller.

The invention claimed is:

1. A control device for an internal combustion engine which has an automatic stop function, the internal combustion engine equipped with:
   an exhaust purification catalyst provided in an exhaust passage;
   an upstream air-fuel ratio sensor provided in the exhaust passage at an upstream side of the exhaust purification catalyst in a direction of flow of exhaust;
   a downstream air-fuel ratio sensor provided in the exhaust passage at a downstream side of the exhaust purification catalyst in the direction of flow of exhaust;
   an upstream side sensor heater heating the upstream air-fuel ratio sensor; and
   a downstream side sensor heater heating the downstream air-fuel ratio sensor, the control device comprising:
   an electronic control unit operatively connected to the internal combustion engine, the upstream air-fuel ratio sensor, the downstream air-fuel ratio sensor, the upstream side sensor heater, and the downstream side sensor heater, the electronic control unit configured to:
   control an air-fuel ratio of exhaust gas flowing into the exhaust purification catalyst;
   control heating of the upstream air-fuel ratio sensor by the upstream side sensor heater and heating of the downstream air-fuel sensor by the downstream side sensor heater;
   control the upstream side sensor heater while the internal combustion engine is stopped by the automatic stop function so that a temperature of the upstream air-fuel ratio sensor becomes less than an activation temperature;
   heat the downstream air-fuel ratio sensor by the downstream side sensor heater while the internal combustion engine is stopped by the automatic stop function so that the temperature of the downstream air-fuel ratio sensor becomes a temperature higher than the upstream air-fuel ratio sensor;
   perform double feedback control where it controls the air-fuel ratio of the exhaust gas flowing into the exhaust purification catalyst based on an output of the upstream air-fuel ratio sensor and an output of the downstream air-fuel ratio sensor during engine operation; and
   perform single feedback control, where it controls the air-fuel ratio of the exhaust gas flowing into the exhaust purification catalyst without using the output of the upstream air-fuel ratio sensor, but based on the output of the downstream air-fuel ratio sensor even during engine operation, temporarily when the internal combustion engine is restarted after automatic stop.

2. The control device for the internal combustion engine according to claim 1 wherein
   the electronic control unit is further configured to control the downstream side sensor heater so as to maintain the temperature of the downstream air-fuel ratio sensor at less than the activation temperature and a predetermined temperature or more while the internal combustion engine is stopped by the automatic stop function, and
   the predetermined temperature is a temperature by which the temperature of the downstream air-fuel ratio sensor reaches the activation temperature faster than the temperature of the upstream air-fuel ratio sensor when the internal combustion engine is restarted after automatic stop and the upstream side sensor heater and the downstream side sensor heater heat the upstream air-fuel ratio sensor and the downstream air-fuel ratio sensor.

3. The control device for the internal combustion engine according to claim 1 wherein
   the electronic control unit is further configured to control the downstream side sensor heater so as to maintain the temperature of the downstream air-fuel ratio sensor at the activation temperature or more while the internal combustion engine is stopped by the automatic stop function.

4. The control device for the internal combustion engine according to claim 1 wherein
   the electronic control unit is further configured to control the downstream side sensor heater so that the temperature of the downstream air-fuel ratio sensor becomes lower while the internal combustion engine is stopped by the automatic stop function compared with during engine operation.

5. The control device for the internal combustion engine according to claim 1 wherein
the electronic control unit is further configured to:
perform double breakdown control, both in double feedback control and in single feedback control, where it switches a target air-fuel ratio of the exhaust gas flowing into the exhaust purification catalyst to a lean air-fuel ratio leaner than a stoichiometric air-fuel ratio when the output air-fuel ratio of the downstream air-fuel ratio sensor becomes a rich judged air-fuel ratio richer than the stoichiometric air-fuel ratio or becomes less and switches the target air-fuel ratio to a rich air-fuel ratio richer than the stoichiometric air-fuel ratio when the output air-fuel ratio of the downstream air-fuel ratio sensor becomes a lean judged air-fuel ratio leaner than the stoichiometric air-fuel ratio or becomes more; and
perform feedback control based on the output air-fuel ratio of the upstream air-fuel ratio sensor so that the output air-fuel ratio of the upstream air-fuel ratio sensor becomes the target air-fuel ratio when performing double feedback control.

6. The control device for the internal combustion engine according to claim 5 wherein
the electronic control unit is configured to set the target air-fuel ratio so that an average value of the rich degree of the target air-fuel ratio while the target air-fuel ratio is set to the rich air-fuel ratio and an average value of the lean degree of the target air-fuel ratio while the target air-fuel ratio is set to the lean air-fuel ratio become larger when performing double feedback control compared to when performing single feedback control.

7. The control device for the internal combustion engine according to claim 5 wherein
the electronic control unit is further configured to:
perform fluctuating double feedback control, in double feedback control, where it maintains the target air-fuel ratio at the lean air-fuel ratio and lowers the lean degree of the target air-fuel ratio during a lean time period from when the output air-fuel ratio of the downstream air-fuel ratio sensor becomes the rich judged air-fuel ratio or less to when the output air-fuel ratio of the downstream air-fuel ratio sensor becomes the lean judged air-fuel ratio or more and where it maintains the target air-fuel ratio at the rich air-fuel ratio and lowers the rich degree of the target air-fuel ratio during a rich time period from when the output air-fuel ratio of the downstream air-fuel ratio sensor becomes the lean judged air-fuel ratio or more to when the output air-fuel ratio of the downstream air-fuel ratio sensor becomes the rich judged air-fuel ratio or less; and
perform fixed double breakdown control, in single feedback control, where it maintains the target air-fuel ratio at a constant lean set air-fuel ratio during the lean time period and maintains the target air-fuel ratio at a constant rich set air-fuel ratio during the rich time period.

8. The control device for an internal combustion engine according to claim 1 wherein
the electronic control unit is further configured to:
perform rich breakdown control, in double feedback control, where it switches the target air-fuel ratio of the exhaust gas flowing into the exhaust purification catalyst to a lean air-fuel ratio leaner than a stoichiometric air-fuel ratio when the output air-fuel ratio of the downstream air-fuel ratio sensor becomes a rich judged air-fuel ratio richer than the stoichiometric air-fuel ratio or becomes less and switches the target air-fuel ratio to a rich air-fuel ratio richer than the stoichiometric air-fuel ratio when the estimated value of an oxygen storage amount of the exhaust purification catalyst becomes a switching reference storage amount smaller than the maximum storable oxygen amount or becomes more and,
perform double breakdown control, in single feedback control, where it switches the target air-fuel ratio of the exhaust gas flowing into the exhaust purification catalyst to a lean air-fuel ratio leaner than the stoichiometric air-fuel ratio when the output air-fuel ratio of the downstream air-fuel ratio sensor becomes a rich judged air-fuel ratio richer than the stoichiometric air-fuel ratio or becomes less and switches the target air-fuel ratio to a rich air-fuel ratio richer than the stoichiometric air-fuel ratio when the output air-fuel ratio of the downstream air-fuel ratio sensor becomes a lean judged air-fuel ratio leaner than the stoichiometric air-fuel ratio or becomes more.

9. The control device for the internal combustion engine according to claim 8 wherein
the electronic control unit is further configured to:
perform fixed double breakdown control, in single feedback control, where it maintains the target air-fuel ratio at a constant lean set air-fuel ratio in a lean time period from when the output air-fuel ratio of the downstream air-fuel ratio sensor becomes the rich judged air-fuel ratio or less to when the output air-fuel ratio of the downstream air-fuel ratio sensor becomes the lean judged air-fuel ratio or more and maintains the target air-fuel ratio at a constant rich air-fuel ratio in a rich time period from when the output air-fuel ratio of the downstream air-fuel ratio sensor becomes the lean judged air-fuel ratio or more to when the output air-fuel ratio of the downstream air-fuel ratio sensor becomes rich judged air-fuel ratio or less.

10. The control device for the internal combustion engine according to claim 8 wherein
the electronic control unit is further configured to:
control the downstream side sensor heater so that the temperature of the downstream air-fuel ratio sensor becomes the activation temperature or more after the internal combustion engine is restarted after being stopped by the automatic stop function;
switch single feedback control to double feedback control from when the temperature of the downstream air-fuel ratio sensor becomes the activation temperature or more after the internal combustion engine is restarted after automatic stop; and
set the target air-fuel ratio to the rich air-fuel ratio firstly when switching from single feedback control to double feedback control.

11. The control device for the internal combustion engine according to claim 1 wherein
the downstream air-fuel ratio sensor is an oxygen sensor which detects an oxygen concentration based on an electromotive force corresponding to a concentration of oxygen in the exhaust gas, and
the electronic control unit is further configured to:
control the air-fuel ratio of the exhaust gas flowing into the exhaust purification catalyst so that the output air-fuel ratio of the downstream air-fuel ratio sensor approaches a stoichiometric air-fuel ratio; and control the air-fuel ratio of the exhaust gas flowing into the exhaust purification catalyst so that an amount of change of the air-fuel ratio of the exhaust gas flowing into the exhaust purification catalyst becomes smaller than an amount of change of the output air-fuel ratio of the downstream air-fuel ratio sensor at the time of single feedback control compared with the time of double feedback control.

12. The control device for the internal combustion engine according to claim 11 wherein the electronic control unit is further configured to:

control the target air-fuel ratio based on a difference between the output air-fuel ratio of the downstream air-fuel ratio sensor and the stoichiometric air-fuel ratio by PID control so that the difference becomes smaller both in feedback control and in single feedback control; and make at least one of a proportional gain, an integral gain, and a differential gain in the PID control smaller when performing single feedback control compared to when performing double feedback control.

13. The control device for the internal combustion engine according to claim 11 wherein the electronic control unit is further configured to:

control the target air-fuel ratio based on a difference between the output air-fuel ratio of the downstream air-fuel ratio sensor and the stoichiometric air-fuel ratio by PI control so that the difference becomes smaller both in double feedback control and in single feedback control; and make at least one of the gains of the proportional gain and integral gain in the PI control smaller when performing single feedback control compared to when performing double feedback control.

* * * * *